(12) United States Patent
Fein et al.

(10) Patent No.: US 10,254,830 B2
(45) Date of Patent: Apr. 9, 2019

(54) CORRELATING USER REACTION WITH AT LEAST AN ASPECT ASSOCIATED WITH AN AUGMENTATION OF AN AUGMENTED VIEW

(71) Applicant: Elwha LLC, Bellevue, WA (US)

(72) Inventors: Gene Fein, Westlake, CA (US); Royce A. Levien, Lexington, MA (US); Richard T. Lord, Federal Way, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

( * ) Notice: Subject to any disclaimer, the term of this patent is extended or adjusted under 35 U.S.C. 154(b) by 0 days.

(21) Appl. No.: 15/584,333

(22) Filed: May 2, 2017

(65) Prior Publication Data

US 2017/0315613 A1    Nov. 2, 2017

Related U.S. Application Data

(63) Continuation of application No. 13/723,610, filed on Dec. 21, 2012, now Pat. No. 9,671,863, which is a
(Continued)

(51) Int. Cl.
*G06F 3/01* (2006.01)
*G06T 11/60* (2006.01)
*G06T 19/00* (2011.01)

(52) U.S. Cl.
CPC .............. *G06F 3/013* (2013.01); *G06F 3/011* (2013.01); *G06T 11/60* (2013.01); *G06T 19/006* (2013.01)

(58) Field of Classification Search
None
See application file for complete search history.

(56) References Cited

U.S. PATENT DOCUMENTS 6,091,378 A    7/2000  Richardson et al.
6,326,985 B1 *  12/2001  Tazoe .................... G06F 3/0481
                                                   715/764
(Continued)

FOREIGN PATENT DOCUMENTS

CN    102436663 A    5/2012
EP        1117074    7/2001
(Continued)

OTHER PUBLICATIONS

Bonsor, Kevin; "How Augmented Reality Works"; bearing a date of Dec. 20, 2010; located at: J:t☐XP . . . If.g9_m1Atirx . . . hm.'!'.?. D.AffW9JI,;☐,f.Qrn/.☐t1J._grnr,u1☐\1: rnf11HYJitrn; pp. 1-3.
(Continued)

Primary Examiner — Jason A Pringle-Parker

(57) ABSTRACT

Computationally implemented methods and systems include detecting one or more user reactions of a user in response to a display to the user of an augmented view of an actual scene from a real environment, the augmented view that was displayed including one or more augmentations, and correlating the detected one or more user reactions with at least one or more aspects associated with the one or more augmentations that were included in the augmented view that was presented. In addition to the foregoing, other aspects are described in the claims, drawings, and text.

25 Claims, 26 Drawing Sheets

Related U.S. Application Data continuation of application No. 13/721,340, filed on Dec. 20, 2012, which is a continuation-in-part of application No. 13/711,095, filed on Dec. 11, 2012, now Pat. No. 9,111,384, which is a continuation of application No. 13/709,465, filed on Dec. 10, 2012, now Pat. No. 9,111,383, which is a continuation-in-part of application No. 13/690,003, filed on Nov. 30, 2012, now Pat. No. 9,105,126, which is a continuation of application No. 13/689,372, filed on Nov. 29, 2012, which is a continuation-in-part of application No. 13/673,070, filed on Nov. 9, 2012, now Pat. No. 9,448,623, which is a continuation of application No. 13/672,575, filed on Nov. 8, 2012, now Pat. No. 9,141,188, which is a continuation-in-part of application No. 13/648,012, filed on Oct. 9, 2012, now Pat. No. 8,941,689, which is a continuation of application No. 13/646,147, filed on Oct. 5, 2012, now Pat. No. 8,928,695.

(56) References Cited

U.S. PATENT DOCUMENTS

| | | |
|---|---|---|
| 6,425,764 B1 | 7/2002 | Lamson |
| 6,625,299 B1 | 9/2003 | Meisner et al. |
| 6,774,898 B1 | 8/2004 | Katayama et al. |
| 6,853,390 B1* | 2/2005 | Wandersleben ...... G06F 3/0481 715/802 |
| 6,891,563 B2 | 5/2005 | Schofield et al. |
| 7,119,829 B2 | 10/2006 | Leonard et al. |
| 7,257,777 B1* | 8/2007 | Kanevsky ............... G06F 9/451 715/794 |
| 7,375,701 B2 | 5/2008 | Covannon et al. |
| 7,690,975 B2 | 4/2010 | Watanabe et al. |
| 7,801,328 B2 | 9/2010 | Au et al. |
| 7,956,869 B1* | 6/2011 | Gilra ...................... G06F 3/0481 345/592 |
| 8,116,576 B2 | 2/2012 | Sroka et al. |
| 8,184,070 B1 | 5/2012 | Taubman |
| 8,188,880 B1 | 5/2012 | Chi et al. |
| 8,203,605 B1 | 6/2012 | Starner |
| 8,204,073 B1 | 6/2012 | Gailloux et al. |
| 8,402,356 B2 | 3/2013 | Martinez et al. |
| 8,527,943 B1* | 9/2013 | Chiluvuri ............... G06F 8/36 717/106 |
| 8,544,033 B1 | 9/2013 | Acharya et al. |
| 8,633,970 B1 | 1/2014 | Mercay et al. |
| 8,751,948 B2 | 6/2014 | Wetzer et al. |
| 8,756,519 B2 | 6/2014 | Hunt et al. |
| 9,088,823 B1* | 7/2015 | Price ................... H04N 21/4667 |
| 2001/0030654 A1 | 10/2001 | Iki |
| 2001/0044858 A1 | 11/2001 | Rekimoto |
| 2002/0044152 A1 | 4/2002 | Abbott, III et al. |
| 2002/0144259 A1 | 10/2002 | Gutta et al. |
| 2002/0163521 A1 | 11/2002 | Ellenby et al. |
| 2002/0167522 A1 | 11/2002 | Miyazawa |
| 2003/0011639 A1* | 1/2003 | Webb .................... G06F 3/0481 715/808 |
| 2003/0037068 A1 | 2/2003 | Thomas et al. |
| 2003/0210832 A1 | 11/2003 | Benton |
| 2004/0046711 A1 | 3/2004 | Triebfuerst |
| 2004/0113885 A1 | 6/2004 | Genc et al. |
| 2004/0268263 A1* | 12/2004 | Van Dok .................. G09G 5/14 715/733 |
| 2005/0206583 A1* | 9/2005 | Lemelson .......... A61B 1/00048 345/7 |
| 2006/0123353 A1* | 6/2006 | Matthews ............. G06F 3/0481 715/779 |
| 2006/0181484 A1 | 8/2006 | Sprague et al. |
| 2006/0218031 A1* | 9/2006 | Weinberg .............. G06Q 30/02 705/7.32 |
| 2006/0224445 A1* | 10/2006 | Axe ...................... G06Q 30/02 705/14.69 |
| 2006/0227862 A1 | 10/2006 | Campbell et al. |
| 2006/0262140 A1 | 11/2006 | Kujawa et al. |
| 2007/0162942 A1 | 7/2007 | Hamynen et al. |
| 2007/0265082 A1 | 11/2007 | Shimura et al. |
| 2007/0279521 A1 | 12/2007 | Cohen |
| 2008/0071559 A1 | 3/2008 | Arrasvuori |
| 2008/0095468 A1 | 4/2008 | Klemmer |
| 2008/0125959 A1 | 5/2008 | Doherty et al. |
| 2008/0253737 A1 | 10/2008 | Kimura et al. |
| 2008/0266323 A1 | 10/2008 | Biocca et al. |
| 2008/0270947 A1 | 10/2008 | Elber et al. |
| 2008/0306999 A1* | 12/2008 | Finger ................ G06F 17/3002 |
| 2009/0013052 A1 | 1/2009 | Robarts et al. |
| 2009/0049004 A1 | 2/2009 | Nurminen et al. |
| 2009/0158203 A1* | 6/2009 | Kerr ....................... G06F 3/017 715/784 |
| 2009/0167787 A1 | 7/2009 | Bathiche et al. |
| 2009/0182499 A1 | 7/2009 | Bravo |
| 2009/0237328 A1 | 9/2009 | Gyorfi et al. |
| 2009/0262206 A1 | 10/2009 | Park |
| 2009/0300535 A1 | 12/2009 | Skourup et al. |
| 2009/0322671 A1 | 12/2009 | Scott et al. |
| 2010/0088023 A1 | 4/2010 | Werner |
| 2010/0104185 A1 | 4/2010 | Johnson et al. |
| 2010/0161409 A1 | 6/2010 | Ryu et al. |
| 2010/0164990 A1 | 7/2010 | Van Doorn |
| 2010/0208033 A1 | 8/2010 | Edge et al. |
| 2010/0214284 A1 | 8/2010 | Rieffel et al. |
| 2010/0226535 A1 | 9/2010 | Kimchi et al. |
| 2010/0238161 A1 | 9/2010 | Varga et al. |
| 2010/0253764 A1 | 10/2010 | Sim et al. |
| 2010/0295921 A1 | 11/2010 | Guthrie et al. |
| 2010/0328344 A1 | 12/2010 | Mattila et al. |
| 2010/0332315 A1 | 12/2010 | Kamar et al. |
| 2011/0045905 A1* | 2/2011 | Radek ..................... G07F 17/32 463/31 |
| 2011/0055049 A1 | 3/2011 | Harper et al. |
| 2011/0074658 A1 | 3/2011 | Sato |
| 2011/0075257 A1 | 3/2011 | Hua et al. |
| 2011/0082755 A1 | 4/2011 | Itzhak |
| 2011/0112915 A1* | 5/2011 | Geer, III ................ G06Q 30/00 705/14.73 |
| 2011/0134108 A1 | 6/2011 | Hertenshein |
| 2011/0138317 A1 | 6/2011 | Kang et al. |
| 2011/0141254 A1 | 6/2011 | Roebke et al. |
| 2011/0164163 A1 | 7/2011 | Bilbrey et al. |
| 2011/0202878 A1 | 8/2011 | Park et al. |
| 2011/0209201 A1 | 8/2011 | Chollat |
| 2011/0214082 A1 | 9/2011 | Osterhout et al. |
| 2011/0216060 A1 | 9/2011 | Weising et al. |
| 2011/0227820 A1 | 9/2011 | Haddick et al. |
| 2011/0231781 A1 | 9/2011 | Betzler et al. |
| 2011/0238751 A1 | 9/2011 | Belimpaskakis et al. |
| 2011/0242134 A1* | 10/2011 | Miller .................. G06T 19/006 345/633 |
| 2011/0258049 A1 | 10/2011 | Ramer et al. |
| 2011/0292220 A1 | 12/2011 | Georgis et al. |
| 2011/0310087 A1 | 12/2011 | Wright, Jr. et al. |
| 2012/0025975 A1 | 2/2012 | Richey et al. |
| 2012/0038669 A1 | 2/2012 | Lee et al. |
| 2012/0062596 A1 | 3/2012 | Bedi et al. |
| 2012/0099800 A1 | 4/2012 | Llano et al. |
| 2012/0102439 A1 | 4/2012 | Mitchell et al. |
| 2012/0105473 A1 | 5/2012 | Bar-Zeev et al. |
| 2012/0105475 A1 | 5/2012 | Tseng |
| 2012/0113092 A1 | 5/2012 | Bar-Zeev et al. |
| 2012/0113140 A1 | 5/2012 | Hilliges et al. |
| 2012/0113274 A1 | 5/2012 | Adhikari et al. |
| 2012/0116920 A1 | 5/2012 | Adhikari et al. |
| 2012/0120101 A1 | 5/2012 | Adhikari et al. |
| 2012/0120113 A1 | 5/2012 | Hueso |
| 2012/0133650 A1 | 5/2012 | Lee |
| 2012/0147328 A1 | 6/2012 | Yahav |
| 2012/0154638 A1 | 6/2012 | Chou |
| 2012/0166435 A1 | 6/2012 | Graham et al. |
| 2012/0176410 A1 | 7/2012 | Meier et al. |
| 2012/0194549 A1 | 8/2012 | Osterhout et al. |
| 2012/0198339 A1 | 8/2012 | Williams et al. |
| 2012/0206323 A1 | 8/2012 | Osterhout et al. |

(56) References Cited

U.S. PATENT DOCUMENTS

| | | |
|---|---|---|
| 2012/0223966 A1 | 9/2012 | Lim |
| 2012/0233033 A1 | 9/2012 | Calman et al. |
| 2012/0244907 A1 | 9/2012 | Athsani et al. |
| 2012/0246027 A1 | 9/2012 | Martin |
| 2012/0249416 A1 | 10/2012 | Maciocci et al. |
| 2012/0249588 A1 | 10/2012 | Tison et al. |
| 2012/0249591 A1 | 10/2012 | Maciocci et al. |
| 2012/0249741 A1 | 10/2012 | Macicci et al. |
| 2012/0249797 A1 | 10/2012 | Haddick et al. |
| 2012/0268491 A1 | 10/2012 | Sugden et al. |
| 2012/0269494 A1 | 10/2012 | Satyanarayana et al. |
| 2012/0293548 A1 | 10/2012 | Perez et al. |
| 2012/0299962 A1 | 11/2012 | White et al. |
| 2012/0304111 A1 | 11/2012 | Queru |
| 2012/0306920 A1 | 12/2012 | Bathiche et al. |
| 2012/0308209 A1 | 12/2012 | Zaletel |
| 2012/0317484 A1 | 12/2012 | Gomez et al. |
| 2012/0324494 A1 | 12/2012 | Burger et al. |
| 2012/0327119 A1 | 12/2012 | Woo et al. |
| 2012/0329432 A1 | 12/2012 | Gupta et al. |
| 2013/0021373 A1* | 1/2013 | Vaught .............. G02B 27/017 345/633 |
| 2013/0027572 A1 | 1/2013 | Petrou |
| 2013/0032634 A1 | 2/2013 | McKirdy |
| 2013/0044128 A1 | 2/2013 | Liu et al. |
| 2013/0044129 A1 | 2/2013 | Latta et al. |
| 2013/0050258 A1 | 2/2013 | Liu et al. |
| 2013/0050432 A1 | 2/2013 | Perez et al. |
| 2013/0054622 A1 | 2/2013 | Karmarkar et al. |
| 2013/0057577 A1 | 3/2013 | Jeong |
| 2013/0076788 A1 | 3/2013 | Ben Zvi |
| 2013/0083003 A1 | 4/2013 | Perez et al. |
| 2013/0083007 A1 | 4/2013 | Geisner et al. |
| 2013/0083009 A1 | 4/2013 | Geisner et al. |
| 2013/0085345 A1 | 4/2013 | Geisner et al. |
| 2013/0093786 A1 | 4/2013 | Liu et al. |
| 2013/0125027 A1 | 5/2013 | Abovitz |
| 2013/0128364 A1 | 5/2013 | Wheeler |
| 2013/0141453 A1 | 6/2013 | Devara et al. |
| 2013/0147836 A1 | 6/2013 | Small et al. |
| 2013/0162632 A1 | 6/2013 | Varga et al. |
| 2013/0170697 A1 | 7/2013 | Zises |
| 2013/0188032 A1 | 7/2013 | Vertegaal |
| 2013/0194164 A1 | 8/2013 | Sugden et al. |
| 2013/0218721 A1 | 8/2013 | Borhan et al. |
| 2013/0278631 A1 | 10/2013 | Border et al. |
| 2013/0290233 A1 | 10/2013 | Ferren et al. |
| 2013/0326583 A1 | 12/2013 | Freihold et al. |
| 2013/0335573 A1 | 12/2013 | Forutanpour et al. |
| 2013/0342571 A1 | 12/2013 | Kinnebrew et al. |
| 2014/0002357 A1 | 1/2014 | Pombo et al. |
| 2014/0063055 A1 | 3/2014 | Osterhout et al. |
| 2014/0092130 A1 | 4/2014 | Anderson et al. |
| 2014/0108309 A1 | 4/2014 | Frank et al. |
| 2014/0129342 A1 | 5/2014 | Sanghavi et al. |
| 2014/0225898 A1 | 8/2014 | Fyke et al. |
| 2014/0237366 A1 | 8/2014 | Poulos et al. |

FOREIGN PATENT DOCUMENTS

| | | |
|---|---|---|
| EP | 1 271 293 | 1/2003 |
| EP | 2 418 563 | 2/2012 |
| EP | 2 442 539 | 4/2012 |
| KR | 10-2012-0066552 | 6/2012 |
| WO | WO 2012/108721 | 8/2012 |

OTHER PUBLICATIONS

Broll et al.; "An Infrastructure for Realizing Custom-Tailored Augmented Reality User Interfaces"; IEEE Transactions on Visualization and Computer Graphics; Nov./Dec. 2005; nn. 722-733; vol. 11, No. 6; IEEE Computer Society.

Butz, et al.; "Enveloping Users and Computers in a Collaborative 3D Augmented Reality"; bearing a date of Oct. 20-21, 1999; DD. 35-44; Augmented Reality IEEE.

Correia et al.; "HyperMem: A System to Store and Replay Experiences in Mixed Reality Worlds"; Proceedings of the 2005 International Conference on Cyberworlds (CW'05); bearing a date of 2005; created on Oct. 25, 2016; 8 pages; IEEE.

Doobybrain; "GE's Augmented Reality Demo"; YouTube; uploaded Feb. 4, 2009; DD. 1-2; located at: 1n1n://11,r<.v,v.voutube.com/wa!Ch?v=00FCitH5n_kxM.

European Patent Office, Supplementary European Search Report, Pursuant to Rule 62 EPC; App. No. EP 14751531.6; dated Sep. 9, 2016; pp. 1-11.

European Patent Office, Extended European Search Report, Pursuant to Rule 62 EPC; App. No. EP 14 76 7447; dated Sep. 21, 2016; DD. 1-7.

European Patent Office, Extended European Search Report, Pursuant to Rule 62 EPC; App. No. EP 14 76 9243.8; dated Oct. 12, 2016; DD. 1-10.

European Patent Office, Extended European Search Report, Pursuant to Rule 62 EPC; App. No. EP 14 77 0781.4; dated Oct. 12, 2016; pp. 1-10.

European Patent Office, Extended European Search Report, Pursuant to Rule 62 EPC; App. No. EP 14 77 0115.5; dated Oct. 12, 2016; DD. 1-10.

Inbar, Ori; "Top 10 Augmented Reality Demos That Will Revolutionize Video Games"; Games Alfresco; posted on Mar. 3, 2008, printed on Sep. 27, 2012; pp. 1-19; located at: httn:// gamesalfresco.com/2008/03/03/to12-10-augmented-realitv-dernos-that-will-revolutionize-video-games/.

Ira Wa Ti et al.; "V ARU Framework: Enabling Rapid Prototyping of VR, AR and Ubiquitous Applications"; IEEE Virtual Reality Conference, Reno, NV; Mar. 8-12, 2008; pp. 201-208.

Rekimoto, et al.; "Augment-able Reality: Situated Communication through Physical and Digital Spaces"; bearing a date of Oct. 19-20, 1998; pp. 68-75; Wearable Computers.

Rekimoto, et al.; "CyberCode: Designing Augmented Reality Environments with Visual Tags"; bearing a date of Apr. 1, 2000; DD. 1-10; ACM.

Shinymedia; "Demo: World's First Augmented Reality Glasses—Vuzix Wrap 920 AR"; YouTube; uploaded Oct. 27, 2010; pp. 1-2; located at: https://www.youtube.com/watch?v=xfiZQW0k2Ro.

Takacs, Gabriel et al.; "Outdoors Augmented Reality on Mobile Phone using Loxel-Based Visual Feature Organization"; Multimedia Information Retrieval 2008; bearing a date of Oct. 30-31, 2008; DD. 427-434; ACM.

Taoistflyer; "Google Glasses (How It Works)"; YouTube; uploaded Apr. 7, 2012; pp. 1-2.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; =pp. 1-2; located at: httg:i/wv,w.youtube.com/watch?v QoZRHLm1JKtM.

PCT International Search Report; International App. No. PCT/US2014/025579; dated Jul. 29, 2014; pp. 1-4.

PCT International Search Report; International App. No. PCT/US2014/025639; dated Jul. 17, 2014; pp. 1-4.

PCT International Search Report; International App. No. PCT/US2014/025604; dated Jul. 11, 2014; pp. 1-3.

PCT International Search Report; International App. No. PCT/US2014/025669; dated Jul. 9, 2014; pp. 1-3.

PCT International Search Report; International App. No. PCT/US2014/016022; dated Jun. 6, 2014; DD. 1-3.

"Qualcomm Augmented Reality Sample Apps"; Qualcomm; bearing a date of May 18, 2011, printed on Sep. 27, 2012; pp. 1-2; Qualcomm Incorporated; located at: httg://www.9.ualcornrn.com/rnedia/videos/9.ualcornrn--augmented-realitv-sarnole--:mns?searc:h=aui:nnented □{,20realilv&channel= 11.

Vuzix—View the Future Today Home Page; bearing a date of Sep. 18, 2012, printed on Sep. 27, 2012; p. 1; Vuzix; located at: 1:Ht.Q://w,vw.vuzix.com/riorne/.

(56) References Cited

OTHER PUBLICATIONS

Chinese State Intellectual Property Office, First Office Action, App. No. 201480028245.3 (Based on PCT Patent Application No. PCT/2014/025579); dated Feb. 14, 2018; (machine translation provided herewith, 13 pages total).
European Patent Office, Communication Pursuant to Article 94(3) EPC; App. No. EP 14770115.5; dated Oct. 15, 2018; pp. 1-9.

* cited by examiner

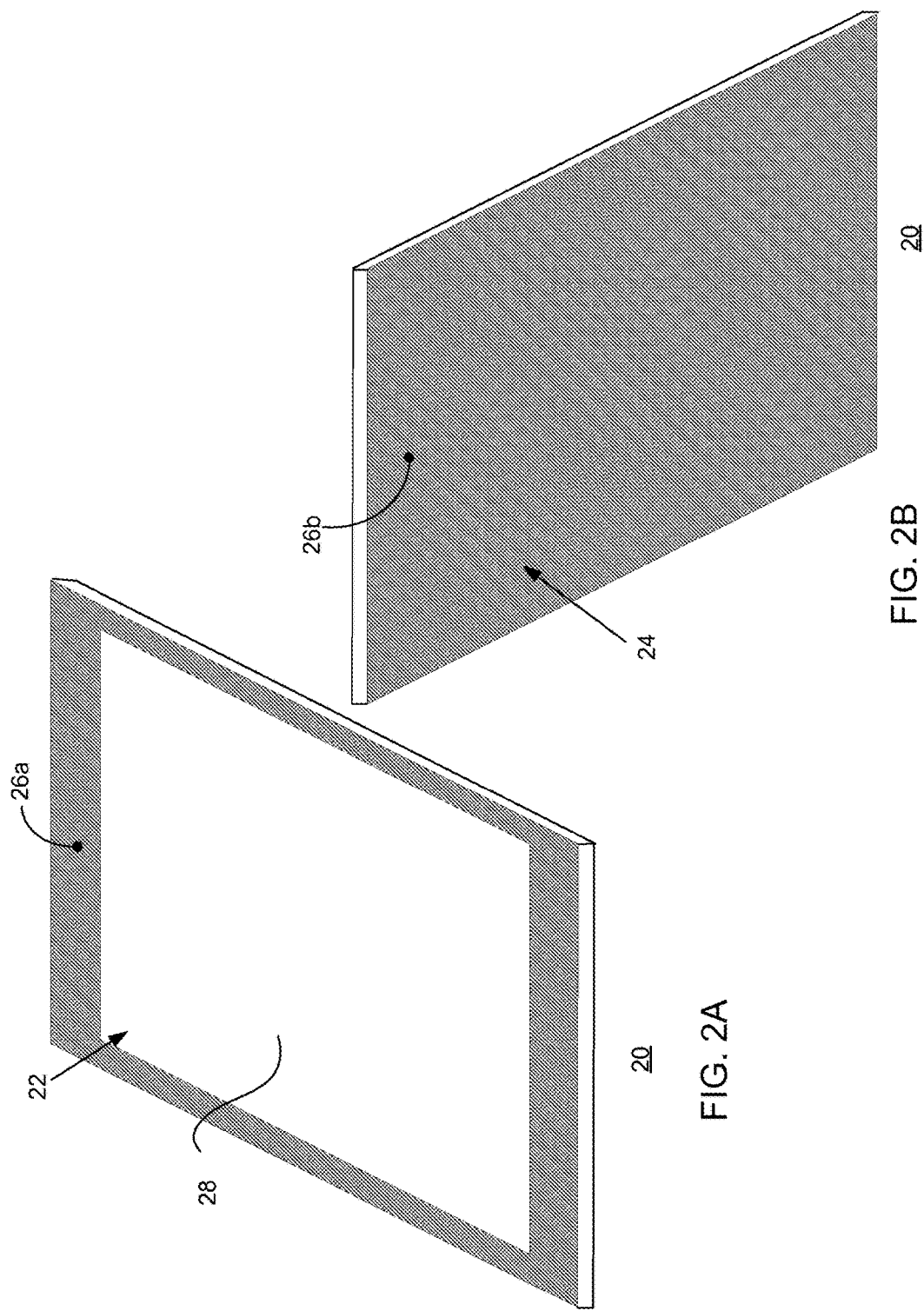

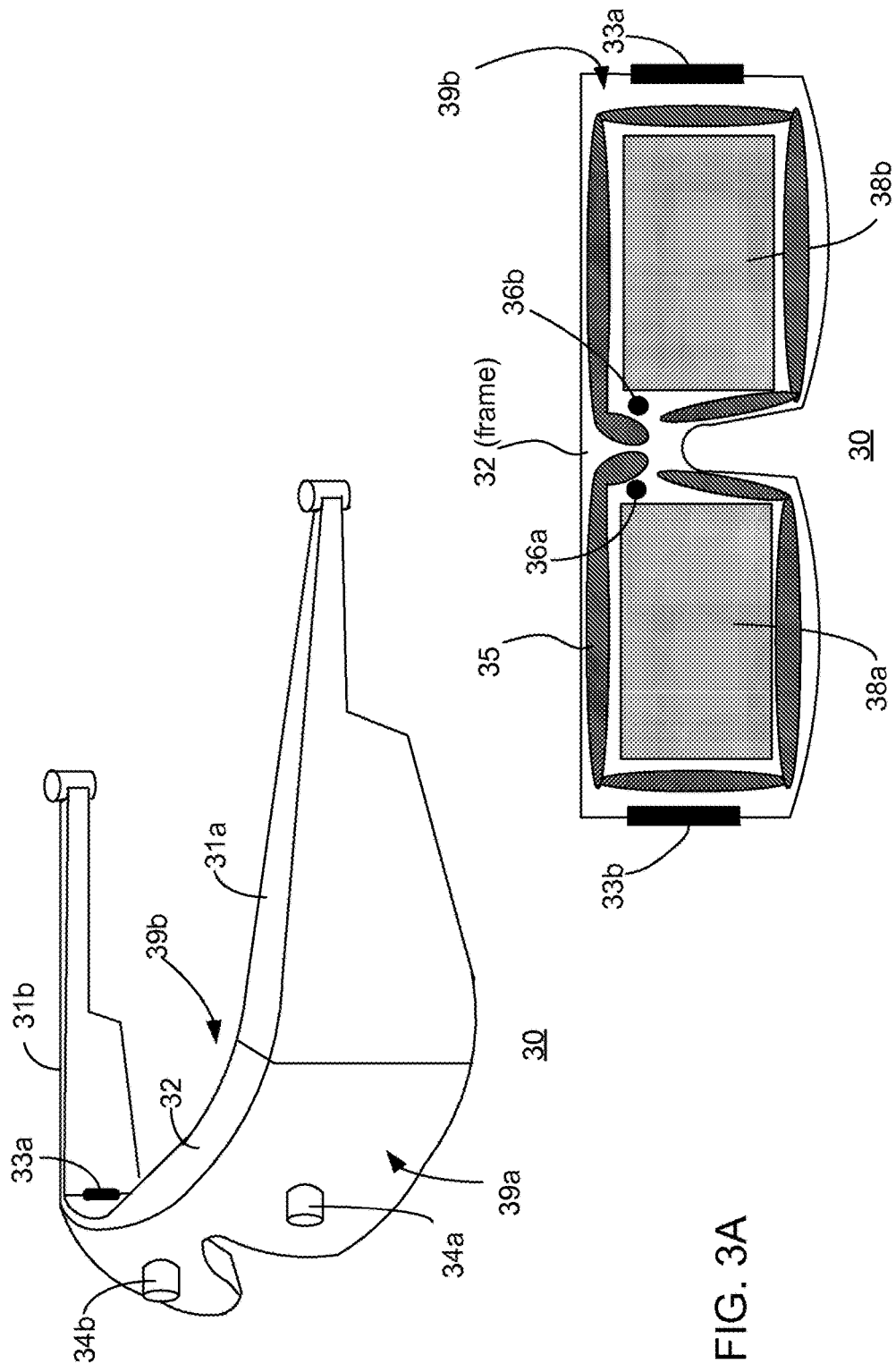

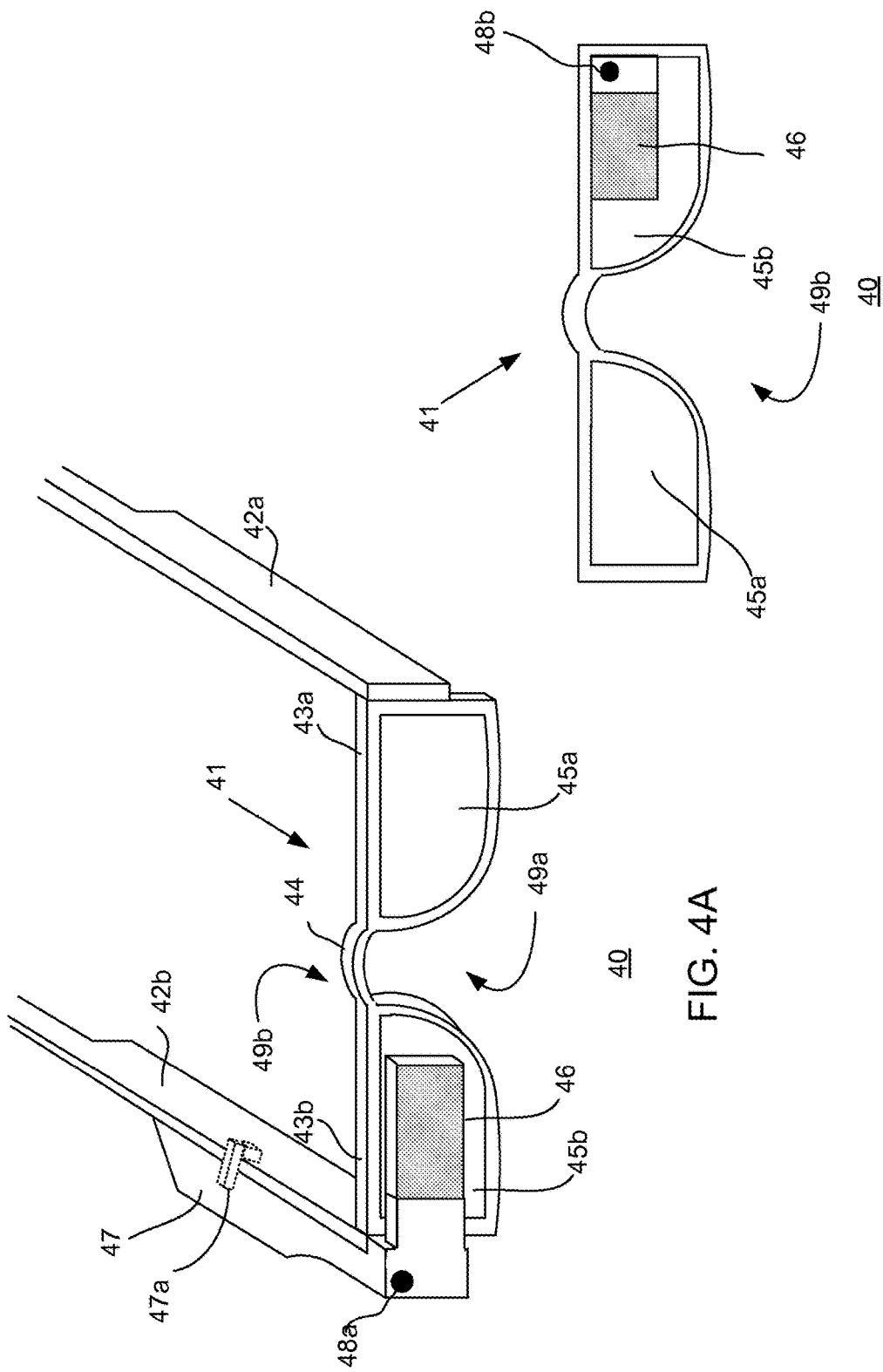

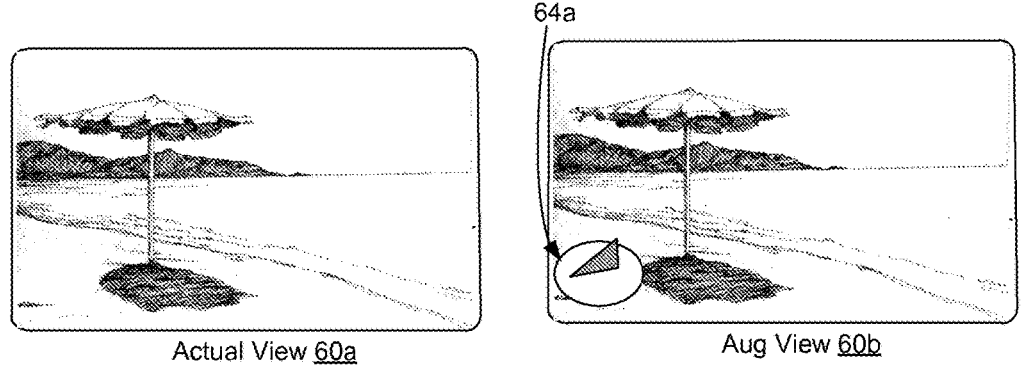
Actual View 60a
FIG. 6A
Aug View 60b
FIG. 6B
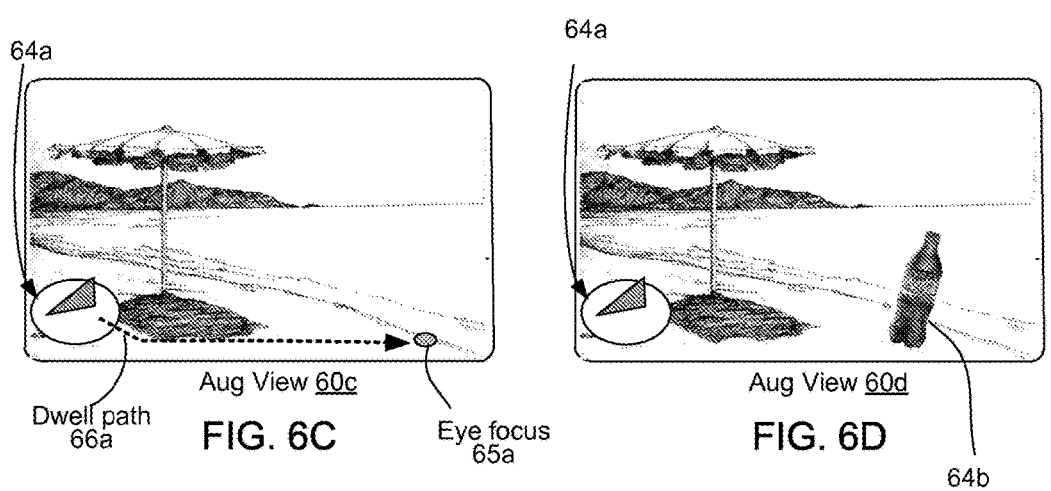
Aug View 60c
Dwell path 66a
Eye focus 65a
FIG. 6C
Aug View 60d
FIG. 6D
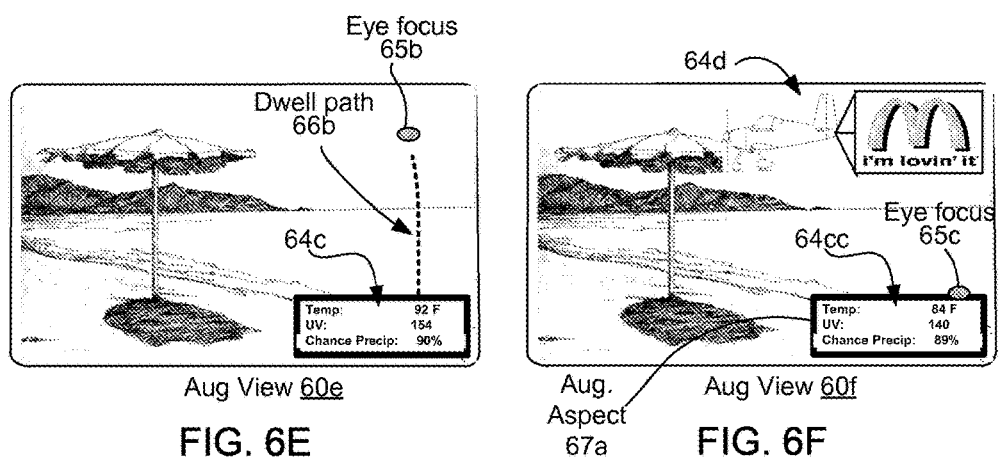
Aug View 60e
Eye focus 65b
Dwell path 66b
FIG. 6E
Aug View 60f
Aug. Aspect 67a
Eye focus 65c
FIG. 6F

104* User Reaction Associating Module

830 Relationship Identifying Module

832 Relationship Logging Module

834 Physiological Characteristic Associating Module

836 Eye Characteristic Associating Module

838 Eye Movement Associating Module

840 Dwell Path Associating Module

842 Eye Focus Associating Module

844 Dwell Time Associating Module

846 Pupil Characteristic Associating Module

848 Pupil Shape/Size Associating Module

FIG. 8B

110 User Interface
- 852 Display Monitor[s]
- 854 Visual Capturing Device[s]
- 856 Audio Speaker[s]
- 858 Audio Input Device[s]
- 860 Keyboard/Keypad[s]

FIG. 8C

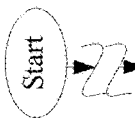

904 Correlating the detected one or more user reactions with at least one or more aspects associated with the one or more augmentations that were included in the augmented view that was presented 1133 Correlating the detected one or more user reactions with the at least one or more aspects associated with the one or more augmentations by correlating one or more physiological characteristics of the user that were sensed during and/or following the display of the augmented view with the one or more aspects of the one or more augmentations 1134 Correlating the one or more physiological characteristics of the user with the one or more aspects of the one or more augmentations by correlating one or more eye characteristics of one or more eyes of the user that were sensed during and/or following the display of the augmented view with the one or more aspects of the one or more augmentations 1139 Correlating the one or more eye characteristics of the one or more eyes of the user with the one or more aspects of the one or more augmentations by correlating eye focus of the one or more eyes of the user with respect to the augmented view that were sensed during and/or following the display of the augmented view with the one or more aspects of the one or more augmentations 1140 Correlating the eye focus of the one or more eyes of the user with the one or more aspects of the one or more augmentations by correlating eye focus of the one or more eyes of the user with the one or more aspects of the one or more augmentations, the eye focus of the user to be correlated being with respect to the one or more aspects of the one or more augmentations that were sensed during and/or following the display of the augmented view 1141 Correlating the eye focus of the one or more eyes of the user with the one or more aspects of the one or more augmentations by correlating the eye focus of the one or more eyes of the user with the one or more aspects of the one or more augmentations, the eye focus of the user being with respect to one or more aspects of one or more non-augmentation scene elements included in the augmented view that were sensed during and/or following the display of the augmented view 1142 Correlating the eye focus of the one or more eyes of the user with the one or more aspects of the one or more augmentations by correlating dwell time of the one or more eyes of the user with the one or more aspects of the one or more augmentations, the eye focus of the one or more eyes of the user being with respect to one or more aspects of the augmented view that were sensed during and/or following the display of the augmented view

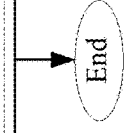

FIG. 11B

CORRELATING USER REACTION WITH AT LEAST AN ASPECT ASSOCIATED WITH AN AUGMENTATION OF AN AUGMENTED VIEW

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/721,340, entitled CORRELATING USER REACTION WITH AT LEAST AN ASPECT ASSOCIATED WITH AN AUGMENTATION OF AN AUGMENTED VIEW, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 20 Dec. 2012, which is currently co-pending or is an application of which a currently co-pending application is entitled to the benefit of the filing date.

For purposes of the USPTO extra-statutory requirements, the present application constitutes a continuation of U.S. patent application Ser. No. 13/723,610, entitled CORRELATING USER REACTION WITH AT LEAST AN ASPECT ASSOCIATED WITH AN AUGMENTATION OF AN AUGMENTED VIEW, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 21 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/711,095, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 11 Dec. 2012, which is currently co-pending or is an application of which a currently co-pending application is entitled to the benefit of the filing date, and which is a continuation of U.S. patent application Ser. No. 13/709,465, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 10 Dec. 2012.

For purposes of the USPTO extra-statutory requirements, the present application constitutes a continuation-in-part of U.S. patent application Ser. No. 13/690,003, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 30 Nov. 2012, which is currently co-pending or is an application of which a currently co-pending application is entitled to the benefit of the filing date, and which is a continuation of U.S. patent application Ser. No. 13/689,372, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 29 Nov. 2012.

For purposes of the USPTO extra-statutory requirements, the present application constitutes a continuation-in-part of U.S. patent application Ser. No. 13/673,070, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9 Nov. 2012, which is currently co-pending or is an application of which a currently co-pending application is entitled to the benefit of the filing date, and which is a continuation of U.S. patent application Ser. No. 13/672,575, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 8 Nov. 2012.

For purposes of the USPTO extra-statutory requirements, the present application constitutes a continuation-in-part of U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9 Oct. 2012, which is currently co-pending or is an application of which a currently co-pending application is entitled to the benefit of the filing date, and which is a continuation of U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 5 Oct. 2012.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s). If the listings of applications provided above are inconsistent with the listings provided via an ADS, it is the intent of the Applicant to claim priority to each application that appears in the Priority Applications section of the ADS and to each application that appears in the Priority Applications section of this application. All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to detecting one or more user reactions of a user in response to a display to the user of an augmented view of an actual scene from a real environment, the augmented view that was displayed including one or more augmentations, and correlating the detected one or more user reactions with at least one or more aspects associated with the one or more augmentations that were included in the augmented view that was presented. In some implementations, at least one of the detecting or correlating being performed by a machine, article of manufacture, or composition of matter. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for detecting one or more user reactions of a user in response to a display to the user of an augmented view of an actual scene from a real environment, the augmented view that was displayed including one or more augmentations, and means for correlating the detected one or more user reactions with at least one or more aspects associated with the one or more augmentations that were included in the augmented view that was presented. In addition to the foregoing, other system aspects are described in the claims, drawings, and text forming a part of the disclosure set forth herein.

In one or more various aspects, a system includes, but is not limited to, circuitry for detecting one or more user reactions of a user in response to a display to the user of an augmented view of an actual scene from a real environment, the augmented view that was displayed including one or more augmentations, and circuitry for correlating the detected one or more user reactions with at least one or more aspects associated with the one or more augmentations that were included in the augmented view that was presented. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, detecting one or more user reactions of a user in response to a display to the user of an augmented view of an actual scene from a real environment, the augmented view that was displayed including one or more augmentations, and correlating the detected one or more user reactions with at least one or more aspects associated with the one or more augmentations that were included in the augmented view that was presented. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 2A and 2B show the front and back views of an augmented reality (AR) device that is in the form of a tablet computer 20.

FIGS. 3A and 3B show different views of an augmented reality (AR) device that is in the form of a goggle 30.

FIGS. 4A and 4B show different views of an augmented reality (AR) device that is in the form of a goggle 40.

FIGS. 6A, 6B, 6C, 6D, 6E, 6F, 6G, 6H, 6I, 6K, and 6M show exemplary actual and augmented views of various scenes from the real environment.

FIG. 8B shows the user reaction associating module 104* of FIGS. 7A and 7B (e.g., the user reaction associating module 104' of FIG. 7A or the user reaction associating module 104" of FIG. 7B) in accordance with various implementations.

FIG. 8C shows another perspective of the user interface 110 of FIGS. 7A and 7B.

FIG. 11B is a high-level logic flowchart of a process depicting alternate implementations of the user reaction correlating operation 904 of FIG. 9.

DETAILED DESCRIPTION

Figures 1A, 1B:
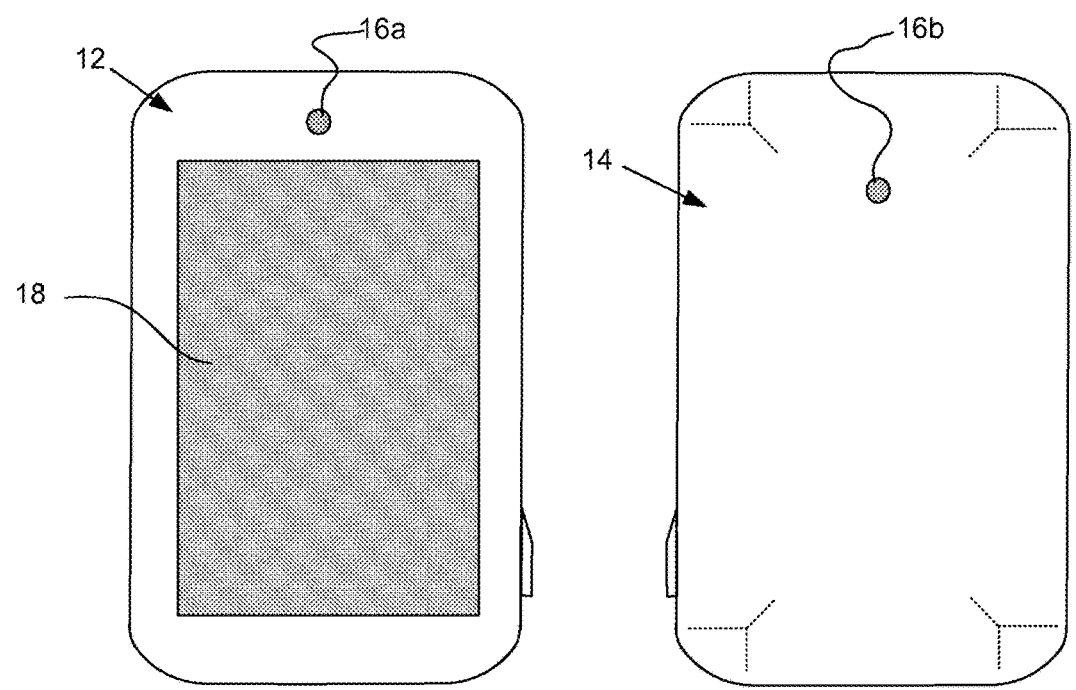
FIGS. 1A and 1B show the front and back views of an augmented reality (AR) device that is in the form of a smartphone 10.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene from a real environment" will be in reference to an actual or true (visual) scene from an actual physical environment (as opposed to a virtual environment or world) in the proximate vicinity of an AR system and/or the user of the AR system (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that may be included in an augmented view of a scene from the real environment and that may not be present in the actual view of the scene from the real environment.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically-designed AR systems are systems or devices that have been specifically designed to implement AR functionalities. Specifically-designed AR systems may come in a variety of forms but are most commonly in the form of a head-mounted display (HMD) such as in the form of eyeglasses, goggles, helmet, and so forth. These devices are sometimes referred to as "wearable computing devices." Typically these wearable computing devices will include one or more features that allows the user to wear the device on his/or her head (e.g., a coupling device for coupling the AR device to a user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see example 42a or 42b of FIG. 4A, or in the case of a helmet the helmet structure itself). Alternatively, a wearable computing device may be made wearable by having a feature (e.g., one or more clips or hooks) that allows it to be attached or clipped onto the frame of a pair of glasses or goggles thus allowing the AR device to be coupled to the user's head. An example of such a feature may be found in the form of a clip 47a is illustrated in FIG. 4A.

All of these devices (e.g., specifically-designed AR systems and nonspecifically-designed AR systems) will usually have certain common components including one or more cameras (e.g., digital, web, and/or HD cameras), one or more displays (e.g., LCD displays or see-through displays), and logic for processing data generated by the one or more cameras and/or for generating and merging computer generated data or images with actual views or images of scenes from real world environment to generate augmented views of the scenes of the real world environment. Although most, if not all, current AR systems will contain these same basic components (e.g., camera, display, etc.), they can, however, take on a wide range of form factors as briefly described above (e.g., tablet computer, goggles, and so forth).

FIGS. 1A and 1B, 2A and 2B, 3A and 3B, and 4A and 4B illustrate some of the form factors that current AR devices can take on. For example, FIG. 1A depicts the front-side 12 (e.g., the side of a personal computing/communication device that a display is located or disposed on), respectively, of a nonspecifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for an inward-facing camera on the front-side 12 and lens 16b for a forward-facing camera on the back-side 14 of the smartphone 10. When employed to provide one or more augmented views of one or more scenes of real world environments, the display 18 may be used in order to display the augmented views. In some cases, the inward-facing camera associated with lens 16a may be used in order to track the gaze, focus, dwell path, and/or dwell time of one or more eyes of a user. The forward-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for an inward-facing camera on the front-side 22 and lens 26b for a forward-facing camera on the back-side 24 of the tablet computer 20.

In some cases, the inward-facing camera associated with lens 26a may be used in order to track the gaze, focus, dwell path, and/or dwell time of one or more eyes of a user. The forward-facing camera associated with lens 26b on the back-side 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forward looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left inward-facing camera and a right lens 36b for a right inward-facing camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze, focus, dwell path, and/or dwell time of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the same or similar types of electronics (e.g., microprocessors, controllers, network interface card, memory, etc.) that are often found in mobile computing/communication devices such as the smartphone 10 or the tablet computer 20 described earlier. The left temple 31a and the right temple 31b are features that allow the AR system to be worn on a user's head.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 46, and electronics housing 47 (note that in some cases, the electronics housing 47 may include an optional clip 47a for coupling the electronics housing 47 to the right temple 42b. The frame piece 41 having a front-side 49a and a backside 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45b, in alternative implementations, a second see-through display may be disposed over the left lens 45a. The left temple 42a and the right temple 42b are features that allow the AR system to be worn on a user's head.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze, focus, dwell path, and/or dwell time of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze, focus, dwell path, and/or dwell times of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may be alternatively or additionally located on the left-side of the electronic glasses 40.

The electronics housing 47 may house various electronics including electronics that are designed for, for example, processing data provided by the various cameras (e.g., forward-looking as well as inward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses. In such an embodiment, the electronic housing 47 may include one or more features (e.g. one or more clips, magnets, straps, and so forth) that allows the housing to be worn by a user by allowing the electronic housing 47 to be attached to a pair of eye-glasses or goggles. Note that although not depicted herein, AR devices may come in other types of forms other than those illustrated in FIGS. 1A, 1B, 2A, 2B, 3A, 3B, 4A, and 4B including, for example, a helmet, a mask, and so forth.

There are many types of augmentations that can be provided through AR systems including, for example, augmentations in the form of text that may be added to an augmented view, an augmentation in the form of 2 or 3-dimensional visual item (which may or may not be an animated item that moves) that may be added to an augmented view, and/or an augmentation that simply modifies, emphasizes, deletes, or de-emphasizes an existing real world item (e.g., intensity of light, color of a car, removal of undesirable elements in the corresponding real field of view such as rubbish on the ground, etc.) in the augmented view.

One type of augmentation that many currently available AR systems can include into an augmented view of an actual scene of the real environment are vision-based augmentations that depend, for their existence in the augmented view, on the presence of a visual cue (e.g., an "anchor" visual item) in the actual view of a scene from the real environment. That is, in many currently available AR systems, an augmentation will only be included into an augmented view only when a visual cue is detected in the actual view of a scene from the real environment. In some cases, the visual cue that may be the basis for the inclusion of the augmentation in the augmented view may be a visual marker (e.g., a recognizable symbol or pattern such as the face of a dollar bill) that may have been purposefully placed in an actual scene of the real environment in order to prompt an AR system to insert a particular augmentation into the augmented view of the actual scene of the real environment. In other cases, the visual cue may be a recognizable or identifiable visual pattern (e.g., a human face) that may be recognized using image feature analysis (e.g., image tracking such as Parallel Tracking).

There are, of course, other types of augmentations that currently available systems can provide or have been proposed that depend, for their existence in an augmented view, on factors other than visual cues in the actual views of scenes of the real environment. For example, in some current AR systems, an augmentation can be provided that may depend, for its existence in the augmented view, on the location and/or orientation of the AR system that is presenting (e.g., displaying and/or transmitting) the augmented view. In other cases, an AR system may be configured or designed to insert one or more augmentations into an augmented view based on the location of the AR system and/or which direction is the AR system "facing" (e.g., east, west, north, up, down, etc.).

It is contemplated that as the AR technology evolves, one of the challenges that AR developers may face is determining and applying the optimal formatting (e.g., size, shape, color, length of visibility, etc.), inclusion (e.g., when to include into an augmented view), and placement (e.g., placement in the augmented view) of augmentations. That is, it is likely that with respect to at least some types of augmentations it may be highly desirable for such augmentations to have certain formats and/or be placed at certain locations of an augmented view in order to maximize their visibility or "noticeability." It is also just as likely that with respect to other types of augmentations it may be highly desirable for such augmentations to have particular formats and/or be placed at particular locations of an augmented view in order to minimize or reduce their visibility or noticeability. The optimal formatting and/or placement of augmentations in augmented views may, therefore, be particularly useful for presenting augmented views of real scenes from the real environment.

In accordance with various embodiments, computationally implemented methods, systems, circuitry, articles of manufacture, and computer program products are described herein that are designed to, among other things, ascertain one or more user reactions to a display of an augmented view of an actual scene from a real environment, the displayed augmented view having one or more augmentations; and correlating the detected one or more user reactions with at least one or more aspects associated with the one or more augmentations. In various embodiments, the results of the correlation may be particularly useful for, among other things, determining when and how to present a particular augmentation in an augmented view in order to, for example, maximize or minimize its visibility or noticeability.

More particularly, the computationally implemented methods, systems, circuitry, articles of manufacture, and computer program products may be designed to, among other things, detecting one or more user reactions of a user in response to a display to the user of an augmented view of an actual scene from a real environment, the augmented view that was displayed including one or more augmentations, and correlating the detected one or more user reactions with at least one or more aspects associated with the one or more augmentations that were included in the augmented view that was presented. In some embodiments, the computationally implemented methods, systems, circuitry, articles of manufacture, and computer program products may be further designed to transmitting one or more results of the correlating; and receiving, in response to said transmitting, one or more second augmentations for displaying in a second augmented view of the actual scene or of a second actual scene from the real environment. In the same or different embodiments, the computationally implemented methods, systems, circuitry, articles of manufacture, and computer program products may additionally or alternatively be designed to displaying a second augmented view of the actual scene or of a second actual scene from the real environment, the second augmented view including one or more second augmentations that have been included into the second augmented view based, at least in part, on the correlating.

Figure 7A:
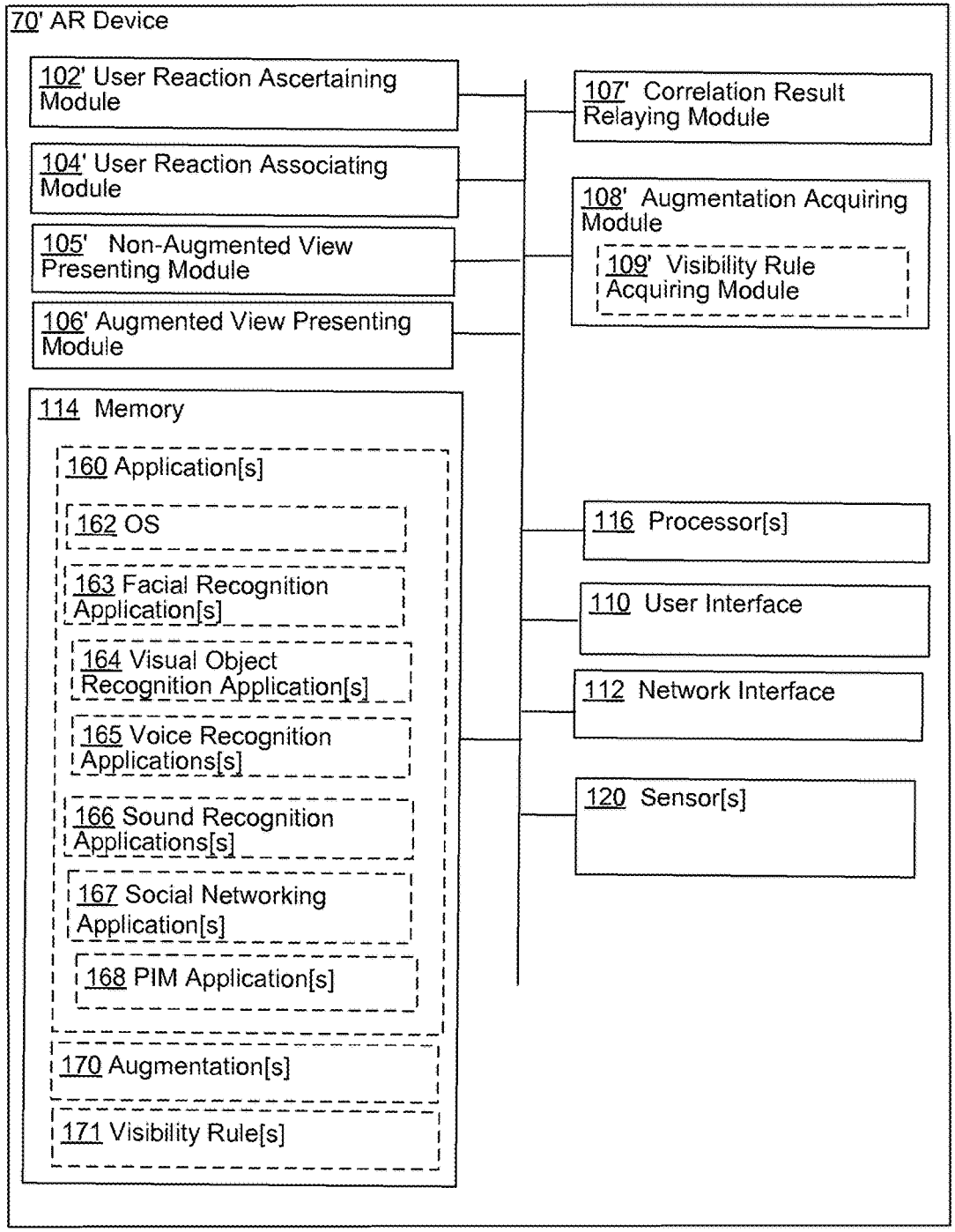
FIG. 7A shows a block diagram of particular implementation of an AR device.
Figure 7B:
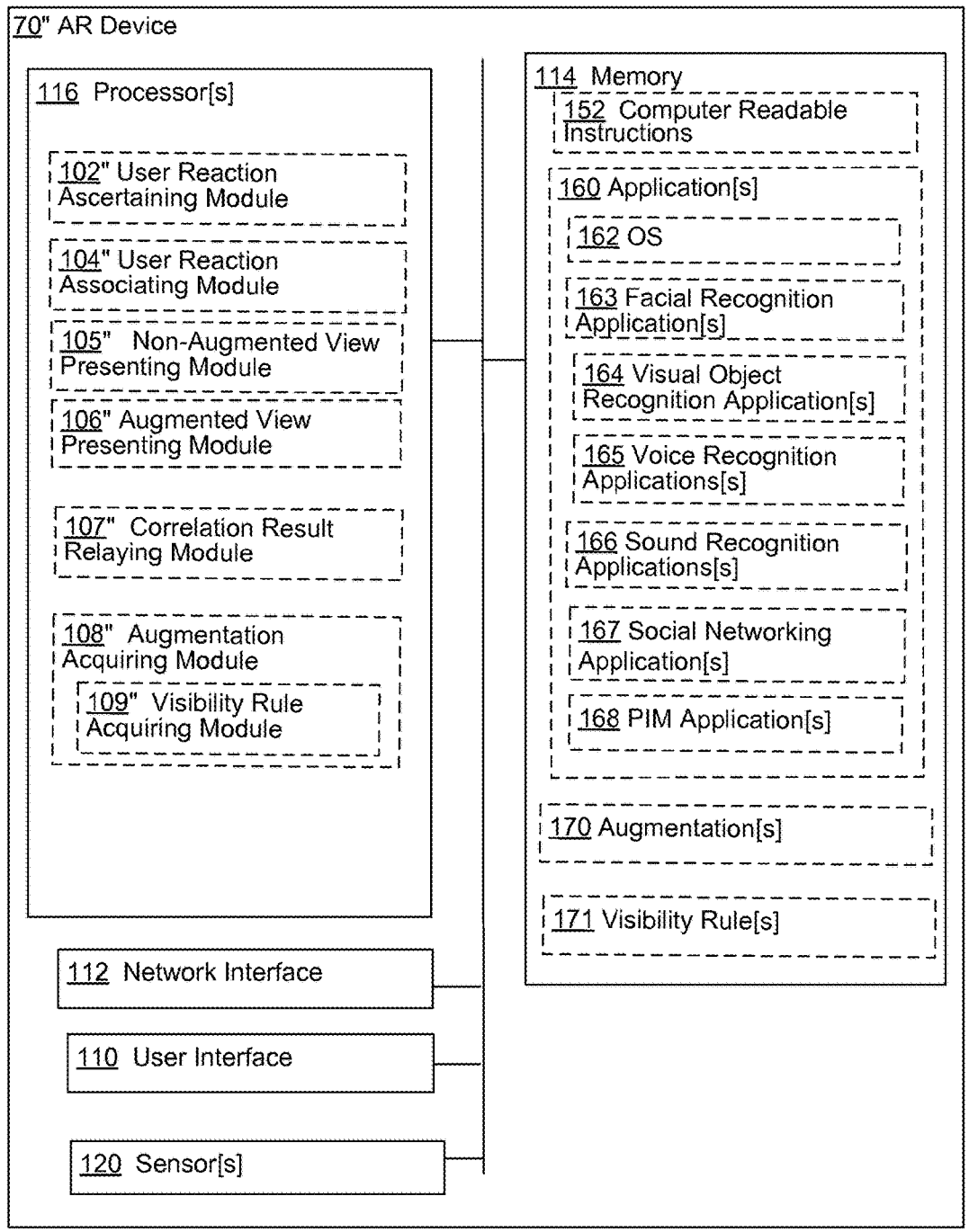
FIG. 7B shows a block diagram of yet another implementation of an AR device.

In various embodiments, the methods, systems, circuitry, articles of manufacture, and computer program products in accordance with various embodiments may be implemented by the AR device 70\* of FIG. 7A or 7B. Note that for purposes of the following, "*" represents a wildcard. Thus, references in the following to the AR device 70\* of FIG. 7A or 7B may be in reference to the AR device 70' of FIG. 7A or to the AR device 70" of FIG. 7B. Note further that the AR device 70\* of FIG. 7A or 7B may have a variety of form factors including any one of the form factors illustrated in FIGS. 1A, 1B, 2A, 2B, 3A, 3B, 4A, and 4B, or having other form factors (e.g., a helmet, a mask, and so forth).

Figure 5A:
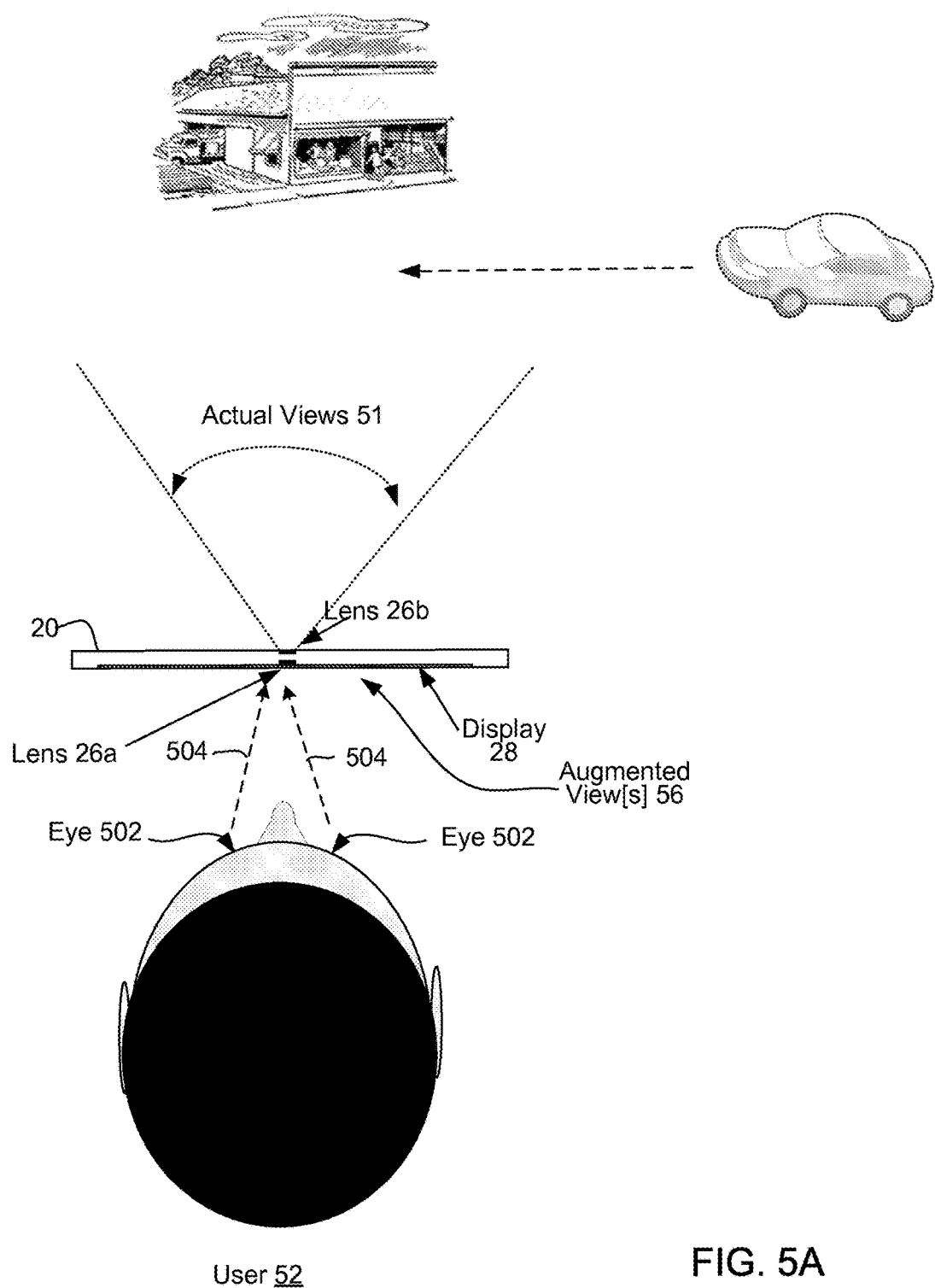
FIG. 5A shows a user 52 using the tablet computer 20 of FIGS. 2A and 2B in order to view two different scenes in the real environment 50 at two different points or increments in time.
Figure 5B:
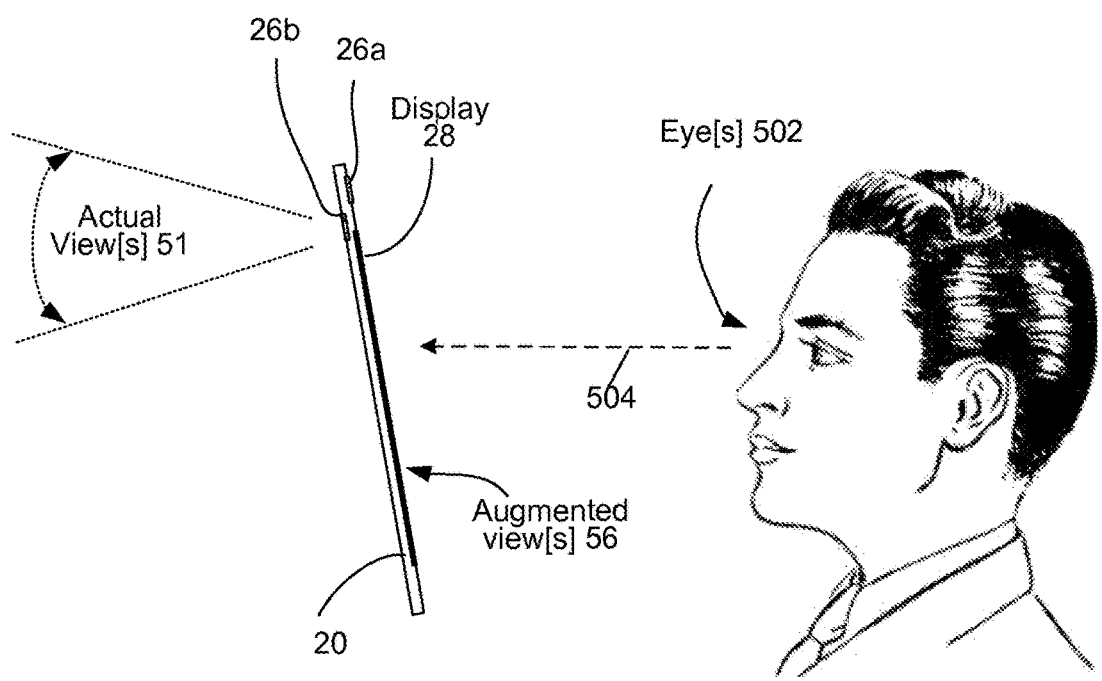
FIG. 5B shows a side view of the user 52 of FIG. 5A using the tablet computer 20.

In order to further facilitate understanding of the various operations, processes, and systems to be described herein, certain concepts and terms will now be introduced with references to FIGS. 5A and 5B. In particular, FIG. 5A is a top-down view of an AR user 52 (herein simply "user 52") using an AR device 70\* that is in the form of a tablet computer 20 (as illustrated in FIGS. 2A and 2B) at different points or increments in time. Note that although the AR device illustrated here is in the form of a tablet computer 20, the concepts to be introduced here as well as in FIG. 5B will apply to other AR devices having other form factors (e.g., a smartphone, a video goggle, electronic glasses, and so forth).

Referring back to FIG. 5A which shows user 52 viewing actual views 51 of actual scenes from the real (physical) environment 50 surrounding the AR device (e.g., tablet computer 20). The actual views 51 of the actual scenes of the real environment 50 may be captured by a camera through lens 26b at different points in time. That is, an actual scene from the real environment 50 is not only location specific but is also time specific. In this example, the actual views 51 captured by the camera of the tablet computer 20 is the view of a store front. Note that a car is illustrated as being present in the real environment 50 and is depicted as moving towards the line of sight (e.g., actual view 51—field of view) of the tablet computer 20. Thus, although the field of view for the camera of the tablet computer 20 is directed to the same location over length of time, the actual views 51 of the location will change over time (e.g., the actual views 51 will change as, for example, the car (or pedestrians) comes into and/or leaves the field of view of the tablet computer 20.

After capturing the actual views 51 through lens 26b, tablet computer 20 may display through a display 28 one or more augmented views 56 (each of which include one or more augmentations). The user 52 may view the one or more augmented views 56 visually presented through the display 28 using his or her eyes 502. The inward-facing camera through lens 26a may track the eyes 502 of the user 52 as the user 52 views the one or more augmented views 56. In particular, the tablet computer 20 through its inward facing camera may track one or more characteristics of the eyes 502 of the user 52, including, for example, eye focus 502, dwell path, dwell time, pupil size and shape, and so forth. In various embodiments, a dwell path is the focus path of one or more eyes 502 of a user 52 as the user 52, views, for example, actual and/or augmented views that may be displayed through an AR device (e.g., tablet computer 20). The dwell path may be defined or identified by tracking the path that focus point of the one or more eyes 502 takes along, for example, an augmented view 56 (or non-augmented or actual view) displayed through the AR device (e.g., tablet computer 20). In contrast, dwell time is the amount of time that a user dwells on (e.g., stares at or focuses on) a, for example, visual object.

Referring now to 5B, which illustrates a side-view of the user 52 using the AR device (e.g., tablet computer 20) as illustrated in FIG. 5A. The display 28 may visually present one or more augmented views 56 based, at least in part, on one or more captured actual views 51. The inward-facing camera of the tablet computer 20 and through lens 26a may track the one or more eyes 504 of the user 52 including, for example, the eye focus 502 of the user 52 as well as the dwell path and/or dwell time of the user 52 in response to the display of one or more augmented views 56.

Turning now to FIGS. 6A, 6B, 6C, 6D, 6E, 6F, 6G, 6H, 6I, 6K, and 6M, that illustrate exemplary actual views and augmented views of various scenes from the real environment that may be provided by the computationally implemented methods, systems, circuitry, articles of manufacture, and computer program products in accordance with various embodiments. The exemplary actual views and the exemplary augmented views illustrated in these figures are provided in order to facilitate understanding of various concepts that will be described in connection with the various operations and processes to be discussed herein. Note that in various embodiments at least the augmented views (e.g., augmented views 60b, 60c, 60d, 60e, 60f, 60g, 60i, 60k and 60m) illustrated in FIGS. 6B, 6C, 6D, 6E, 6F, 6G, 6I, 6K and 6M may be presented by the AR device 70* (e.g., AR device 70' or AR device 70") of FIG. 7A or 7B.

Referring particularly now to FIG. 6A, which illustrates an actual view 60a of a scene from the real environment. In this case, the actual scene 60a is scene of a beach. Based on the actual view 60a, the AR device 70* of FIG. 7A or 7B may generate an augmented view 60b as illustrated in FIG. 6B. The augmented view 60b includes an augmentation 64a (configured to be in the shape of a sundial) that may have been included in the augmented view 60b based on one or more visibility rules that the AR device 70* may be executing. Visibility rules are directives or instructions that define when or how an augmentation may be presented. For example, in some cases, a visibility rule may require a specific augmentation to be included into an augmented view when a particular "anchor" visual cue is detected as being present in the corresponding actual scene of the real environment that the augmented view is based on. Other visibility rules may direct the inclusion of an augmentation into an augmented view based on the location and/or orientation of the AR device 70*.

FIG. 6C illustrates an augmented view 60c of the actual scene (e.g., actual view 60a) depicted in FIG. 6A. Note that augmented view 60c is essentially the same as the augmented view 60b of FIG. 6B except that a dwell path 66a of one or more eyes of a user 52 in response to and during and/or following the display of the augmented view 60c has been overlaid on top of the augmented view 60c. Also illustrated in FIG. 6C is the focus point of the one or more eyes of the user 52, which will now be referred to as eye focus (e.g., eye focus 65a in FIG. 6C)

Based on the detected reaction (e.g., dwell path 66a as illustrated in FIG. 6C) of a user 52 to the display of the augmented view 60b (see FIG. 6B) including the augmentation 64a, the AR device 70* may visually present the augmented view 60d of FIG. 6D. The augmented view 60d includes an augmentation 64b having a particular format (e.g., a shape of a soft drink bottle) and being placed at a particular location (e.g., right bottom corner of the augmented view 60d and on top of the beach) in the augmented view 60d. The format and/or placement of the augmentation 64b may be based on the detected reaction of the user (e.g., eye focus and dwell path, perspiration level of the user 52 based on detected skin characteristics, etc.).

FIG. 6E illustrates another example augmented view 60e of the beach scene illustrated in FIG. 6A. The example augmented view 60e includes an augmentation 64c that is an informational augmentation indicating environmental information (that shows 90 percent chance of precipitation). Illustrated also in FIG. 6E is the dwell path 66b and the eye focus 65b (e.g., eye focus point) of the user 52 during and/or following the display of the augmented view 60e. The example dwell path 66b of the user 52 that is directed skywards in FIG. 6E may have been as result of the user seeing that the augmentation 64c indicating a 90 percent chance of precipitation.

FIG. 6F illustrates another example augmented view 60f that may be generated by the AR device 70* of FIG. 7A or 7B. The augmented view 60f may have been generated based on the detected reaction (e.g., dwell path 66b of FIG. 6E) of the user 52 to the display of the augmented view 60e of FIG. 6E. Note that augmented view 60f may be a different augmented view from the augmented view 60e of FIG. 6E (e.g., augmented view 60e may have presented on Monday while augmented view 60f may have been presented two days later on Wednesday looking at the same location but with similar conditions). Augmented view 60f includes augmentation 64cc (which includes similar but not the same environmental information as augmentation 64c of FIG. 6E) and augmentation 64d (which may have been formatted and selectively placed in the top right corner of the augmented view 60f based on the reaction of the user to the augmented view 60e of FIG. 6E). The augmentation 64d being in the shape of a plane towing a banner. Augmentation 64cc includes an augmentation aspect 67a in the form of a darkened or darkly colored boarder. FIG. 6F also illustrates eye focus 65c of the one or more eyes of the user 52 being on the augmentation aspect 67a.

Figure 6G:
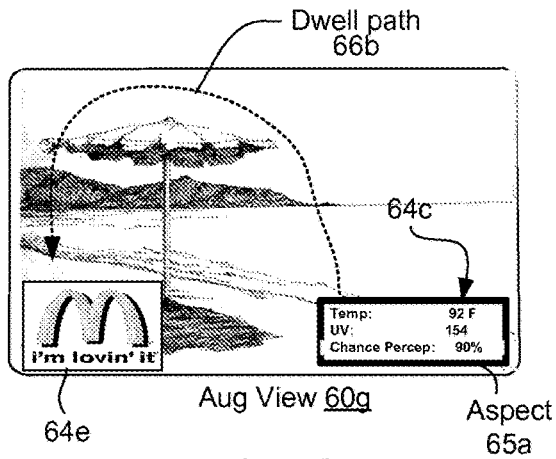

Referring now to FIG. 6G illustrates another example augmented view 60g of the beach scene illustrated in FIG. 6A. In particular, FIG. 6G illustrates the dwell path 66b of one or more eyes of a user 52 between augmentation 64c and augmentation 64e. The roundabout path of the dwell path 66b may be as result of the precipitation information included in the augmentation 64c. The detected dwell path 66b may, in some embodiments, cause the AR device 70* to selectively insert any additional augmentations along (or not along) the detected dwell path 66b.

Figure 6H:
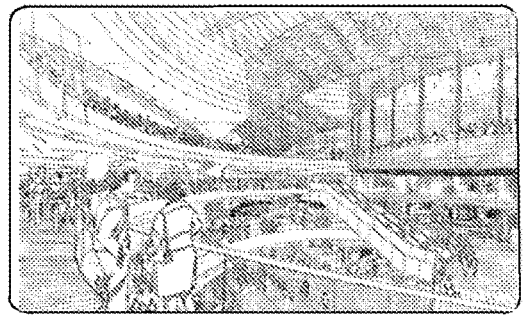
Figure 6I:
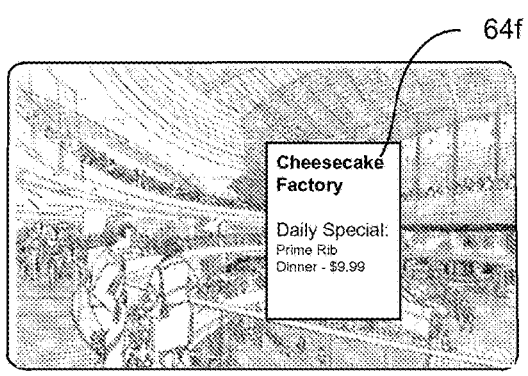

FIG. 6H illustrates an example actual view 60h of an interior scene from a shopping mall as captured by, for example, the AR device 70* of FIG. 7A or 7B. Referring now to FIG. 6I, which illustrates an augmented view 60i of the actual view 60h illustrated in FIG. 6H. Included in the augmented view is an augmentation 64f, which is an informational augmentation that provides menu information of a restaurant that is located in the shopping mall.

Figure 6K:
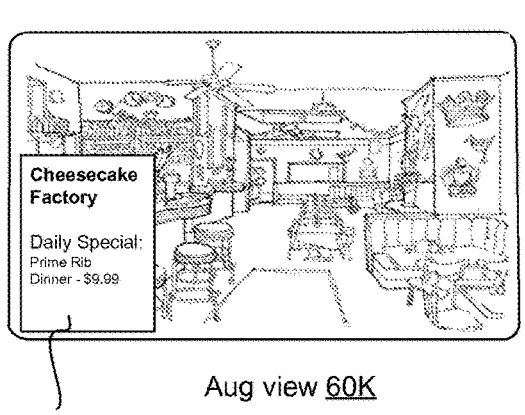

Turning now to FIG. 6K, which illustrates the augmented view 60k of the interior of the restaurant that was referred to above. Included in the augmented view 60k is an augmentation 64g, which contains the same information as the augmentation 64f of FIG. 6I. Note, however, the augmentation 64g has been placed at the left bottom corner of the augmented view 60k rather than in the center of the augmented view 60k as was the case in the augmented view 60i of FIG. 6I. In some cases, the placement of the augmentation 64g at the corner of the augmented view 60k may be based on the user 52 reaction to the augmented view 60i of FIG. 6I. That is, the AR device 70* may have detected that the user 52 showed very little interest (e.g., very low dwell time or lack of eye focus) in augmentation 64f because the user may have been, for example, irritated by the placement of the augmentation 64f at the center of the augmented view 60i. As a result, the augmentation 64g was selectively placed at the corner of the augmented view 60k in order to not antagonize the user 52.

Figure 6M:
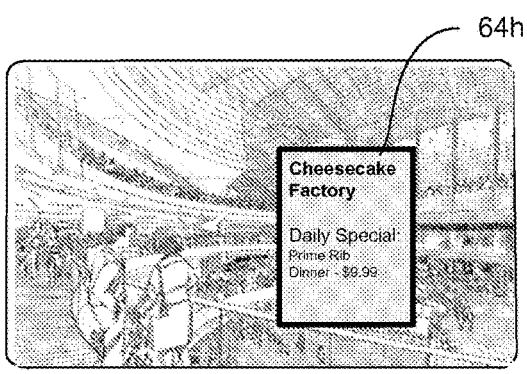

FIG. 6M shows another example augmented view 60m of the interior of a shopping mall as was illustrated in FIG. 6H. The augmented view 60m includes an augmentation 64h that contains similar information as augmentation 64f of FIG. 6I. Note, however, augmentation 64h has a different format (e.g., different coloring and a bolder border) from the format of augmentation 64f. In various embodiments, the augmentation 64h may be as a result of the AR device 70* detecting user 52 lack of interest of the original augmentation 64f of FIG. 6I. Note that a more detailed discussion related to FIGS. 6A, 6B, 6C, 6D, 6E, 6F, 6G, 6H, 6I, 6K and 6M will be provided with respect to the operations and processes to be described herein.

Referring now to FIGS. 7A and 7B, illustrating two block diagrams representing two different implementations of an augmented reality (AR) device 70* that can execute the operations and processes to be described herein. In particular, and as will be further described herein, FIG. 7A illustrates an AR device 70' that is the "hardwired" or "hard" implementation of an AR device 70' that can implement the operations and processes to be described herein. The AR device 70' may include certain logic modules including, for example, a user reaction ascertaining module 102', a user reaction associating module 104', a non-augmented view presenting module 105', an augmented view presenting module 106', a correlation result relaying module 107', and/or an augmentation acquiring module 108' (which may further include a visibility rule acquiring module 109') that are implemented using purely hardware or circuitry components (e.g., application specific integrated circuit (or ASIC).

In contrast, FIG. 7B illustrates an AR device 70" that is the "soft" implementation of the AR device 70' of FIG. 7A in which certain logic modules including a user reaction ascertaining module 102", a user reaction associating module 104", a non-augmented view presenting module 105", an augmented view presenting module 106", a correlation result relaying module 107", and an augmentation acquiring module 108" (which may further include a visibility rule acquiring module 109") are implemented using electronic circuitry (e.g., one or more processors including one or more microprocessors, controllers, etc.) executing one or more programming instructions (e.g., software).

The embodiments of the AR device 70* illustrated in FIGS. 7A and 7B are two extreme implementations of the AR device 70* in which all of the logic modules (e.g., the user reaction ascertaining module 102', the user reaction associating module 104', the non-augmented view presenting module 105', the augmented view presenting module 106', the correlation result relaying module 107', and the augmentation acquiring module 108' including the visibility rule acquiring module 109') are implemented using purely hardware solutions (e.g., circuitry such as ASIC) as illustrated in FIG. 7A or in which all of the logic modules (e.g., the user reaction ascertaining module 102", the user reaction associating module 104", the non-augmented view presenting module 105", the augmented view presenting module 106", the correlation result relaying module 107", and the augmentation acquiring module 108" including the visibility rule acquiring module 109") are implemented using software solutions (e.g., programmable instructions being executed by hardware such as one or more processors) as illustrated in FIG. 7B. Since, there are many ways of combining hardware, software, and/or firmware in order to implement the various logic modules (e.g., the user reaction ascertaining module 102*, the user reaction associating module 104*, the non-augmented view presenting module 105*, the augmented view presenting module 106*, the correlation result relaying module 107*, and the augmentation acquiring module 108* including the visibility rule acquiring module 109*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of AR device 70* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 7A, which illustrates a block diagram of an AR device 70' that includes a user reaction ascertaining module 102', a user reaction associating module 104', a non-augmented view presenting module 105', an augmented view presenting module 106', a correlation result relaying module 107', and an augmentation acquiring module 108' (which further includes a visibility rule acquiring module 109'), one or more processors 116 (e.g., one or more microprocessors), a memory 114 that may store one or more applications 160 (e.g., an operating system (OS) 162, one or more facial recognition applications 163, one or more visual object recognition applications 164 (e.g., for visually recognizing one or more items that are visible in a scene from the real physical environment), one or more voice recognition applications 165, one or more sound recognition applications 166 (e.g., an application for recognizing/identifying sounds other than voice such as the sound of a train passing or waves crashing along a shoreline), and/or one or more personal information manager (PIM) applications 168), one or more augmentations 170, and one or more visibility rules 171 (e.g., directives for when and how augmentations are to be presented), a user interface 110 (e.g., a display, a mouse, a microphone, etc.), a network interface 112 (e.g., a network interface card or "NIC"), and one or more sensors 120. Although not depicted, the memory 114 may further include other types of application not depicted in FIG. 7A including, for example, communication applications such as an email application and/or an instant messaging (IM) application.

In various embodiments, the user reaction ascertaining module 102' of FIG. 7A is a logic module that may be designed to, among other things, ascertain one or more user reactions of a user reacting to a display of an augmented view of an actual scene from a real environment, the displayed augmented view having included one or more augmentations 170.

In contrast, the user reaction associating module 104' of FIG. 7A is a logic module that may be configured to associate the one or more user reactions with at least one or more aspects associated with the one or more augmentations 170 that were displayed with the augmented view.

Turning now to FIG. 7B, which illustrates a block diagram of another AR device 70" that can implement the operations and processes to be described herein. As indicated earlier, the AR device 70" in FIG. 7B is merely the "soft" version of the AR device 70' of FIG. 7A because the various logic modules: the user reaction ascertaining module 102", the user reaction associating module 104", the non-augmented view presenting module 105", the augmented view presenting module 106", the correlation result relaying module 107", and the augmentation acquiring module 108" including the visibility rule acquiring module 109" are implemented using software and one or more processors 116 (e.g., one or more microprocessors or controllers) executing the software (e.g., computer readable instructions 152) rather than being implemented using purely hardware (e.g., ASIC) as was the case in the AR device 70' of FIG. 7A. Thus, the user reaction ascertaining module 102", the user reaction associating module 104", the non-augmented view presenting module 105", the augmented view presenting module 106", the correlation result relaying module 107", and the augmentation acquiring module 108" including the visibility rule acquiring module 109" of FIG. 7B may be designed to execute the same functions as the user reaction ascertaining module 102', the user reaction associating module 104', the non-augmented view presenting module 105', the augmented view presenting module 106', the correlation result relaying module 107', and the augmentation acquiring module 108' including the visibility rule acquiring module 109' of FIG. 7A. The AR device 70", as illustrated in FIG. 7B, has other components (e.g., user interface 110, network interface 112, and so forth) that are the same or similar to the other components included in the AR device 70' of FIG. 7A. Note that in the embodiment of the AR device 70\* illustrated in FIG. 7B, the various logic modules (e.g., the user reaction ascertaining module 102", the user reaction associating module 104", and so forth) may be implemented by the one or more processors 116 (or other types of circuitry such as field programmable gate arrays or FPGAs) executing one or more computer readable instructions 152 stored in memory 114.

In various embodiments, the memory 114 of the AR device 70' of FIG. 7A and the AR device 70" of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 8A:
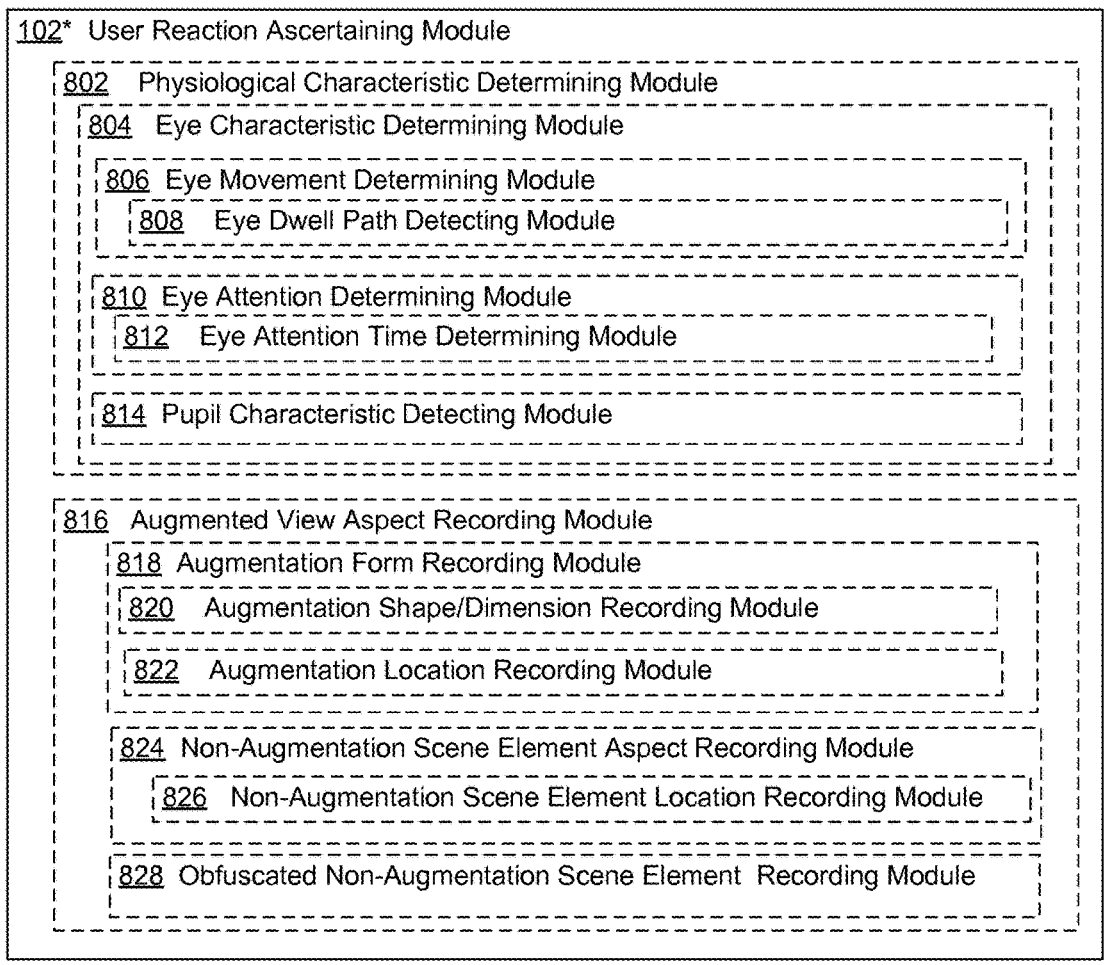
FIG. 8A shows another perspective of the user reaction ascertaining module 102* of FIGS. 7A and 7B (e.g., the user reaction ascertaining module 102' of FIG. 7A or the user reaction ascertaining module 102" of FIG. 7B) in accordance with various implementations.

Turning now to FIG. 8A illustrating a particular implementation of the user reaction ascertaining module 102\* (e.g., the user reaction ascertaining module 102' or the user reaction ascertaining module 102") of FIGS. 7A and 7B. As illustrated, the user reaction ascertaining module 102\* may include one or more sub-logic modules in various alternative implementations. For example, in various embodiments, the user reaction ascertaining module 102\* may include a physiological characteristic determining module 802 that includes an eye characteristic determining module 804, which may further include an eye movement determining module 806 (which may further include an eye dwell path detecting module 808), an eye attention determining module 810 (which may further include an eye attention time determining module 812), and/or a pupil characteristic detecting module 814, and/or an augmented view aspect recording module 816 that includes an augmentation form recording module 818 (which may further include an augmentation shape/dimension recording module 820 and/or an augmentation location recording module 822), a non-augmentation scene element aspect recording module 824 (which may further include a non-augmentation scene element location recording module 826), and/or an obfuscated non-augmentation scene element recording module 828. Specific details related to the user reaction ascertaining module 102\* as well as the above-described sub-modules of the user reaction ascertaining module 102\* will be provided below with respect to the operations and processes to be described herein.

FIG. 8B illustrates a particular implementation of the user reaction associating module 104\* (e.g., the particular implementation of the user reaction associating module 104' or the particular implementation of the user reaction associating module 104") of FIG. 7A or 7B. As illustrated, the user reaction associating module 104\* may include one or more sub-logic modules in various alternative embodiments. For example, in various embodiments, the user reaction associating module 104\* may include a relationship identifying module 830 (which may further include a relationship logging module 832) and/or a physiological characteristic associating module 834 that may further include an eye characteristic associating module 836, which may further include an eye movement associating module 838 (which may further include a dwell path associating module 840), an eye focus associating module 842 (which may further include a dwell time associating module 844), and/or a pupil characteristic associating module 846 (which may further include a pupil shape/size associating module 848). Specific details related to the user reaction associating module 104* as well as the above-described sub-modules of the user reaction associating module 104* will be provided below with respect to the operations and processes to be described herein.

FIG. 8C illustrates the various types of user interface devices that may be part of the user interface 110 of the AR device 70* of FIG. 7A or 7B. In various embodiments, the user interface 110 may include one or more display monitors 852 (e.g., a touchscreen, a liquid crystal display (LCD), a see-through display, and/or other types of display monitors), one or more visual capturing devices 854 (e.g., one or more video or web cameras, digital cameras, and/or other types of cameras 870—see FIG. 8D), one or more audio speakers 856, one or more audio input devices 858 (e.g., one or more microphones)—see also audio sensors 872 of FIG. 8D, and/or one or more keyboard/keypads 860. Although not depicted, other types of user interfaces 110 may be included with the user interface 110 in various alternative embodiments including, for example, a mouse or other types of user input/output devices.

Figure 8D:
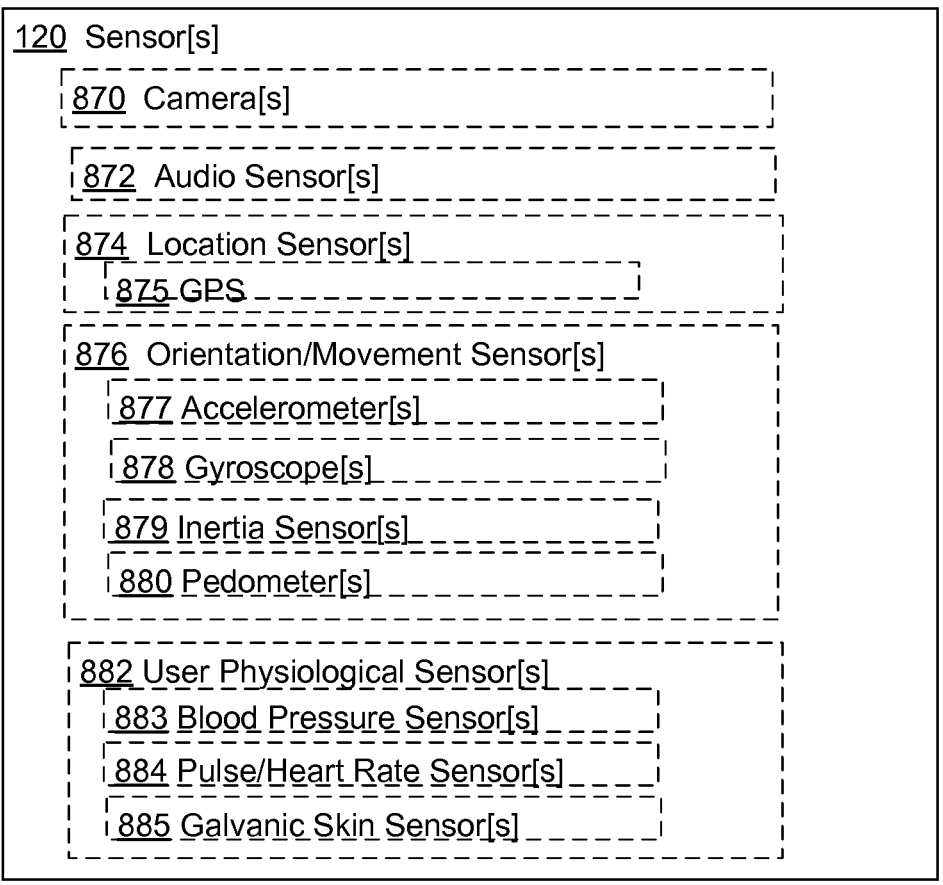
FIG. 8D shows another perspective of the one or more sensors 120 of FIGS. 7A and 7B.

FIG. 8D illustrates at least some of the various types of sensors 120 that may be included with the AR device 70* (e.g. the AR device 70' of FIG. 7A or the AR device 70" of FIG. 7B). As illustrated, the one or more sensors 120 that may be included with the AR device 70* may include one or more cameras 870 (note that the one or more cameras 870 may be the same as the one or more visual capturing devices 854 described above with respect to the user interface 110), one or more audio sensors 872 (see also audio input device[s] 858 described above), one or more location sensors 874 such as one or more global positioning systems (GPSs) 875, one or more orientation/movement sensors 876 (which may comprise one or more accelerometers 877, one or more gyroscopes 878, one or more inertia sensors 879, one or more pedometers 880), and/or one or more user physiological sensors 882 (e.g., one or more blood pressure sensors 883, one or more pulse/heart rate sensors 884, one or more galvanic skin sensors 885). Note that with respect to the one or more location sensors 874, the one or more orientation/movement sensors 876, and/or one or more user physiological sensors 882, these sensor devices may include other types of sensors not depicted in FIG. 8D. For example the one or more location sensors 874 in some alternative implementations may include a location sensor 874 that employs triangulation techniques and signals from cellular towers to determine location while the one or more user physiological sensors 882 may include in some alternative embodiments one or more blood pressure sensors 883 and/or other types of sensors 120.

Figure 9:
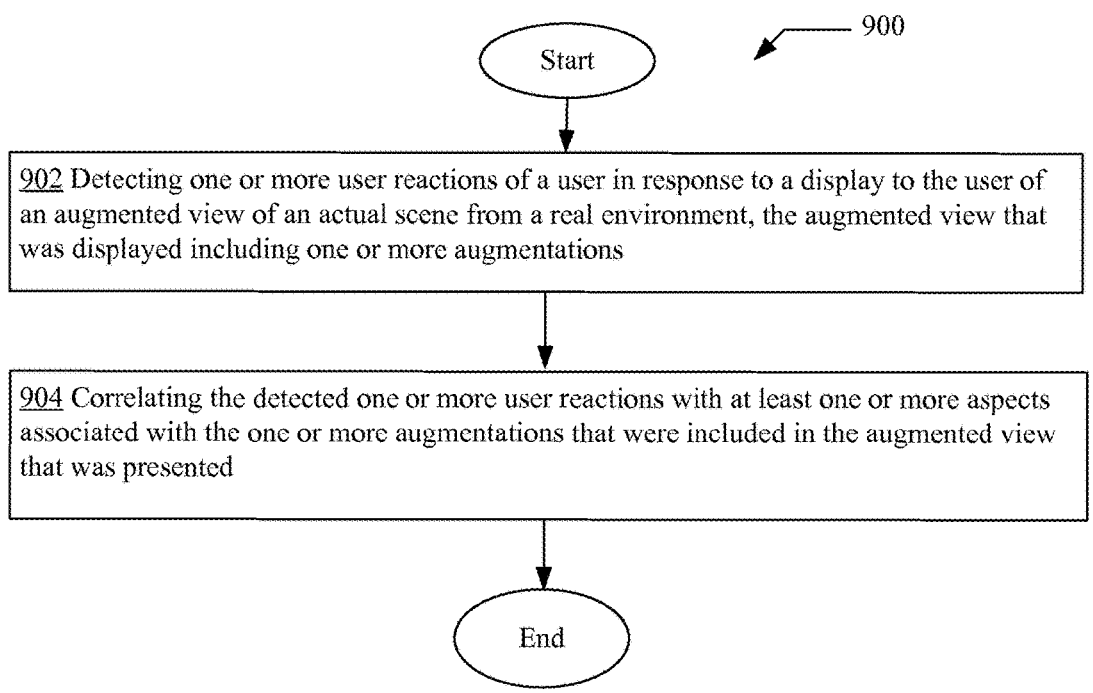
FIG. 9 is a high-level logic flowchart of a process, e.g., operational flow 900, according to some embodiments.

A more detailed discussion related to the AR device 70* (e.g., the AR device 70' of FIG. 7A or the AR device 70" of FIG. 7B) discussed above will now be provided with respect to the processes and operations to be described herein. FIG. 9 illustrates an operational flow 900 representing example operations for, among other things, ascertaining a user reaction to a display of an augmented view of an actual scene from the real physical environment, the augmented view to be displayed including one or more augmentations; and associating the user reaction to one or more aspects of the one or more augmentations. In various implementations, the results of these operations (e.g., association or correlation of the user reaction with the one or more aspects of the one or more augmentations) may be used in order to, for example, optimally format augmentations that may be displayed in subsequent augmented views.

In FIG. 9 and in the following figures that include various examples of operational flows, discussions and explanations will be provided with respect to the AR device 70* described above and as illustrated in FIGS. 1A, 1B, 2A, 2B, 3A, 3B, 4A, 4B, 7A, 7B, 8A, 8B, 8C, and 8D, and/or with respect to other examples (e.g., as provided in FIGS. 5A, 5B, 6A, 6B, 6C, 6D, 6E, 6F, 6G, 6H, 6I, 6K, and 6M) and contexts. However, it should be understood that the operational flows may be executed in a number of other environments and contexts, and/or in modified versions of FIGS. 1A, 1B, 2A, 2B, 3A, 3B, 4A, 4B, 5A, 5B, 6A, 6B, 6C, 6D, 6E, 6F, 6G, 6H, 6I, 6K, 6M, 7A, 7B, 8A, 8B, 8C, and 8D. Also, although the various operational flows are presented in the sequence(s) illustrated, it should be understood that the various operations may be performed in other orders other than those which are illustrated, or may be performed concurrently.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 9 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

More particularly, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated FIG. 9 as well as the other operations to be described herein may be performed by at least one of a machine, an article of manufacture, or a composition of matter.

In any event, after a start operation, the operational flow 900 of FIG. 9 may move to a user reaction detecting operation 902 for detecting one or more user reactions of a user in response to a display to the user of an augmented view of an actual scene from a real environment, the augmented view that was displayed including one or more augmentations. For instance, and as illustration, the user reaction ascertaining module 102* of FIG. 7A or 7B (e.g., the user reaction ascertaining module 102' of FIG. 7A or the user reaction ascertaining module 102" of FIG. 7B) detecting or ascertaining one or more user reactions (e.g., ocular or facial reactions) of a user 52 (see FIGS. 5A and 5B) in response to a display to the user 52 of an augmented view 56 (see FIG. 5A or 5B) of an actual scene (e.g., actual view 51 of FIG. 5A or 5B) from a real environment 50, the augmented view 56 that was displayed including one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

As further illustrated in FIG. 9, operational flow 900 may also include a user reaction correlating operation 904 for correlating the detected one or more user reactions with at least one or more aspects associated with the one or more augmentations that were included in the augmented view that was presented. For instance, the user reaction associating module 104* (e.g., the user reaction associating module 104' of FIG. 7A or the user reaction associating module 104" of FIG. 7B) of the AR device 70* correlating the detected one or more user reactions of a user 52 (e.g., eye movements and/or dwell time of the one or more eyes of the user 52 with respect to the one or more augmentations included in the displayed augmented view 56, and/or other physiological characteristics of the user 52 that may indicate, for example, mental state of the user 52) with at least one or more aspects associated with the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) that were included in the augmented view 56 that was presented. In various implementations, the correlating of the detected one or more user reactions of the user 52 with the at least one or more aspects associated with the one or more augmentations may actually involve the associating or linking of the detected one or more user reactions of the user 52 with the at least one or more aspects associated with the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M). Note that the various correlating operations to be described herein may involve associating or linking of two variables (e.g., associating or linking of one or more augmentations that were displayed to a user with one or more user reactions (e.g., eye focus or movements) that were detected proximate to (e.g., sensed during and/or following) the display of the one or more augmentations.

Figure 10A:
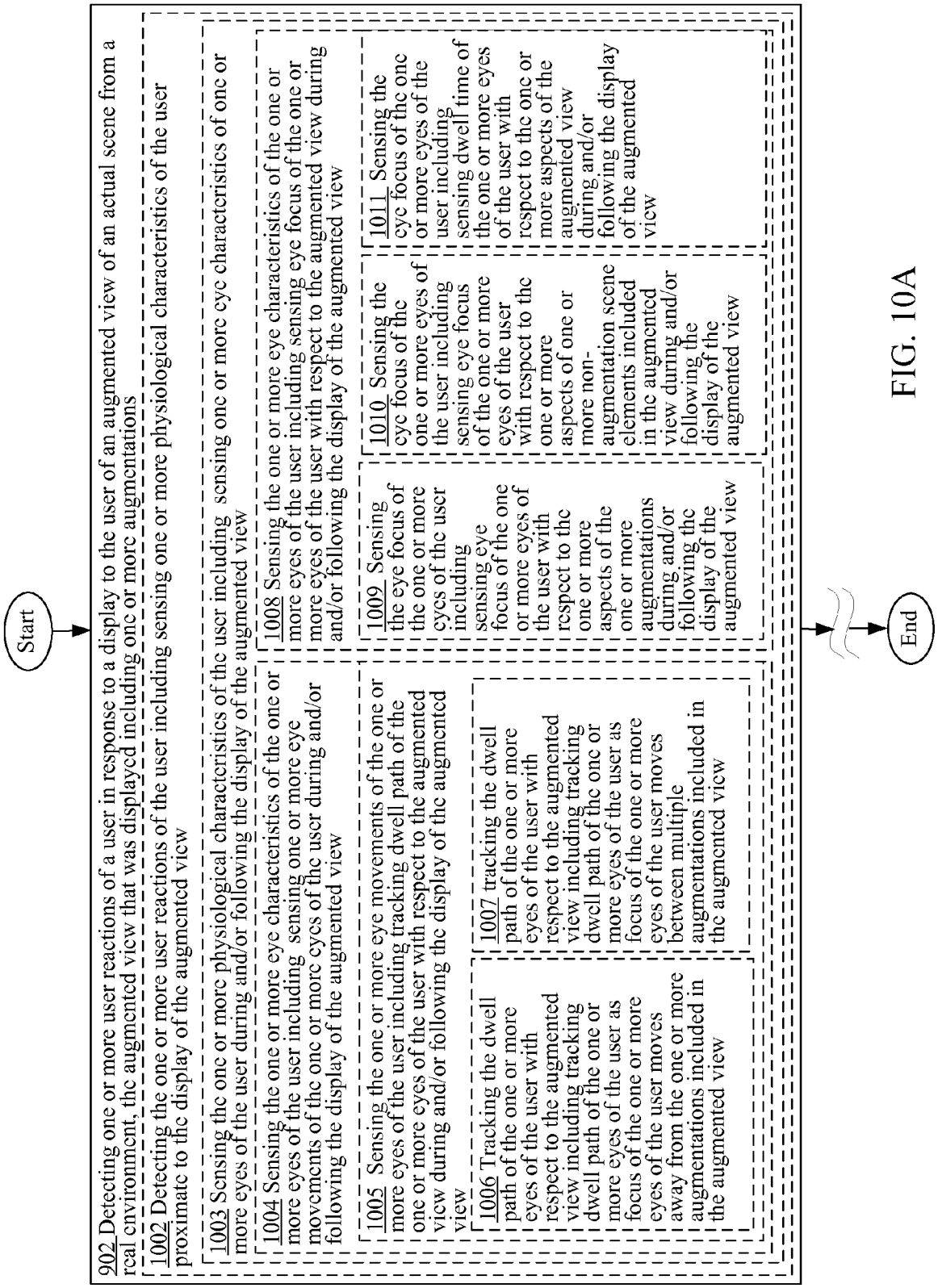
FIG. 10A is a high-level logic flowchart of a process depicting alternate implementations of the user reaction detecting operation 902 of FIG. 9.
Figure 10B:
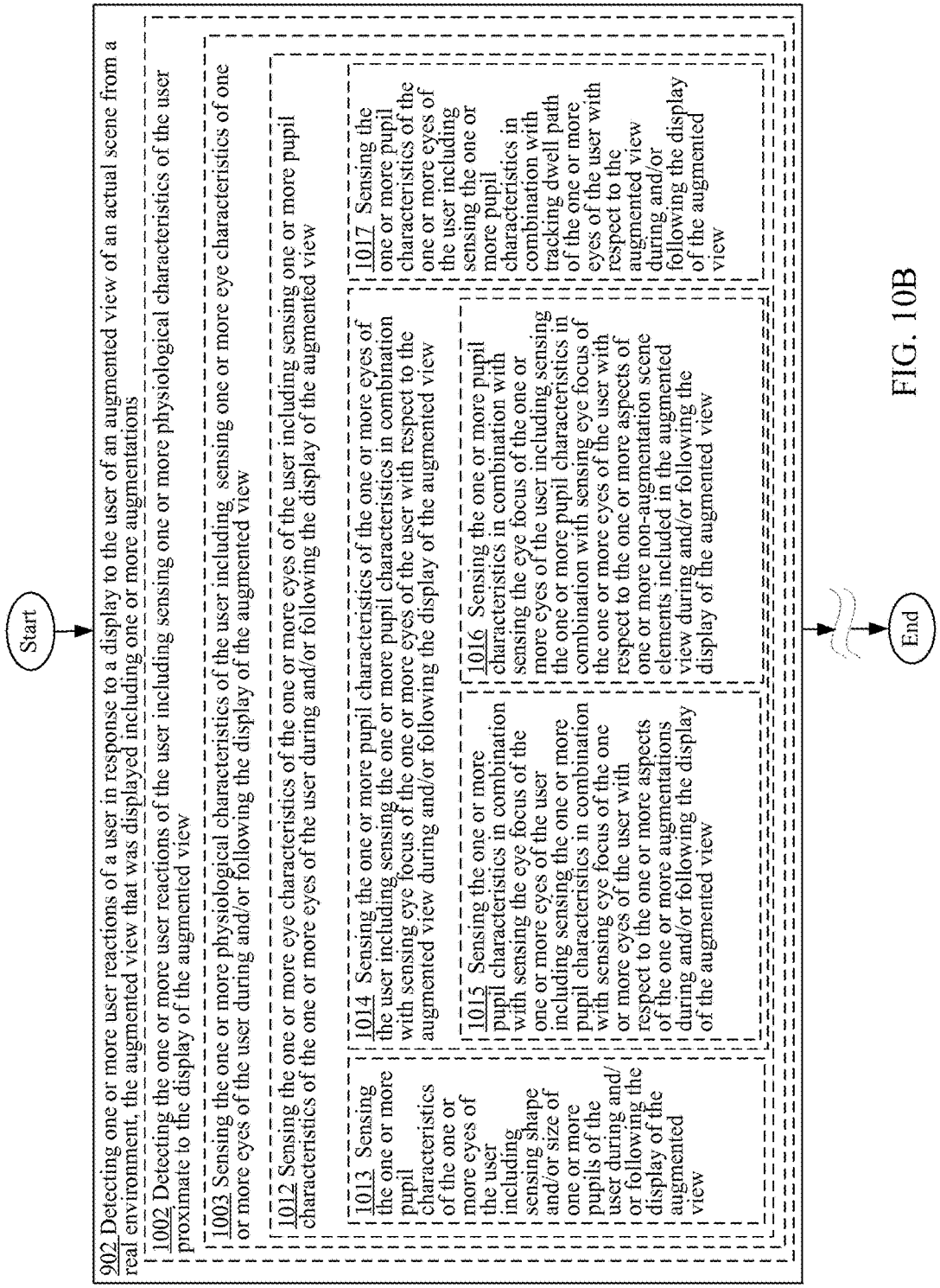
FIG. 10B is a high-level logic flowchart of a process depicting alternate implementations of the user reaction detecting operation 902 of FIG. 9.
Figure 10C:
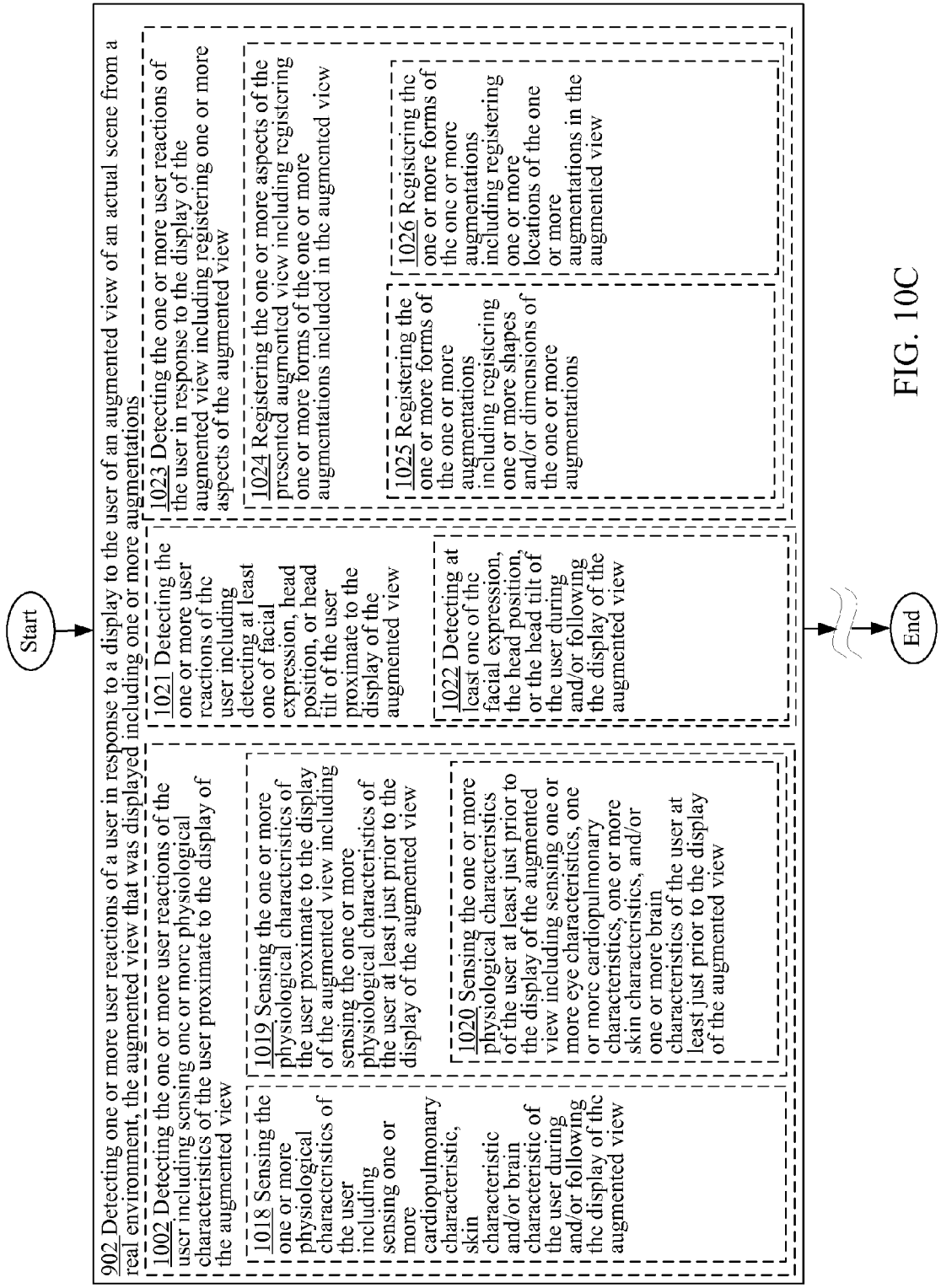
FIG. 10C is a high-level logic flowchart of a process depicting alternate implementations of the user reaction detecting operation 902 of FIG. 9.

As will be described below, the user reaction detecting operation 902 and the user reaction correlating operation 904 of FIG. 9 may be executed in a variety of different ways in various alternative implementations. FIGS. 10A, 10B, 10C, and 10D, for example, illustrates at least some of the alternative ways that the user reaction detecting operation 902 of FIG. 9 may be executed in various alternative implementations. For example, FIGS. 10A, 10B, and 10C illustrate how various types of user reactions that may be detected (e.g., ascertained) through the user reaction detecting operation 902 of FIG. 9 in various alternative implementations. In some cases, for example, the user reaction detecting operation 902 may include an operation 1002 for detecting the one or more user reactions of the user including sensing one or more physiological characteristics of the user proximate to the display of the augmented view as illustrated in FIG. 10A. For instance, the physiological characteristic determining module 802 (see FIG. 8A) of the AR device 70* (e.g., the AR device 70' of FIG. 7A or the AR device 70" of FIG. 7B) detecting the one or more user reactions of the user 52 including sensing (e.g., determining) one or more physiological characteristics (e.g., ocular characteristics. galvanic skin response, blood pressure, and/or pulse rate) of the user 52 proximate (e.g., during and/or immediately after) to the display of the augmented view (see, for example, augmented view 60b of FIG. 6B).

As further illustrated in FIG. 10A, operation 1002 may additionally include one or more additional operations in various alternative implementations including in some cases an operation 1003 for sensing the one or more physiological characteristics of the user including sensing one or more eye characteristics of one or more eyes of the user during and/or following the display of the augmented view. For instance, the physiological characteristic determining module 802 including the eye characteristic determining module 804 (see FIG. 8A) of the AR device 70* of FIG. 7A or 7B sensing the one or more physiological characteristics of the user 52 when the eye characteristic determining module 804 senses (e.g., visually or optically determining) one or more eye characteristics of one or more eyes of the user 52 during and/or immediately following the display of the augmented view (e.g., augmented view 60b, 60d, 60e, 60f, 60g, 60i, 60k, or 60m of FIG. 6B, 6D, 6E, 6F, 6G, 6I, 6K, or 6M).

In various implementations, operation 1003 may further include an operation 1004 for sensing the one or more eye characteristics of the one or more eyes of the user including sensing one or more eye movements of the one or more eyes of the user during and/or following the display of the augmented view. For instance, the eye characteristic determining module 804 including the eye movement determining module 806 (see FIG. 8A) of the AR device 70* of FIG. 7A or 7B sensing (e.g., determining) the one or more eye characteristics of the one or more eyes of the user when the eye movement determining module 806 senses one or more eye movements of the one or more eyes of the user 52 during and/or immediately following the display of the augmented view (see, for example, augmented view 60b, 60d, 60e, 60f, 60g, 60i, 60k, or 60m of FIG. 6B, 6D, 6E, 6F, 6G, 6I, 6K, or 6M). For example, using one or more cameras 870 and using an eye tracking application, movements of one or more eyes of the user 52 may be tracked.

As further illustrated in FIG. 10A, operation 1004 may further include one or more additional operations including in some cases, for example, an operation 1005 for sensing the one or more eye movements of the one or more eyes of the user including tracking dwell path of the one or more eyes of the user with respect to the augmented view during and/or following the display of the augmented view. For instance, the eye movement determining module 806 including the eye dwell path detecting module 808 (see FIG. 8A) of the AR device 70* of FIG. 7A or 7B sensing (e.g., detecting or determining) the one or more eye movements of the one or more eyes of the user 52 when the eye dwell path detecting module 808 tracks dwell path 66a (see FIG. 6C) of the one or more eyes of the user 52 with respect to the augmented view 60b during and/or immediately following the display of the augmented view (see 60b of FIGS. 6B and 6C). Note that FIG. 6C illustrates a dwell path 66a of a user 52 relative to the augmented view 60b (e.g., with respect to the augmented view 60b).

In some cases, operation 1005 may further include an operation 1006 for tracking the dwell path of the one or more eyes of the user with respect to the augmented view including tracking dwell path of the one or more eyes of the user as focus of the one or more eyes of the user moves away from the one or more augmentations included in the augmented view. For instance, the eye dwell path detecting module 808 of the AR device 70* of FIG. 7A or 7B tracking the dwell path 66a (see FIG. 6C) of the one or more eyes of the user 52 with respect to the augmented view 60b (see FIG. 6C) including tracking dwell path 66a of the one or more eyes of the user 52 as focus of the one or more eyes of the user 52 moves away from the one or more augmentations 64a (see the sundial augmentation 64a illustrated in FIGS. 6B and 6C) included in the augmented view 60b.

In some cases, operation 1005 may additionally or alternative include or involve an operation 1007 for tracking the dwell path of the one or more eyes of the user with respect to the augmented view including tracking dwell path of the one or more eyes of the user as focus of the one or more eyes of the user moves between multiple augmentations included in the augmented view as further depicted in FIG. 10A. For instance, the eye dwell path detecting module 808 of the AR device 70* of FIG. 7A or 7B tracking the dwell path 66b (see FIG. 6G) of the one or more eyes of the user 52 with respect to the augmented view 60g (see FIG. 6G) including tracking dwell path 66b of the one or more eyes of the user 52 as focus of the one or more eyes of the user 52 moves between multiple augmentations (e.g., augmentations 64c and 64e of FIG. 6G) included in the augmented view 60g.

As illustrated in FIG. 10A, in some implementations operation 1003 for sensing the one or more physiological characteristics of the user including sensing one or more eye characteristics of one or more eyes of the user during and/or following the display of the augmented view may additionally or alternatively include or involve an operation 1008 for sensing the one or more eye characteristics of the one or more eyes of the user including sensing eye focus of the one or more eyes of the user with respect to the augmented view during and/or following the display of the augmented view. For instance, the eye characteristic determining module 804 including the eye attention determining module 810 (see FIG. 8A) of the AR device 70* of FIG. 7A or 7B sensing the one or more eye characteristics of the one or more eyes of the user 52 when the eye attention determining module 810 senses eye focus 65b (see FIG. 6E) of the one or more eyes of the user 52 with respect to the augmented view 60e (see FIG. 6E) during and/or immediately following the display of the augmented view 60e.

As further illustrated in FIG. 10A, in various implementations operation 1008 may involve one or more additional operations including in some cases an operation 1009 for sensing the eye focus of the one or more eyes of the user including sensing eye focus of the one or more eyes of the user with respect to the one or more aspects of the one or more augmentations during and/or following the display of the augmented view. For instance, the eye attention determining module 810 of the AR device 70* of FIG. 7A or 7B sensing the eye focus of the one or more eyes of the user 52 including sensing eye focus 65c (see FIG. 6F) of the one or more eyes of the user 52 with respect to the one or more aspects 67a (e.g., the boarder or rim of the augmentation 64c of FIG. 6F having a particular color or lighting or flashing pattern) of the one or more augmentations 64c during and/or immediately following the display of the augmented view 60f. Note that in the example illustrated in FIG. 6F, the one or more eyes of the user 52 instead of being focused (e.g., eye focus 65c) on the border of the augmentation 64c may alternatively be focused or dwell on items in the augmented view 60f including, for example, the information contained in the augmentation 64c (which indicates that there is a 90 percent change of precipitation), which may ultimately cause the user 52 to look upward towards the sky as illustrated in FIG. 6E.

In the same or alternative implementations, operation 1008 may additionally or alternatively include an operation 1010 for sensing the eye focus of the one or more eyes of the user including sensing eye focus of the one or more eyes of the user with respect to the one or more aspects of one or more non-augmentation scene elements included in the augmented view during and/or following the display of the augmented view. For instance, the eye attention determining module 810 of the AR device 70* of FIG. 7A or 7B sensing (e.g., detecting or determining) the eye focus of the one or more eyes of the user 52 including sensing eye focus of the one or more eyes of the user 52 with respect to the one or more aspects of one or more non-augmentation scene elements (e.g., the ocean or sky illustrated in FIG. 6F) included in the augmented view 60f (see FIG. 6F) during and/or immediately following the display of the augmented view 60f.

In the same or alternative implementations, operation 1008 may additionally or alternatively include an operation 1011 for sensing the eye focus of the one or more eyes of the user including sensing dwell time of the one or more eyes of the user with respect to the one or more aspects of the augmented view during and/or following the display of the augmented view. For instance, the eye attention determining module 810 including the eye attention time determining module 812 of the AR device 70* of FIG. 7A or 7B sensing the eye focus of the one or more eyes of the user 52 including sensing dwell time of the one or more eyes of the user 52 with respect to the one or more aspects (e.g., augmentation 64f of FIG. 6I) of the augmented view 60i (see FIG. 6I) during and/or immediately following the display of the augmented view 60i. Note that with respect to the example augmented view 60i illustrated in FIG. 6I that may be displayed to the user 52, the user 52 may be bothered by having an augmentation 64f placed at the center of his or her field of view and therefore, may not want to dwell on the augmentation 64f for a long time, but instead, may look away from the augmentation 64f quickly.

Turning now to FIG. 10B, in various implementations, operation 1003 for sensing the one or more physiological characteristics of the user including sensing one or more eye characteristics of one or more eyes of the user during and/or following the display of the augmented view may actually involve or include an operation 1012 for sensing the one or more eye characteristics of the one or more eyes of the user including sensing one or more pupil characteristics of the one or more eyes of the user during and/or following the display of the augmented view. For instance, the eye characteristic determining module 804 including the pupil characteristic detecting module 814 (see FIG. 8A) of the AR device 70* of FIG. 7A or 7B sensing the one or more eye characteristics of the one or more eyes of the user 52 when the pupil characteristic detecting module 814 senses one or more pupil characteristics of the one or more eyes of the user 52 during and/or immediately following the display of the augmented view (e.g., augmented view 60b of FIG. 6B). That is, by sensing the size and shape of the pupils of a user 52, the user's intensity of interest with respect to the augmented view that the user 52 is viewing may ascertained.

As further illustrated in FIG. 10B, in various implementations operation 1012 may further involve one or more additional operations including, in some cases an operation 1013 for sensing the one or more pupil characteristics of the one or more eyes of the user including sensing shape and/or size of one or more pupils of the user during and/or following the display of the augmented view. For instance, the pupil characteristic detecting module 814 of the AR device 70* of FIG. 7A or 7B sensing using, for example, one or more cameras 870 the one or more pupil characteristics of the one or more eyes of the user 52 including sensing shape and/or size of one or more pupils of the user 52 during and/or immediately following the display of the augmented view (e.g., augmented view 60d of FIG. 6D).

In the same or alternative implementations, the operation 1012 may additionally or alternatively include an operation 1014 for sensing the one or more pupil characteristics of the one or more eyes of the user including sensing the one or more pupil characteristics in combination with sensing eye focus of the one or more eyes of the user with respect to the augmented view during and/or following the display of the augmented view. For instance, the pupil characteristic detecting module 814 and the eye attention determining module 810 of the AR device 70* of FIG. 7A or 7B sensing the one or more pupil characteristics of the one or more eyes of the user 52 including sensing, by the pupil characteristic detecting module 814, of the one or more pupil characteristics of the user 52 in combination with sensing, by the eye attention determining module 810, of the eye focus (see eye focus 65c of FIG. 6F) of the one or more eyes of the user 52 with respect to the augmented view 60f during and/or immediately following the display of the augmented view (e.g., augmented view 60f of FIG. 6F). That is, by sensing the size and shape of the pupils of a user 52 along with sensing what visual item is the user visually focused on, the user's intensity of interest with respect to the visual item (e.g. an augmentation or a non-augmentation visual item) that the user is visually focused on may at least be inferred or estimated.

In some implementations, operation 1014 may further include or involve an operation 1015 for sensing the one or more pupil characteristics in combination with sensing the eye focus of the one or more eyes of the user including sensing the one or more pupil characteristics in combination with sensing eye focus of the one or more eyes of the user with respect to the one or more aspects of the one or more augmentations during and/or following the display of the augmented view. For instance, the pupil characteristic detecting module 814 and the eye attention determining module 810 of the AR device 70* of FIG. 7A or 7B sensing the one or more pupil characteristics in combination with sensing the eye focus of the one or more eyes of the user 52 including sensing, by the pupil characteristic detecting module 814, of the one or more pupil characteristics in combination with sensing, by the eye attention determining module 810, of eye focus of the one or more eyes of the user 52 with respect to the one or more aspects of the one or more augmentations (e.g., augmentation aspect 67a of FIG. 6F, which is the boarder to augmentation 64cc of FIG. 6F) during and/or immediately following the display of the augmented view 60f.

In the same or different implementations, the operation 1014 may additionally or alternatively include an operation 1016 for sensing the one or more pupil characteristics in combination with sensing the eye focus of the one or more eyes of the user including sensing the one or more pupil characteristics in combination with sensing eye focus of the one or more eyes of the user with respect to the one or more aspects of one or more non-augmentation scene elements included in the augmented view during and/or following the display of the augmented view. For instance, the pupil characteristic detecting module 814 and the eye attention determining module 810 of the AR device 70* of FIG. 7A or 7B sensing the one or more pupil characteristics in combination with sensing the eye focus of the one or more eyes of the user 52 including sensing, by the pupil characteristic detecting module 814, of the one or more pupil characteristics in combination with sensing, by the eye attention determining module 810, of eye focus (e.g., eye focus 65b of FIG. 6E) of the one or more eyes of the user 52 with respect to one the or more aspects of one or more non-augmentation scene elements (e.g., the sky illustrated in FIG. 6E) included in the augmented view 60e (see FIG. 6E) during and/or immediately following the display of the augmented view 60e.

In some cases, operation 1012 for sensing the one or more eye characteristics of the one or more eyes of the user including sensing one or more pupil characteristics of the one or more eyes of the user during and/or following the display of the augmented view may actually involve or include one or more additional operations including an operation 1017 for sensing the one or more pupil characteristics of the one or more eyes of the user including sensing the one or more pupil characteristics in combination with tracking dwell path of the one or more eyes of the user with respect to the augmented view during and/or following the display of the augmented view. For instance, the pupil characteristic detecting module 814 and the eye dwell path detecting module 808 of the AR device 70* of FIG. 7A or 7B sensing the one or more pupil characteristics of the one or more eyes of the user 52 including sensing, by the pupil characteristic detecting module 814, of the one or more pupil characteristics of the user 52 in combination with tracking, by the eye dwell path detecting module 808, of the dwell path 66b (see FIG. 6E) of the one or more eyes of the user 52 with respect to the augmented view 60e (see FIG. 6E) during and/or immediately following the display of the augmented view 60e.

Turning now to FIG. 10C, in various implementations, operation 1002 for detecting the one or more user reactions of the user including sensing one or more physiological characteristics of the user proximate to the display of the augmented view may additionally include or involve an operation 1018 for sensing the one or more physiological characteristics of the user including sensing one or more cardiopulmonary characteristic, skin characteristic and/or brain characteristic of the user during and/or following the display of the augmented view. For instance, the physiological characteristic determining module 802 of the AR device 70* of FIG. 7A or 7B sensing the one or more physiological characteristics of the user including sensing one or more cardiopulmonary characteristic, skin characteristic and/or brain characteristic of the user 52 during and/or immediately following the display of the augmented view (e.g., augmented view 60b, 60d, 60e, 60f, 60g, 60i, 60k, or 60m of FIG. 6B, 6D, 6E, 6F, 6G, 6I, 6K, or 6M). In some implementations, such physiological characteristics may be collected and processed in order to infer the mental and/or physical state of the user 52. Based on the determined mental and/or physical state of the user 52, the most appropriate augmentation, as well as its format, may be selected for presentation by for example, the AR device 70*.

In the same or different implementations, operation 1002 may additionally or alternatively include an operation 1019 for sensing the one or more physiological characteristics of the user proximate to the display of the augmented view including sensing the one or more physiological characteristics of the user at least just prior to the display of the augmented view. For instance, the physiological characteristic determining module 802 of the AR device 70* of FIG. 7A or 7B sensing the one or more physiological characteristics of the user proximate to the display of the augmented view including sensing the one or more physiological characteristics (e.g., galvanic skin response, heart rate, and so forth) of the user 52 at least just prior to the display of the augmented view 60b (see FIG. 6B). Such an operation may be executed in some cases in order to, for example, provide baseline physiological characteristics. That is, in order to determine what user physiological characteristic (e.g., changes in user physiological characteristics) can be attributed to the presentation or display of an augmented view (e.g., augmented view 60i of FIG. 6I), the baseline physiological characteristics of the user 52 when the user 52 is not "stimulated" by the augmented view may be determined.

In some cases, operation 1019 may further include an operation 1020 for sensing the one or more physiological characteristics of the user at least just prior to the display of the augmented view including sensing one or more eye characteristics, one or more cardiopulmonary characteristics, one or more skin characteristics, and/or one or more brain characteristics of the user at least just prior to the display of the augmented view. For instance, the physiological characteristic determining module 802 of the AR device 70* of FIG. 7A or 7B sensing the one or more physiological characteristics of the user at least just prior to the display of the augmented view including sensing one or more eye characteristics, one or more cardiopulmonary characteristics, one or more skin characteristics, and/or one or more brain characteristics (e.g., as sensed by a functional near infrared (fNIR) device or functional magnetic resonance imaging (fMRI) device) of the user 52 at least just prior to the display of the augmented view (e.g., augmented view 60b, 60d, 60e, 60f, 60g, 60i, 60k, or 60m of FIG. 6B, 6D, 6E, 6F, 6G, 6I, 6K, or 6M).

In various implementations, the user reaction detecting operation 902 of FIG. 9 may include an operation 1021 for detecting the one or more user reactions of the user including detecting at least one of facial expression, head position, or head tilt of the user proximate to the display of the augmented view as further illustrated in FIG. 10C. For instance, the user reaction ascertaining module 102* of the AR device 70* of FIG. 7A or 7B detecting the one or more user reactions of the user 52 including detecting at least one of facial expression, head position, or head tilt (e.g., as detected using one or more cameras 870, tilt sensors, and/or other sensors) of the user proximate to the display of the augmented view (e.g., augmented view 60b, 60d, 60e, 60f, 60g, 60i, or 60k of FIG. 6B, 6D, 6E, 6F, 6G, 6I, or 6K).

As further illustrated in FIG. 10C, operation 1021 in some implementations may further include or involve an operation 1022 for detecting at least one of the facial expression, the head position, or the head tilt of the user during and/or following the display of the augmented view. For instance, the user reaction ascertaining module 102* of the AR device 70* of FIG. 7A or 7B detecting at least one of the facial expression, the head position, or the head tilt of the user 52 during and/or immediately following the display of the augmented view (e.g., augmented view 60b, 60d, 60e, 60f, 60i, or 60k of FIG. 6B, 6D, 6E, 6F, 6I, or 6K). In some implementations, such an operation may be implemented in order to provide a baseline characteristic of the user 52.

In the same or different implementations, the user reaction detecting operation 902 may additionally or alternatively include an operation 1023 for detecting the one or more user reactions of the user in response to the display of the augmented view including registering one or more aspects of the augmented view. For instance, the user reaction ascertaining module 102* including the augmented view aspect recording module 816 (see FIG. 8A) of the AR device 70* of FIG. 7A or 7B detecting the one or more user reactions (e.g., eye focus or movements) of the user 52 in response by the user 52 to the display of the augmented view (e.g., augmented view 60b, 60d, 60e, 60f, 60g, 60i, or 60k of FIG. 6B, 6D, 6E, 6F, 6G, 6I, or 6K) when the augmented view aspect recording module 816 registers (e.g., records or chronicles) one or more aspects of the augmented view (e.g., augmented view 60b, 60d, 60e, 60f, 60g, 60i, or 60k of FIG. 6B, 6D, 6E, 6F, 6G, 6I, or 6K).

As further depicted in FIG. 10C, in some implementations operation 1023 may further include or involve an operation 1024 for registering the one or more aspects of the presented augmented view including registering one or more forms of the one or more augmentations included in the augmented view. For instance, the augmented view aspect recording module 816 including the augmentation form recording module 818 (see FIG. 8A) of the AR device 70* of FIG. 7A or 7B registering the one or more aspects of the presented augmented view when the augmentation form recording module 818 registers one or more forms (e.g., color, shading, placement in the augmented view, etc.) of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) included in the augmented view (e.g., augmented view 60b, 60d, 60e, 60f, 60g, 60i, 60k, or 60m of FIG. 6B, 6D, 6E, 6F, 6G, 6I, 6K, or 6M).

In some cases, operation 1024 may further include an operation 1025 for registering the one or more forms of the one or more augmentations including registering one or more shapes and/or dimensions of the one or more augmentations. For instance, the augmentation form recording module 818 including the augmentation shape/dimension recording module 820 (see FIG. 8A) of the AR device 70* of FIG. 7A or 7B registering the one or more forms of the one or more augmentations when the augmentation shape/dimension recording module 820 registers one or more shapes and/or dimensions of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

In the same or different implementations, operation 1024 may additionally or alternatively include an operation 1026 for registering the one or more forms of the one or more augmentations including registering one or more locations of the one or more augmentations in the augmented view. For instance, the augmentation form recording module 818 including the augmentation location recording module 222 (see FIG. 8A) of the AR device 70* of FIG. 7A or 7B registering the one or more forms of the one or more augmentations when the augmentation location recording module 222 registers one or more locations of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) in the augmented view (e.g., augmented view 60b, 60d, 60e, 60f, 60g, 60i, 60k, or 60m of FIG. 6B, 6D, 6E, 6F, 6G, 6I, 6K, or 6M).

Figure 10D:
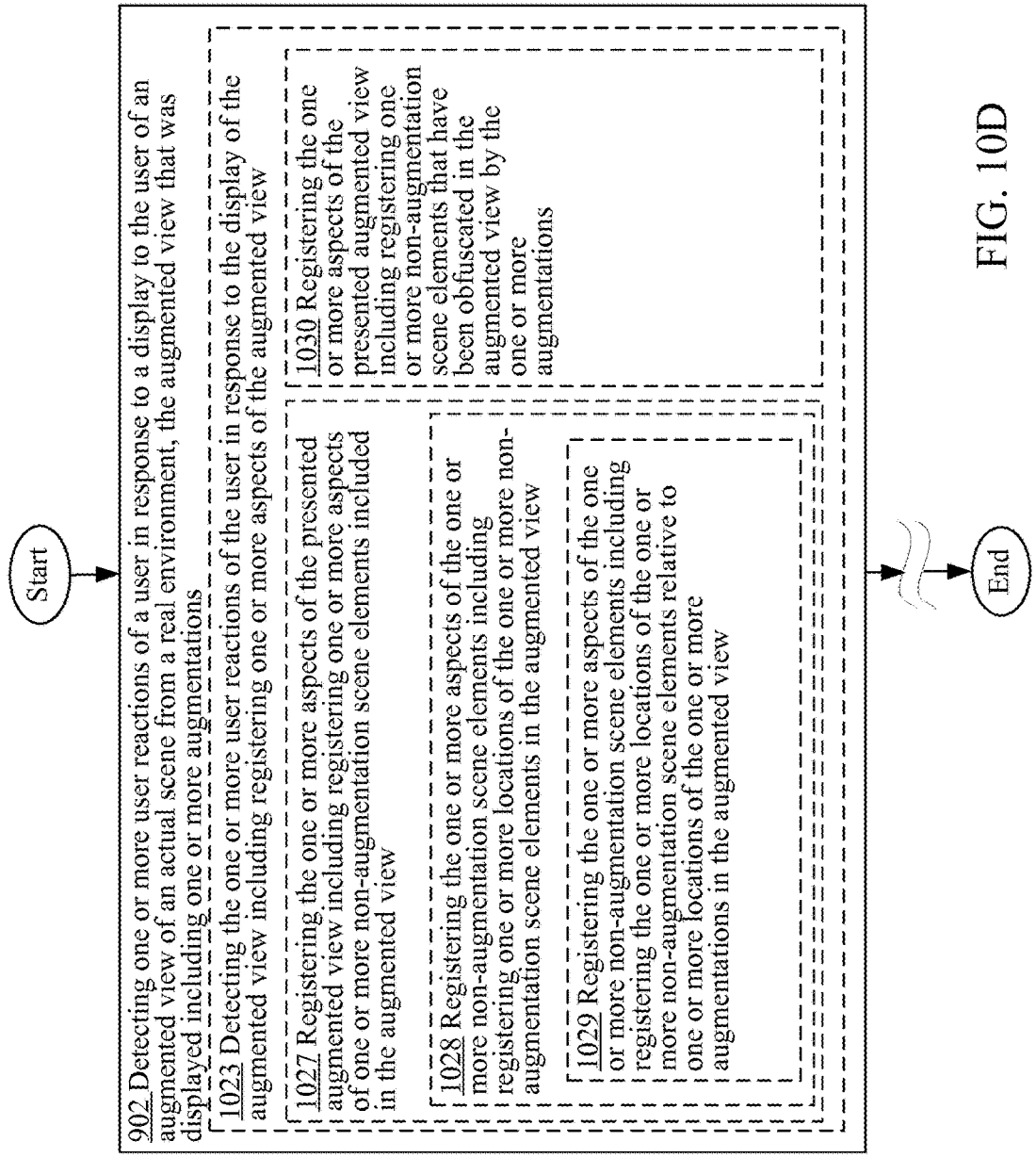
FIG. 10D is a high-level logic flowchart of a process depicting alternate implementations of the user reaction detecting operation 902 of FIG. 9.

Referring now to FIG. 10D, in various implementations the operation 1023 for detecting the one or more user reactions of the user in response to the display of the augmented view including registering one or more aspects of the augmented view may in some cases include an operation 1027 for registering the one or more aspects of the presented augmented view including registering one or more aspects of one or more non-augmentation scene elements included in the augmented view. For instance, the augmented view aspect recording module 816 including the non-augmentation scene element aspect recording module 824 (see FIG. 8A) of the AR device 70*of FIG. 7A or 7B registering the one or more aspects of the presented augmented view when the non-augmentation scene element aspect recording module 824 registers one or more aspects (e.g., color, size, placement in the augmented view, and so forth) of one or more non-augmentation scene elements (e.g., a sign, a store or building front, a street scene, and so forth) included in the augmented view (e.g., augmented view 60b, 60d, 60e, 60f, 60g, 60i, 60k, or 60m of FIG. 6B, 6D, 6E, 6F, 6G, 6I, 6K, or 6M). In various implementations, the registration of non-augmentation scene elements may be needed in order to take into account the context in which the user 52 reacts to an augmentation. That is, a user 52 may react to an augmentation (e.g., augmentation 64a, 64b, 64c, 64cc, 64d, 64e, 64f, 64g, or 64h of FIG. 6B, 6D, 6E, 6F, 6G, 6I, 6K, or 6M) differently depending on the context in which the augmentation is presented. The "context" referred to here is in reference to scene elements such as non-augmentation scene elements that may be presented in the corresponding augmented view (e.g., augmented view 60b, 60d, 60e, 60f, 60g, 60i, 60k, or 60m of FIG. 6B, 6D, 6E, 6F, 6G, 6I, 6K, or 6M).

As further illustrated in FIG. 10D, in various implementations operation 1027 may further include one or more additional operations including, in some cases, an operation 1028 for registering the one or more aspects of the one or more non-augmentation scene elements including registering one or more locations of the one or more non-augmentation scene elements in the augmented view. For instance, the non-augmentation scene element aspect recording module 824 including the non-augmentation scene element location recording module 826 (see FIG. 8A) of the AR device 70*of FIG. 7A or 7B registering the one or more aspects of the one or more non-augmentation scene elements when the non-augmentation scene element location recording module 826 registers one or more locations of the one or more non-augmentation scene elements in the augmented view (e.g., augmented view 60b, 60d, 60e, 60f, 60g, 60i, 60k, or 60m of FIG. 6B, 6D, 6E, 6F, 6G, 6I, 6K, or 6M).

In some cases, operation 1028 may further include an operation 1029 for registering the one or more aspects of the one or more non-augmentation scene elements including registering the one or more locations of the one or more non-augmentation scene elements relative to one or more locations of the one or more augmentations in the augmented view. For instance, the non-augmentation scene element aspect recording module 824 including the non-augmentation scene element location recording module 826 of the AR device 70*of FIG. 7A or 7B registering the one or more aspects of the one or more non-augmentation scene elements when the non-augmentation scene element location recording module 826 registers (e.g., records) the one or more locations of the one or more non-augmentation scene elements relative to one or more locations of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) in the augmented view (e.g., augmented view 60b, 60d, 60e, 60f, 60g, 60i, 60k, or 60m of FIG. 6B, 6D, 6E, 6F, 6G, 6I, 6K, or 6M).

In some cases, operation 1023 may additionally or alternatively include an operation 1030 for registering the one or more aspects of the presented augmented view including registering one or more non-augmentation scene elements that have been obfuscated in the augmented view by the one or more augmentations. For instance, the augmented view aspect recording module 816 including the obfuscated non-augmentation scene element recording module 828 (see FIG. 8A) of the AR device 70*of FIG. 7A or 7B registering the one or more aspects of the presented augmented view when the obfuscated non-augmentation scene element recording module 828 registers one or more non-augmentation scene elements that have been obfuscated (e.g., hidden) in the augmented view (e.g., augmented view 60b, 60d, 60e, 60f, 60g, 60i, 60k, or 60m of FIG. 6B, 6D, 6E, 6F, 6G, 6I, 6K, or 6M) by the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M). Such an operation may be particularly beneficial when, for example, obfuscation of a non-augmentation scene element causes the user 52 to react in a particular measurable way (e.g., eye movement or eye focus).

Referring back to the user reaction correlating operation 904 of FIG. 9, the user reaction correlating operation 904 similar to the user reaction detecting operation 902 of FIG. 9 may be executed in a number of different ways in various alternative embodiments as illustrated in FIGS. 11A, 11B, 11C, 11D, and 11E. In some implementations, for example, the user reaction correlating operation 904 may include an operation 1131 for correlating the detected one or more user characteristics with the at least one or more aspects associated with the one or more augmentations by defining one or more relationships between the detected one or more user reactions and the at least one or more aspects associated with the one or more augmentations. For instance, the user reaction associating module 104* including the relationship identifying module 830 (see FIG. 8B) of the AR device 70* of FIG. 7A or 7B correlating (e.g., associating, linking, connecting, and so forth) the detected one or more user characteristics with the at least one or more aspects associated with the one or more augmentations when the relationship identifying module 830 defines (e.g., identifies or determines) one or more relationships between the detected one or more user reactions (e.g., eye movements or eye focus) and the at least one or more aspects (e.g., color, shading, placement in the augmented view, and so forth) associated with the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

In some cases, operation 1131 may further include an operation 1132 for correlating the detected one or more user characteristics with the at least one or more aspects associated with the one or more augmentations by registering the defined one or more relationships between the detected one or more user characteristics and the at least one or more aspects associated with the one or more augmentations. For instance, the user reaction associating module 104* including the relationship logging module 832 (see FIG. 8B) of the AR device 70* of FIG. 7A or 7B correlating the detected one or more user characteristics (e.g., eye movements or focus) with the at least one or more aspects (e.g., color, bordering, brightness, and so forth) associated with the one or more augmentations when the relationship logging module 832 registers the defined one or more relationships between the detected one or more user characteristics (e.g., eye movements, eye focus, dwell path, dwell time, and so forth) and the at least one or more aspects (e.g., size and color) associated with the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

Figure 11A:
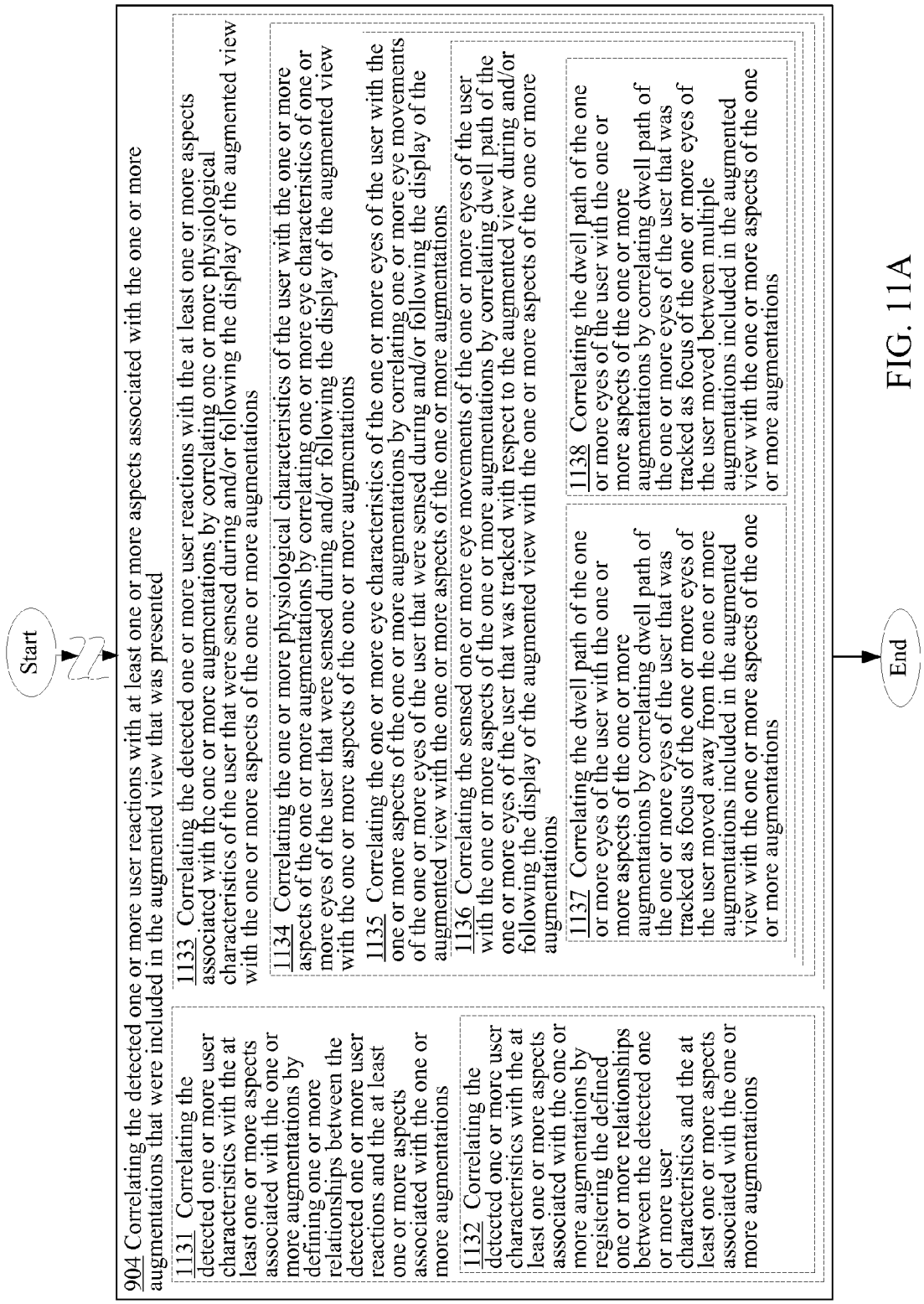
FIG. 11A is a high-level logic flowchart of a process depicting alternate implementations of the user reaction correlating operation 904 of FIG. 9.

In the same or different implementations, the user reaction correlating operation 904, as further illustrated in FIG. 11A, may additionally or alternatively include an operation 1133 for correlating the detected one or more user reactions with the at least one or more aspects associated with the one or more augmentations by correlating one or more physiological characteristics of the user that were sensed during and/or following the display of the augmented view with the one or more aspects of the one or more augmentations. For instance, the user reaction associating module 104* including the physiological characteristic associating module 834 (see FIG. 8B) of the AR device 70* of FIG. 7A or 7B correlating the detected one or more user reactions with the at least one or more aspects associated with the one or more augmentations when the physiological characteristic associating module 834 correlates one or more physiological characteristics (e.g., eye characteristics, facial characteristics, skin characteristics, and so forth) of the user 52 that were sensed during and/or immediately following the display of the augmented view (e.g., augmented view 60b, 60d, 60e, 60f, 60g, 60i, 60k, or 60m of FIG. 6B, 6D, 6E, 6F, 6G, 6I, 6K, or 6M) with the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

As further illustrated in FIG. 11A, in various implementations operation 1133 may further include one or more additional operations. For example, in some cases, operation 1133 may include an operation 1134 for correlating the one or more physiological characteristics of the user with the one or more aspects of the one or more augmentations by correlating one or more eye characteristics of one or more eyes of the user that were sensed during and/or following the display of the augmented view with the one or more aspects of the one or more augmentations. For instance, the physiological characteristic associating module 834 including the eye characteristic associating module 836 (see FIG. 8B) of the AR device 70* of FIG. 7A or 7B correlating the one or more physiological characteristics of the user with the one or more aspects of the one or more augmentations when the eye characteristic associating module 836 correlates (e.g., associates or links) one or more eye characteristics of one or more eyes of the user 52 that were sensed during and/or immediately following the display of the augmented view (e.g., augmented view 60b, 60d, 60e, 60f, 60g, 60i, 60k, or 60m of FIG. 6B, 6D, 6E, 6F, 6G, 6I, 6K, or 6M) with the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

In some implementations, operation 1134 may further include or involve an operation 1135 for correlating the one or more eye characteristics of the one or more eyes of the user with the one or more aspects of the one or more augmentations by correlating one or more eye movements of the one or more eyes of the user that were sensed during and/or following the display of the augmented view with the one or more aspects of the one or more augmentations. For instance, the eye characteristic associating module 836 including the eye movement associating module 838 (see FIG. 8B) of the AR device 70* of FIG. 7A or 7B correlating the one or more eye characteristics of the one or more eyes of the user 52 with the one or more aspects of the one or more augmentations when the eye movement associating module 838 correlates one or more eye movements of the one or more eyes of the user 52 that were sensed during and/or immediately following the display of the augmented view (e.g., augmented view 60b, 60d, 60e, 60f, 60g, 60i, 60k, or 60m of FIG. 6B, 6D, 6E, 6F, 6G, 6I, 6K, or 6M) with the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

As further depicted in FIG. 11A, operation 1135 may in some cases include an operation 1136 for correlating the sensed one or more eye movements of the one or more eyes of the user with the one or more aspects of the one or more augmentations by correlating dwell path of the one or more eyes of the user that was tracked with respect to the augmented view during and/or following the display of the augmented view with the one or more aspects of the one or more augmentations. For instance, the eye movement associating module 838 including the dwell path associating module 840 (see FIG. 8B) of the AR device 70* of FIG. 7A or 7B correlating the sensed one or more eye movements of the one or more eyes of the user sensed with the one or more aspects of the one or more augmentations when the dwell path associating module 840 correlates (e.g., associates) dwell path of the one or more eyes of the user 52 that was tracked with respect to the augmented view (e.g., augmented view 60b, 60d, 60e, 60f, 60g, 60i, 60k, or 60m of FIG. 6B, 6D, 6E, 6F, 6G, 6I, 6K, or 6M) during and/or immediately following the display of the augmented view with the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

In some cases, operation 1136 may include one or more additional operations including in some cases an operation 1137 for correlating the dwell path of the one or more eyes of the user with the one or more aspects of the one or more augmentations by correlating dwell path of the one or more eyes of the user that was tracked as focus of the one or more eyes of the user moved away from the one or more augmentations included in the augmented view with the one or more aspects of the one or more augmentations. For instance, the dwell path associating module 840 of the AR device 70* of FIG. 7A or 7B correlating (e.g., linking or associating) the dwell path of the one or more eyes of the user 52 with the one or more aspects of the one or more augmentations by correlating dwell path (e.g., dwell path 66b of FIG. 6E) of the one or more eyes of the user 52 that was tracked as focus of the one or more eyes of the user 52 moved away from the one or more augmentations (e.g., augmentation 64c of FIG. 6E) included in the augmented view 60e (see FIG. 6E) with the one or more aspects of the one or more augmentations 64c.

In the same or alternative implementations, operation 1136 may additionally or alternatively include an operation 1138 for correlating the dwell path of the one or more eyes of the user with the one or more aspects of the one or more augmentations by correlating dwell path of the one or more eyes of the user that was tracked as focus of the one or more eyes of the user moved between multiple augmentations included in the augmented view with the one or more aspects of the one or more augmentations. For instance, the dwell path associating module 840 of the AR device 70* of FIG. 7A or 7B correlating the dwell path of the one or more eyes of the user 52 with the one or more aspects of the one or more augmentations by correlating dwell path 66b (see FIG. 6G) of the one or more eyes of the user 52 that was tracked as focus of the one or more eyes of the user 52 moved between multiple augmentations (e.g., augmentations 64c and 64e of FIG. 6G) included in the augmented view 60g (see FIG. 6G) with the one or more aspects of the one or more augmentations (e.g., augmentation 64c and/or augmentation 64e).

Referring now to FIG. 11B, in various implementations the operation 1134 for correlating the one or more physiological characteristics of the user with the one or more aspects of the one or more augmentations by correlating one or more eye characteristics of one or more eyes of the user that were sensed during and/or following the display of the augmented view with the one or more aspects of the one or more augmentations may additionally include an operation 1139 for correlating the one or more eye characteristics of the one or more eyes of the user with the one or more aspects of the one or more augmentations by correlating eye focus of the one or more eyes of the user with respect to the augmented view that were sensed during and/or following the display of the augmented view with the one or more aspects of the one or more augmentations. For instance, the eye characteristic associating module 836 including the eye focus associating module 842 (see FIG. 8B) of the AR device 70\* of FIG. 7A or 7B correlating the one or more eye characteristics of the one or more eyes of the user 52 with the one or more aspects of the one or more augmentations when the eye focus associating module 842 correlates or associates eye focus 65a (see FIG. 6F) of the one or more eyes of the user 52 with respect to the augmented view (e.g., augmented view 60f of FIG. 6F) that were sensed during and/or immediately following (e.g., detected proximate to) the display of the augmented view 60f with the one or more aspects of the one or more augmentations (e.g., augmentation 64c and/or augmentation 64d). In various implementations, the eye focus 65a of the one or more eyes of the user 52 may have been detecting proximate to the display of the augmented view 60f using, for example, one or more cameras 870.

As further illustrated in FIG. 11B, in various implementations, operation 1139 may include one or more additional operations including, in some cases, an operation 1140 for correlating the eye focus of the one or more eyes of the user with the one or more aspects of the one or more augmentations by correlating eye focus of the one or more eyes of the user with the one or more aspects of the one or more augmentations, the eye focus of the one or more eyes of the user to be correlated being with respect to the one or more aspects of the one or more augmentations that were sensed during and/or following the display of the augmented view. For instance, the eye focus associating module 842 of the AR device 70\* of FIG. 7A or 7B correlating the eye focus of the one or more eyes of the user 52 with the one or more aspects of the one or more augmentations by correlating or associating eye focus of the one or more eyes of the user 52 with the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M), the eye focus of the one or more eyes of the user 52 to be correlated being with respect to the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) that were sensed during and/or immediately following (e.g., detected proximate to) the display of the augmented view (e.g., augmented view 60b, 60d, 60e, 60f, 60g, 60i, 60k, or 60m of FIG. 6B, 6D, 6E, 6F, 6G, 6I, 6K, or 6M).

In the same or alternative implementations, operation 1139 may additionally or alternatively include an operation 1141 for correlating the eye focus of the one or more eyes of the user with the one or more aspects of the one or more augmentations by correlating the eye focus of the one or more eyes of the user with the one or more aspects of the one or more augmentations, the eye focus of the one or more eyes of the user being with respect to one or more aspects of one or more non-augmentation scene elements included in the augmented view that were sensed during and/or following the display of the augmented view. For instance, the eye focus associating module 842 of the AR device 70\* of FIG. 7A or 7B correlating the eye focus of the one or more eyes of the user 52 with the one or more aspects of the one or more augmentations by correlating (e.g., associating) the eye focus of the one or more eyes of the user 52 with the one or more aspects of the one or more augmentations, the eye focus of the one or more eyes of the user 52 being with respect to one or more aspects of one or more non-augmentation scene elements (e.g., the beach illustrated in the example augmented view 60c of FIG. 6C) included in the augmented view 60c that were sensed during and/or immediately following (e.g., detected proximate to) the display of the augmented view 60c.

In the same or alternative implementations, operation 1139 may additionally or alternatively include an operation 1142 for correlating the eye focus of the one or more eyes of the user with the one or more aspects of the one or more augmentations by correlating dwell time of the one or more eyes of the user with the one or more aspects of the one or more augmentations, the eye focus of the one or more eyes of the user being with respect to one or more aspects of the augmented view that were sensed during and/or following the display of the augmented view. For instance, the eye focus associating module 842 including the dwell time associating module 844 (see FIG. 8B) of the AR device 70\* of FIG. 7A or 7B correlating the eye focus of the one or more eyes of the user 52 with the one or more aspects of the one or more augmentations by correlating or associating dwell time (e.g., the amount of time a user 52 is visually focused on or stares at a visual item) of the one or more eyes of the user 52 with the one or more aspects of the one or more augmentations, the eye focus of the one or more eyes of the user 52 being with respect to one or more aspects of the augmented view (e.g., augmented view 60b, 60d, 60e, 60f, 60g, 60i, 60k, or 60m of FIG. 6B, 6D, 6E, 6F, 6G, 6I, 6K, or 6M) that were sensed during and/or immediately following (e.g., that were detected proximate to) the display of the augmented view (e.g., augmented view 60b, 60d, 60e, 60f, 60g, 60i, 60k, or 60m of FIG. 6B, 6D, 6E, 6F, 6G, 6I, 6K, or 6M).

Figure 11C:
FIG. 11C is a high-level logic flowchart of a process depicting alternate implementations of the user reaction correlating operation 904 of FIG. 9.

Turning now to FIG. 11C, in various implementations, operation 1134 for correlating the one or more physiological characteristics of the user with the one or more aspects of the one or more augmentations by correlating one or more eye characteristics of one or more eyes of the user that were sensed during and/or following the display of the augmented view with the one or more aspects of the one or more augmentations may additionally or alternatively include an operation 1143 for correlating the one or more eye characteristics of the one or more eyes of the user with the one or more aspects of the one or more augmentations by correlating one or more pupil characteristics of the one or more eyes of the user that were sensed during and/or following the display of the augmented view with the one or more aspects of the one or more augmentations. For instance, the eye characteristic associating module 836 including the pupil characteristic associating module 846 (see FIG. 8B) of the AR device 70\* of FIG. 7A or 7B correlating the one or more eye characteristics of the one or more eyes of the user 52 with the one or more aspects of the one or more augmentations when the pupil characteristic associating module 846 correlates one or more pupil characteristics of the one or more eyes of the user 52 that were sensed during and/or immediately following (e.g., that were detected proximate to) the display of the augmented view (e.g., augmented view 60*b*, 60*d*, 60*e*, 60*f*, 60*g*, 60*i*, 60*k*, or 60*m* of FIG. 6B, 6D, 6E, 6F, 6G, 6I, 6K, or 6M) with the one or more aspects of the one or more augmentations (e.g., augmentation 64*a*, 64*b*, 64*c*, 64*cc*, 64*d*, 64*e*, 64*f*, 64*g*, or 64*h* of FIG. 6B, 6D, 6E, 6F, 6G, 6I, 6K, or 6M).

As further depicted in FIG. 11C, operation 1143 may further include one or more additional operations in various alternative implementations. For example, in some implementations, operation 1143 may include an operation 1144 for correlating the one or more pupil characteristics of the one or more eyes of the user with the one or more aspects of the one or more augmentations by correlating shape and/or size of one or more pupils of the user that were sensed during and/or following the display of the augmented view with the one or more aspects of the one or more augmentations. For instance, the pupil characteristic associating module 846 including the pupil shape/size associating module 848 (see FIG. 8B) of the AR device 70\* of FIG. 7A or 7B correlating the one or more pupil characteristics of the one or more eyes of the user 52 with the one or more aspects of the one or more augmentations when the pupil shape/size associating module 848 correlates (e.g., associates) the shape and/or size of one or more pupils of the user 52 that were sensed during and/or immediately following (e.g., that were detected proximate to) the display of the augmented view (e.g., augmented view 60*b*, 60*d*, 60*e*, 60*f*, 60*g*, 60*i*, 60*k*, or 60*m* of FIG. 6B, 6D, 6E, 6F, 6G, 6I, 6K, or 6M) with the one or more aspects of the one or more augmentations (e.g., augmentation 64*a*, 64*b*, 64*c*, 64*cc*, 64*d*, 64*e*, 64*f*, 64*g*, or 64*h* of FIG. 6B, 6D, 6E, 6F, 6G, 6I, 6K, or 6M).

In the same or alternative implementations, operation 1143 may additionally or alternatively include an operation 1145 for correlating the one or more pupil characteristics of the one or more eyes of the user with the one or more aspects of the one or more augmentations by correlating the one or more pupil characteristics in combination with eye focus of the one or more eyes of the user with the one or more aspects of the one or more augmentations, the one or more pupil characteristics and the eye focus of the one or more eyes of the user being with respect to the augmented view that were sensed during and/or following the display of the augmented view. For instance, the AR device 70\* of FIG. 7A or 7B correlating the one or more pupil characteristics of the one or more eyes of the user 52 with the one or more aspects of the one or more augmentations when the pupil characteristic associating module 846 and the eye focus associating module 842 of the AR device 70\* correlates the one or more pupil characteristics in combination with eye focus of the one or more eyes of the user 52 with the one or more aspects of the one or more augmentations (e.g., augmentation 64*a*, 64*b*, 64*c*, 64*cc*, 64*d*, 64*e*, 64*f*, 64*g*, or 64*h* of FIG. 6B, 6D, 6E, 6F, 6G, 6I, 6K, or 6M), the one or more pupil characteristics and the eye focus of the one or more eyes of the user 52 being with respect to the augmented view (e.g., augmented view 60*b*, 60*d*, 60*e*, 60*f*, 60*g*, 60*i*, 60*k*, or 60*m* of FIG. 6B, 6D, 6E, 6F, 6G, 6I, 6K, or 6M) that were sensed during and/or immediately following the display of the augmented view (e.g., augmented view 60*b*, 60*d*, 60*e*, 60*f*, 60*g*, 60*i*, 60*k*, or 60*m* of FIG. 6B, 6D, 6E, 6F, 6G, 6I, 6K, or 6M).

In some cases, operation 1145 may actually include or involve an operation 1146 for correlating the one or more pupil characteristics in combination with the eye focus of the one or more eyes of the user with the one or more aspects of the one or more augmentations by correlating the one or more pupil characteristics in combination with the eye focus of the one or more eyes of the user with the one or more aspects of the one or more augmentations, the one or more pupil characteristics and the eye focus of the one or more eyes of the user being with respect to the one or more aspects of the one or more augmentations that were sensed during and/or following the display of the augmented view. For instance, the AR device 70\* of FIG. 7A or 7B correlating the one or more pupil characteristics in combination with the eye focus of the one or more eyes of the user with the one or more aspects of the one or more augmentations when the pupil characteristic associating module 846 and the eye focus associating module 842 of the AR device 70\* correlates the one or more pupil characteristics in combination with the eye focus of the one or more eyes of the user 52 with the one or more aspects of the one or more augmentations, the one or more pupil characteristics and the eye focus of the one or more eyes of the user 52 being with respect to the one or more aspects of the one or more augmentations (e.g., augmentation 64*a*, 64*b*, 64*c*, 64*cc*, 64*d*, 64*e*, 64*f*, 64*g*, or 64*h* of FIG. 6B, 6D, 6E, 6F, 6G, 6I, 6K, or 6M) that were sensed during and/or immediately following (e.g., that were detected proximate to) the display of the augmented view (e.g., augmented view 60*b*, 60*d*, 60*e*, 60*f*, 60*g*, 60*i*, 60*k*, or 60*m* of FIG. 6B, 6D, 6E, 6F, 6G, 6I, 6K, or 6M). That is, in various embodiments, the interest of a user 52 with respect to one or more aspects of one or more augmentations (e.g., augmentation 64*a*, 64*b*, 64*c*, 64*cc*, 64*d*, 64*e*, 64*f*, 64*g*, or 64*h* of FIG. 6B, 6D, 6E, 6F, 6G, 6I, 6K, or 6M) may be defined based on the eye focus and the pupil characteristics of the user 52 with respect to the one or more aspects of the one or more augmentations (e.g., whether the user 52 is looking at the one or more aspects of the one or more augmentations and whether the pupils of the user 52 are or are not dilated when the user 52 is looking at the one or more aspects of the one or more augmentations).

In the same or alternative implementations, operation 1145 may additionally or alternatively include or involve an operation 1147 for correlating the one or more pupil characteristics in combination with the eye focus of the one or more eyes of the user with the one or more aspects of the one or more augmentations by correlating the one or more pupil characteristics in combination with the eye focus of the one or more eyes of the user with the one or more aspects of the one or more augmentations, the one or more pupil characteristics and the eye focus of the one or more eyes of the user being with respect to one or more aspects of one or more non-augmentation scene elements included in the augmented view that was sensed during and/or following the display of the augmented view. For instance, the AR device 70\* of FIG. 7A or 7B correlating the one or more pupil characteristics in combination with the eye focus of the one or more eyes of the user 52 with the one or more aspects of the one or more augmentations when the pupil characteristic associating module 846 and the eye focus associating module 842 of the AR device 70\* correlates the one or more pupil characteristics in combination with eye focus of the one or more eyes of the user with the one or more aspects of the one or more augmentations (e.g., augmentation 64*a*, 64b, 64c, 64cc, 64d, 64e, 64f, 64g, or 64h of FIG. 6B, 6D, 6E, 6F, 6G, 6I, 6K, or 6M), the one or more pupil characteristics and the eye focus of the one or more eyes of the user 52 being with respect to one or more aspects of one or more non-augmentation scene elements (e.g., store front, a sign, beach, and so forth) included in the augmented view (e.g., augmented view 60b, 60d, 60e, 60f, 60g, 60i, 60k, or 60m of FIG. 6B, 6D, 6E, 6F, 6G, 6I, 6K, or 6M) that was sensed during and/or immediately following (e.g., that were detected proximate to) the display of the augmented view.

Figure 11D:
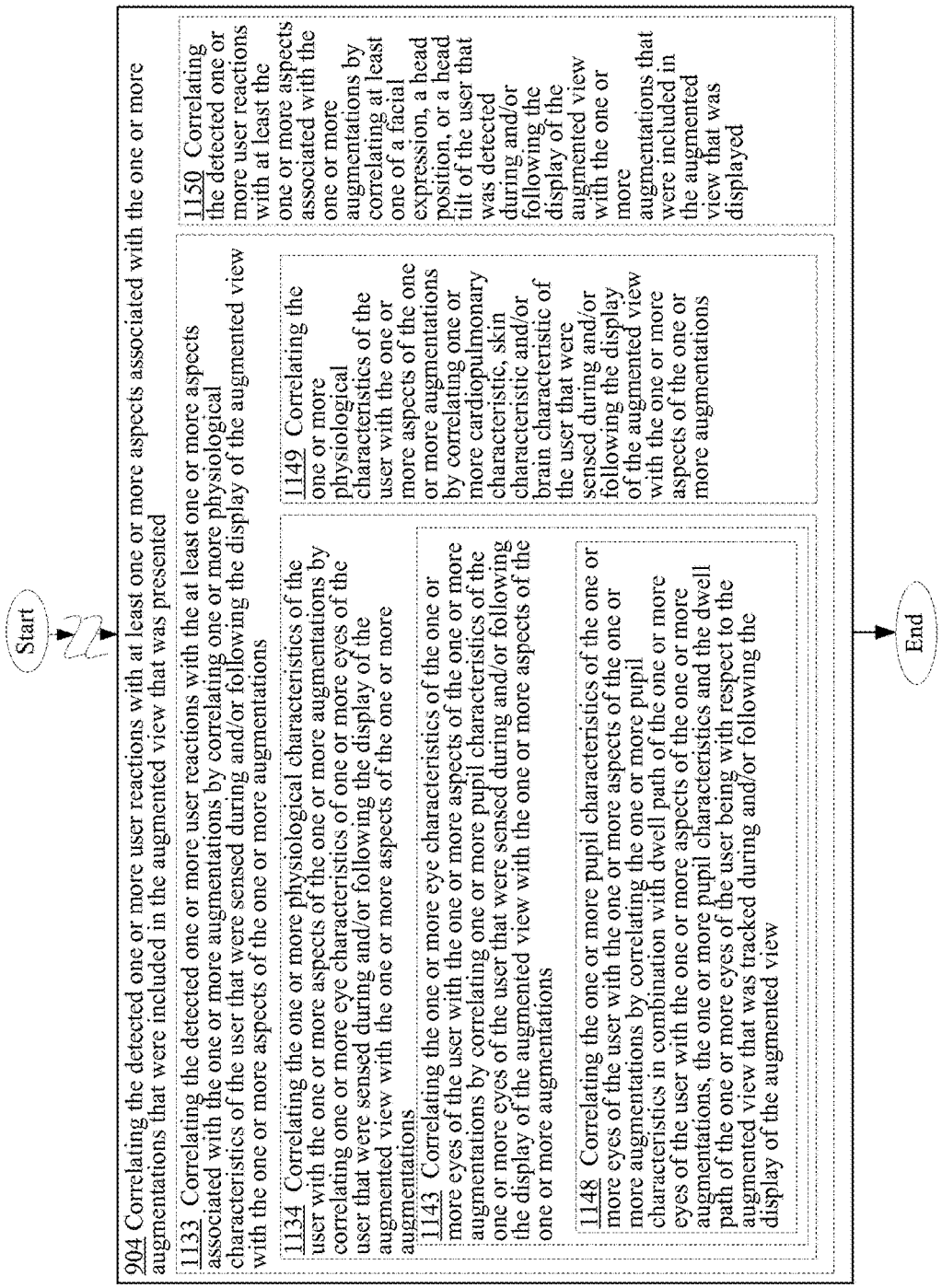
FIG. 11D is a high-level logic flowchart of a process depicting alternate implementations of the user reaction correlating operation 904 of FIG. 9.

Referring now to FIG. 11D, in some implementations, operation 1143 for correlating the one or more eye characteristics of the one or more eyes of the user with the one or more aspects of the one or more augmentations by correlating one or more pupil characteristics of the one or more eyes of the user that were sensed during and/or following the display of the augmented view with the one or more aspects of the one or more augmentations may actually include or involve an operation 1148 for correlating the one or more pupil characteristics of the one or more eyes of the user with the one or more aspects of the one or more augmentations by correlating the one or more pupil characteristics in combination with dwell path of the one or more eyes of the user with the one or more aspects of the one or more augmentations, the one or more pupil characteristics and the dwell path of the one or more eyes of the user being with respect to the augmented view that was tracked during and/or following the display of the augmented view. For instance, the AR device 70* of FIG. 7A or 7B correlating the one or more pupil characteristics of the one or more eyes of the user with the one or more aspects of the one or more augmentations when the pupil characteristic associating module 846 and the dwell path associating module 840 of the AR device 70* correlates the one or more pupil characteristics in combination with dwell path (e.g., dwell path 66a of FIG. 6C) of the one or more eyes of the user 52 with the one or more aspects of the one or more augmentations (e.g., augmentation 64a of FIG. 6C), the one or more pupil characteristics and the dwell path 66a (see FIG. 6C) of the one or more eyes of the user 52 being with respect to the augmented view 60c (see FIG. 6C) that was tracked during and/or immediately following (e.g., that were detected or tracked proximate to) the display of the augmented view 66c.

As further illustrated in FIG. 11D, the operation 1133 for correlating the detected one or more user reactions with the at least one or more aspects associated with the one or more augmentations by correlating one or more physiological characteristics of the user that were sensed during and/or following the display of the augmented view with the one or more aspects of the one or more augmentations may additionally or alternatively include or involve an operation 1149 for correlating the one or more physiological characteristics of the user with the one or more aspects of the one or more augmentations by correlating one or more cardiopulmonary characteristic, skin characteristic and/or brain characteristic of the user that were sensed during and/or following the display of the augmented view with the one or more aspects of the one or more augmentations. For instance, the physiological characteristic associating module 834 (see FIG. 8B) of the AR device 70* of FIG. 7A or 7B correlating the one or more physiological characteristics of the user 52 with the one or more aspects of the one or more augmentations by correlating (e.g., linking or associating) one or more cardiopulmonary characteristic, skin characteristic and/or brain characteristic of the user 52 that were sensed during and/or immediately following (e.g., that were detected proximate to) the display of the augmented view (e.g., augmented view 60b, 60d, 60e, 60f, 60g, 60i, 60k, or 60m of FIG. 6B, 6D, 6E, 6F, 6G, 6I, 6K, or 6M) with the one or more aspects of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

In various implementations, the user reaction correlating operation 904 for correlating the detected one or more user reactions with at least one or more aspects associated with the one or more augmentations that were included in the augmented view that was presented, as further illustrated in FIG. 11D, may additionally or alternatively include or involve an operation 1150 for correlating the detected one or more user reactions with at least the one or more aspects associated with the one or more augmentations by correlating at least one of a facial expression, a head position, or a head tilt of the user that was detected during and/or following the display of the augmented view with the one or more augmentations that were included in the augmented view that was displayed. For instance, the user reaction associating module 104* of the AR device 70* of FIG. 7A or 7B correlating (e.g., associating or linking) the detected one or more user reactions with at least the one or more aspects associated with the one or more augmentations by correlating at least one of a facial expression, a head position, or a head tilt of the user 52 that was detected during and/or immediately following (e.g., that were detected proximate to) the display of the augmented view (e.g., augmented view 60b, 60d, 60e, 60f, 60g, 60i, 60k, or 60m of FIG. 6B, 6D, 6E, 6F, 6G, 6I, 6K, or 6M) with the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) that were included in the augmented view (e.g., augmented view 60b, 60d, 60e, 60f, 60g, 60i, 60k, or 60m of FIG. 6B, 6D, 6E, 6F, 6G, 6I, 6K, or 6M) that was displayed. The detected facial expression, head position, or head tilt of the user 52 may indicate or at least infer a particular mental state of the user and which may be useful for, for example, providing subsequent augmented views.

Figure 11E:
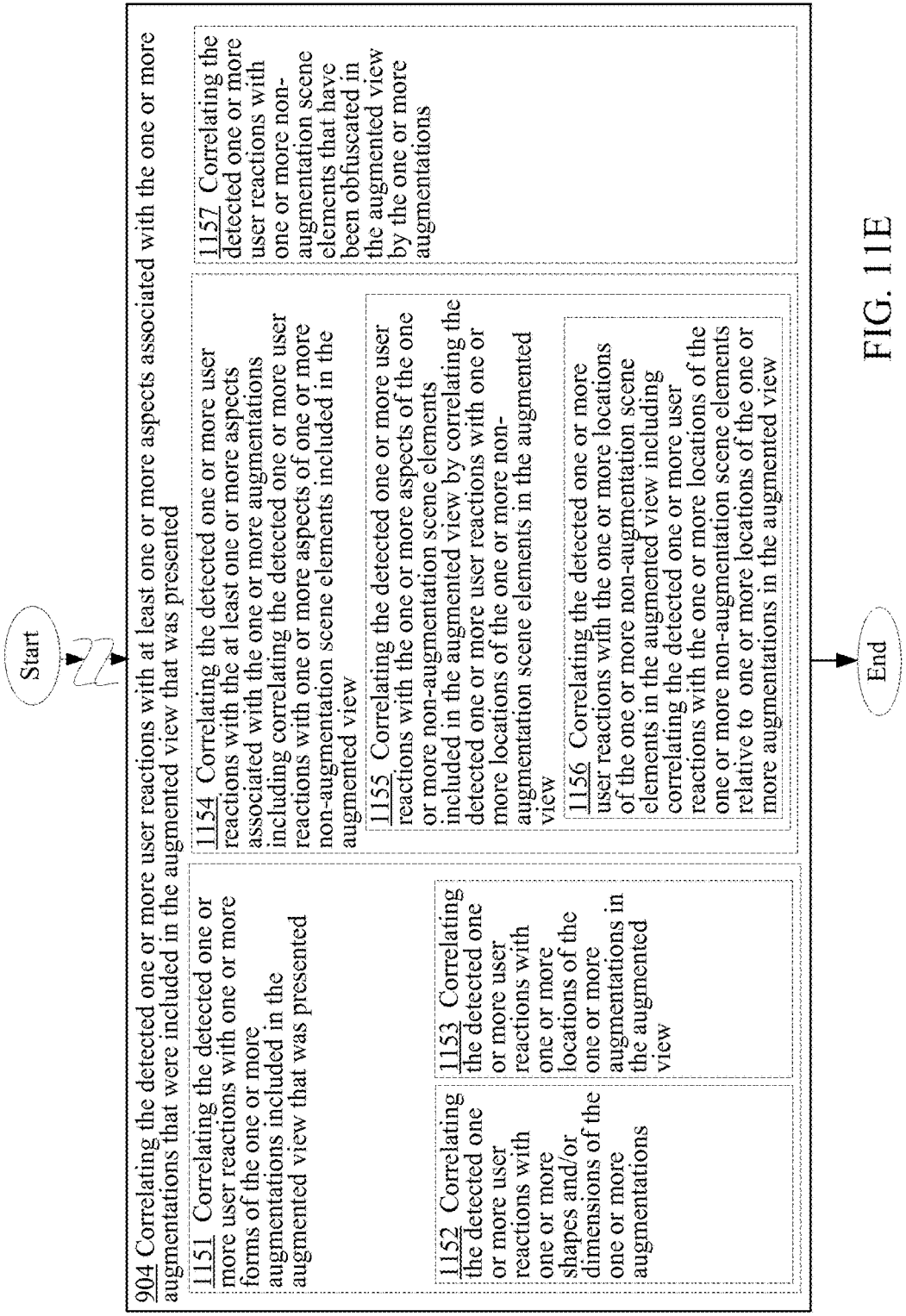
FIG. 11E is a high-level logic flowchart of a process depicting alternate implementations of the user reaction correlating operation 904 of FIG. 9.

Turning now to FIG. 11E, in the same or alternative implementations, the user reaction correlating operation 904 may additionally or alternatively include or involve an operation 1151 for correlating the detected one or more user reactions with one or more forms of the one or more augmentations included in the augmented view that was presented. For instance, the user reaction associating module 104* of the AR device 70* of FIG. 7A or 7B correlating (e.g., linking or associating) the detected one or more user reactions (e.g., user reactions as expressed through the user's eye focus/movement, facial expressions, and so forth) with one or more forms of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) included in the augmented view (e.g., augmented view 60b, 60d, 60e, 60f, 60g, 60i, 60k, or 60m of FIG. 6B, 6D, 6E, 6F, 6G, 6I, 6K, or 6M) that was presented.

As further illustrated in FIG. 11E, operation 1151 may further include one or more additional operations in various alternative implementations including, in some cases, an operation 1152 for correlating the detected one or more user reactions with one or more shapes and/or dimensions of the one or more augmentations. For instance, the user reaction associating module 104* of the AR device 70* of FIG. 7A or 7B correlating the detected one or more user reactions with one or more shapes and/or dimensions of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

In the same or alternative implementations, operation 1151 may additionally or alternatively include an operation 1153 for correlating the detected one or more user reactions with one or more locations of the one or more augmentations in the augmented view. For instance, the user reaction associating module 104* of the AR device 70* of FIG. 7A or 7B correlating the detected one or more user reactions with one or more locations of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) in the augmented view (e.g., augmented view 60b, 60d, 60e, 60f, 60g, 60i, 60k, or 60m of FIG. 6B, 6D, 6E, 6F, 6G, 6I, 6K, or 6M).

In some implementations, the user reaction correlating operation 904 may additionally or alternatively include or involve an operation 1154 for correlating the detected one or more user reactions with the at least one or more aspects associated with the one or more augmentations including correlating the detected one or more user reactions with one or more aspects of one or more non-augmentation scene elements included in the augmented view. For instance, the user reaction associating module 104* of the AR device 70* of FIG. 7A or 7B correlating the detected one or more user reactions with the at least one or more aspects associated with the one or more augmentations including correlating (e.g., linking or associating) the detected one or more user reactions (e.g., eye movements) with one or more aspects of one or more non-augmentation scene elements (e.g., a sign, a building, a street, a picture, and so forth) included in the augmented view (e.g., augmented view 60b, 60d, 60e, 60f, 60g, 60i, 60k, or 60m of FIG. 6B, 6D, 6E, 6F, 6G, 6I, 6K, or 6M).

As further illustrated in FIG. 11E, in some cases, operation 1154 may further include an operation 1155 for correlating the detected one or more user reactions with the one or more aspects of the one or more non-augmentation scene elements included in the augmented view by correlating the detected one or more user reactions with one or more locations of the one or more non-augmentation scene elements in the augmented view. For instance, the user reaction associating module 104* of the AR device 70* of FIG. 7A or 7B correlating the detected one or more user reactions with the one or more aspects of the one or more non-augmentation scene elements included in the augmented view by correlating the detected one or more user reactions (e.g., eye movements including dwell path of the user 52) with one or more locations of the one or more non-augmentation scene elements in the augmented view (e.g., augmented view 60b, 60d, 60e, 60f, 60g, 60i, 60k, or 60m of FIG. 6B, 6D, 6E, 6F, 6G, 6I, 6K, or 6M).

In some cases, operation 1155 may actually include or involve an operation 1156 for correlating the detected one or more user reactions with the one or more locations of the one or more non-augmentation scene elements in the augmented view including correlating the detected one or more user reactions with the one or more locations of the one or more non-augmentation scene elements relative to one or more locations of the one or more augmentations in the augmented view. For instance, the user reaction associating module 104* of the AR device 70* of FIG. 7A or 7B correlating the detected one or more user reactions with the one or more locations of the one or more non-augmentation scene elements in the augmented view including correlating the detected one or more user reactions with the one or more locations of the one or more non-augmentation scene elements (e.g., beach, sky, picture, sign, and so forth) relative to one or more locations of the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M) in the augmented view (e.g., augmented view 60b, 60d, 60e, 60f, 60g, 60i, 60k, or 60m of FIG. 6B, 6D, 6E, 6F, 6G, 6I, 6K, or 6M). Such an operation may be executed in order to, for example, take into account situations where a user 52 behaves or reacts differently depending on where non-augmentation scene elements are located in the augmented view relative to the location of one or more augmentations in an augmented view.

In some implementations, the user reaction correlating operation 904 may additionally or alternatively include or involve an operation 1157 for correlating the detected one or more user reactions with one or more non-augmentation scene elements that have been obfuscated in the augmented view by the one or more augmentations. For instance, the user reaction associating module 104* of the AR device 70* of FIG. 7A or 7B correlating (e.g., linking or associating) the detected one or more user reactions (e.g., eye movements, pupil characteristics, skin response, and so forth) with one or more non-augmentation scene elements (e.g., a sign, a picture, a store front, and so forth) that have been obfuscated in the augmented view (e.g., augmented view 60b, 60d, 60e, 60f, 60g, 60i, 60k, or 60m of FIG. 6B, 6D, 6E, 6F, 6G, 6I, 6K, or 6M) by the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

Figure 12:
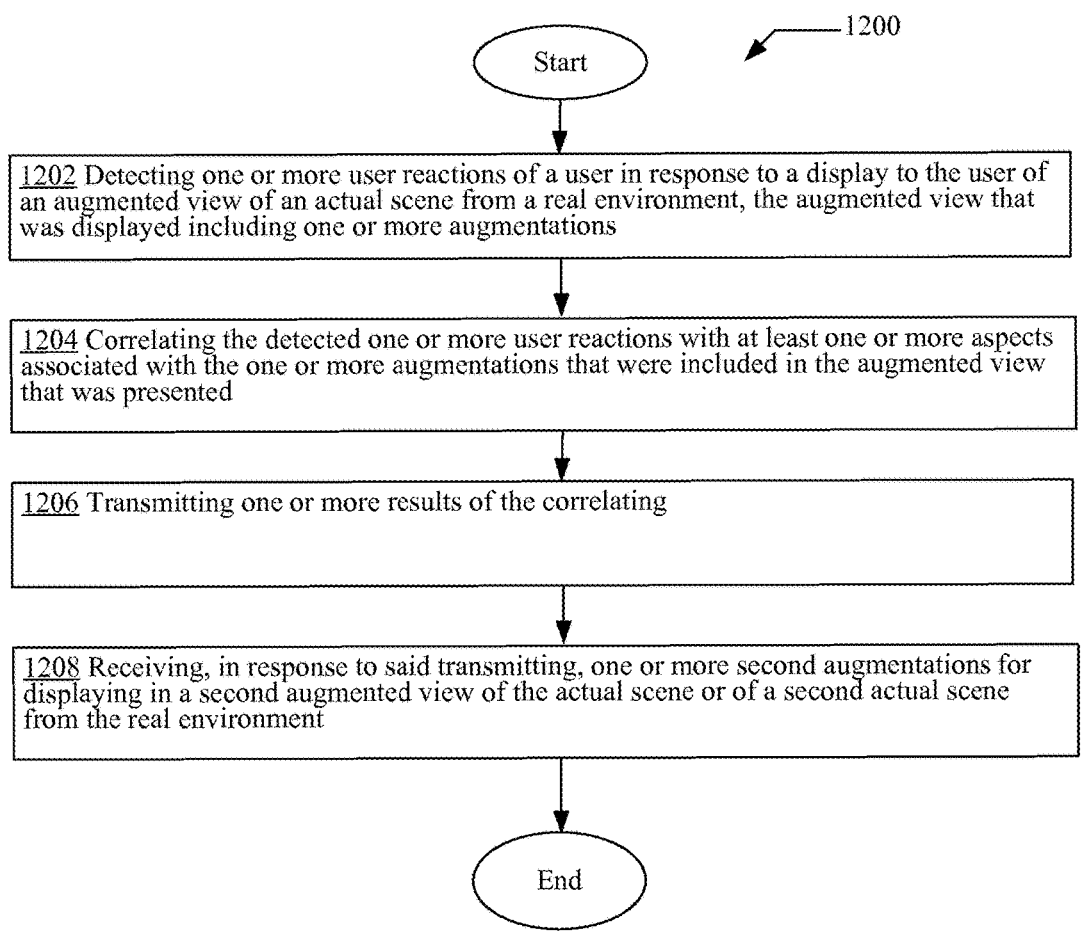
FIG. 12 is another high-level logic flowchart of a process, e.g., operational flow 1200, according to some embodiments.

Turning now to FIG. 12 illustrating another operational flow 1200. Operational flow 1200 includes certain operations that mirror the operations included in operational flow 900 of FIG. 9. These operations include a user reaction detecting operation 1202 and a user reaction correlating operation 1204 that corresponds to and mirror the user reaction detecting operation 902 and the user reaction correlating operation 904, respectively, of FIG. 9.

In addition, operational flow 1200 may include operation 1206 for transmitting one or more results of the correlating. For instance, the correlation result relaying module 107* (e.g., the correlation result relaying module 107' or the correlation result relaying module 107") of the AR device 70* of FIG. 7A or 7B transmitting (e.g., relaying or sending) one or more results of the correlating (e.g., transmitting one or more results of associating the one or more user reactions with the one or more aspects of one or more augmentations).

As further illustrated in FIG. 12, operation flow 1200 may further include an operation 1208 for receiving, in response to said transmitting, one or more second augmentations for displaying in a second augmented view of the actual scene or of a second actual scene from the real environment. For instance, the augmentation acquiring module 108* (e.g., the augmentation acquiring module 108' or the augmentation acquiring module 108") of the AR device 70* of FIG. 7A or 7B receiving, in response to said transmitting, one or more second augmentations (e.g., augmentation 64b of FIG. 6D) for displaying in a second augmented view (e.g., augmented view 60d of FIG. 6D) of the actual scene or of a second actual scene from the real environment. For example, FIG. 6B illustrates an example augmented view 60b in which a sundial augmentation 64a has been inserted into the augmented view 60b. The eye or eyes of the user 52 viewing the augmented view 60b may then be monitored and the dwell path 66a of the eye or eyes of the user 52 may be tracked as illustrated as illustrated in FIG. 6C. Based, on such tracking of the dwell path 66a, another augmentation 64b may be included into an another augmented view 60d. Note that in some implementations, the augmented view 64d may be the augmented view of essentially the same actual scene at approximately the same point in time. Alternatively, the augmented view 64d may be the augmented view of another actual scene (e.g., may be the same scene but at a different point in time) that was generated based on the previously learned behavior (e.g., tracked dwell path 66a) of the user 52 as illustrated in FIG. 6C.

Figure 13:
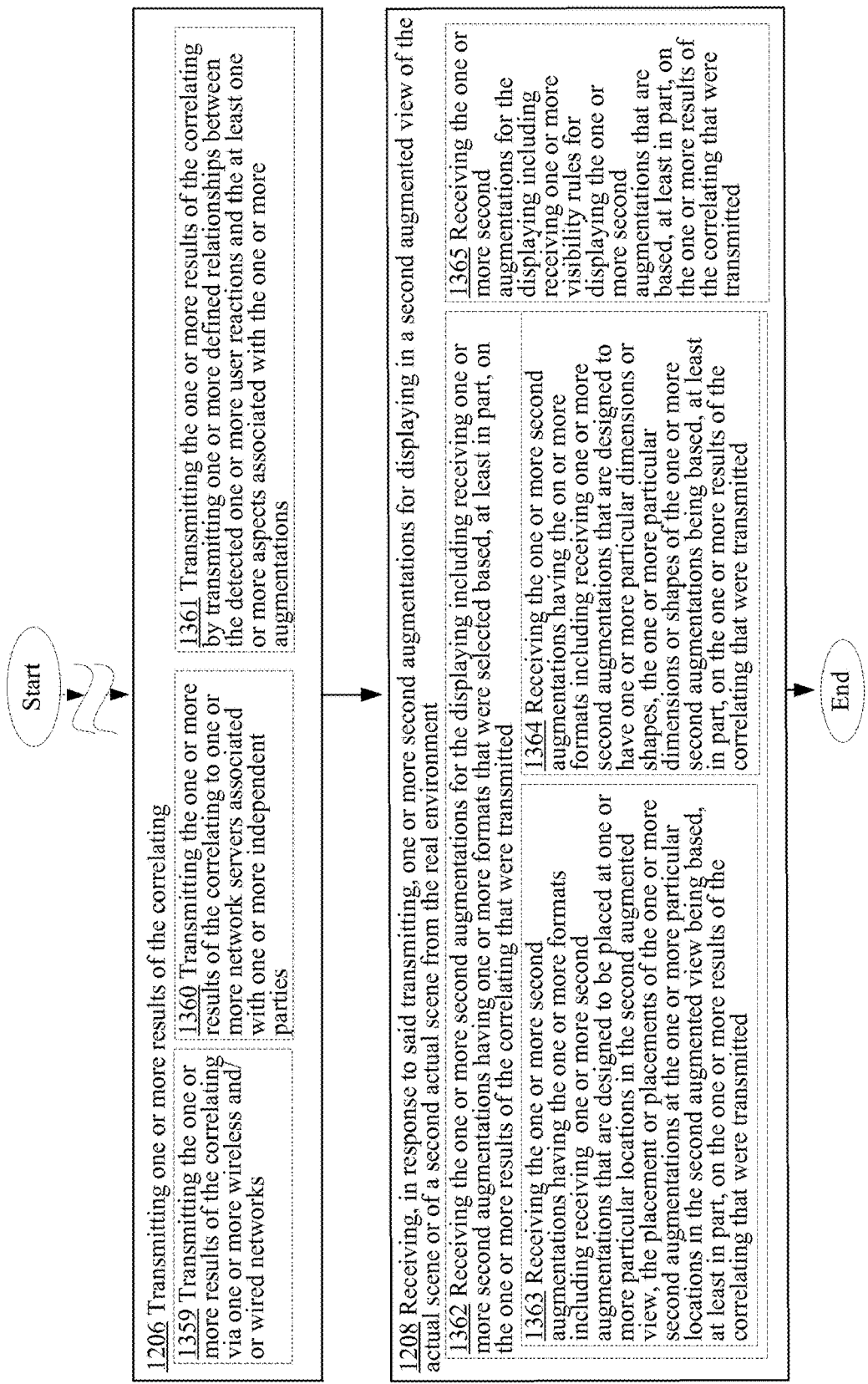
FIG. 13 depicts alternate implementations of the operational flow 1200 of FIG. 12.

Referring now to FIG. 13, which illustrates how operation 1206 and 1208 of FIG. 12 may be implemented in various alternative implementations. For example, in some implementations, operation 1206 may include or involve an operation 1359 for transmitting the one or more results of the correlating via one or more wireless and/or wired networks. For instance, the correlation result relaying module 107* of the AR device 70* of FIG. 7A or 7B transmitting the one or more results of the correlating via one or more wireless and/or wired networks (e.g., a wireless local area network or WLAN, a wide area network or WAN, a metropolitan area network, a cellular network, a public switched telephone network or PSTN, and so forth).

In the same or alternative implementations, operation 1206 may additionally or alternatively include an operation 1360 for transmitting the one or more results of the correlating to one or more network servers associated with one or more independent parties. For instance, the correlation result relaying module 107* of the AR device 70* of FIG. 7A or 7B transmitting the one or more results of the correlating to one or more network servers associated with one or more independent parties (e.g., advertisers, academic institutions, sports arena, retail stores, and so forth).

In the same or alternative implementations, operation 1206 may additionally or alternatively include an operation 1361 for transmitting the one or more results of the correlating by transmitting one or more defined relationships between the detected one or more user reactions and the at least one or more aspects associated with the one or more augmentations. For instance, the correlation result relaying module 107* of the AR device 70* of FIG. 7A or 7B transmitting the one or more results of the correlating by transmitting one or more defined relationships between the detected one or more user reactions (e.g., facial expressions or eye movements and focus) and the at least one or more aspects associated with the one or more augmentations (e.g., augmentation 64a, 64b, 64c, 64cc, 64d, 64e, 64f, 64g, or 64h of FIG. 6B, 6D, 6E, 6F, 6G, 6I, 6K, or 6M).

As further illustrated in FIG. 13, operation 1208 for receiving, in response to said transmitting, one or more second augmentations for displaying in a second augmented view of the actual scene or of a second actual scene from the real environment may include one or more additional operations in various alternative implementations. For example, in some implementations, operation 1208 may include an operation 1362 for receiving the one or more second augmentations for the displaying including receiving one or more second augmentations having one or more formats that were selected based, at least in part, on the one or more results of the correlating that were transmitted. For instance, the augmentation acquiring module 108* of the AR device 70* of FIG. 7A or 7B receiving (e.g., wirelessly acquiring) the one or more second augmentations for the displaying including receiving one or more second augmentations (e.g., augmentation 64b of FIG. 6D) having one or more formats (e.g., an augmentation 64b in the shape of a soft drink bottle) that were selected remotely (e.g., selected remotely by a remote network server) based, at least in part, on the one or more results of the correlating that were transmitted or relayed.

In some cases, operation 1362 may, in turn, further include an operation 1363 for receiving the one or more second augmentations having the one or more formats including receiving one or more second augmentations that are designed to be placed at one or more particular locations in the second augmented view, the placement or placements of the one or more second augmentations at the one or more particular locations in the second augmented view being based, at least in part, on the one or more results of the correlating that were transmitted. For instance, the augmentation acquiring module 108* of the AR device 70* of FIG. 7A or 7B receiving the one or more second augmentations having the one or more formats including receiving one or more second augmentations (e.g., augmentation 64b of FIG. 6D) that are designed to be placed at one or more particular locations (e.g., right bottom corner of the augmented view 60d and on top of the beach displayed in the augmented view 60d) in the second augmented view 60d (see FIG. 6D), the placement or placements of the one or more second augmentations 64b at the one or more particular locations in the second augmented view 60d (see FIG. 6D) being based, at least in part, on the one or more results of the correlating that were transmitted (e.g., the results that have been transmitted or relayed that indicated the user's dwell path 66a during and/or immediately following display of an augmentation 64a as illustrated in FIG. 6C).

In the same or different implementations, operation 1362 may additionally or alternatively include an operation 1364 for receiving the one or more second augmentations having the one or more formats including receiving one or more second augmentations that are designed to have one or more particular dimensions or shapes, the one or more particular dimensions or shapes of the one or more second augmentations being based, at least in part, on the one or more results of the correlating that were transmitted. For instance, the augmentation acquiring module 108* of the AR device 70* of FIG. 7A or 7B receiving the one or more second augmentations having the one or more formats including receiving one or more second augmentations (e.g., augmentation 64b of FIG. 6D) that are designed to have one or more particular dimensions or shapes (e.g., shape of a soft drink bottle), the one or more particular dimensions or shapes of the one or more second augmentations 64b being based, at least in part, on the one or more results of the correlating that were transmitted (e.g., correlation that links a dwell path 66a of the user 52 with the augmentation 64a and/or to one or more non-augmentation scene elements such as the beach displayed in the actual view 60b of FIG. 6B and the augmented view 60c of FIG. 6C).

In the same or different implementations, operation 1208 for receiving, in response to said transmitting, one or more second augmentations for displaying in a second augmented view of the actual scene or of a second actual scene from the real environment may additionally or alternatively include an operation 1365 for receiving the one or more second augmentations for the displaying including receiving one or more visibility rules for displaying the one or more second augmentations that are based, at least in part, on the one or more results of the correlating that were transmitted. For instance, the augmentation acquiring module 108* of the AR device 70* of FIG. 7A or 7B receiving the one or more second augmentations for the displaying including receiving one or more visibility rules for displaying the one or more second augmentations that are based, at least in part, on the one or more results of the correlating that were transmitted. In various implementations, a visibility rule is a directive or command that defines when and how an augmentation may be displayed. For example, in some cases, a visibility rule may identify an "anchor" visual pattern or item (e.g., a non-augmentation scene element) that must be present in an actual scene before the augmentation is to be included in the augmented view of the actual scene. A visibility rule may additionally or alternatively define the placement of an augmentation in an augmented view and/or the shape, coloring, and/or dimensions of the augmentation.

Figure 14:
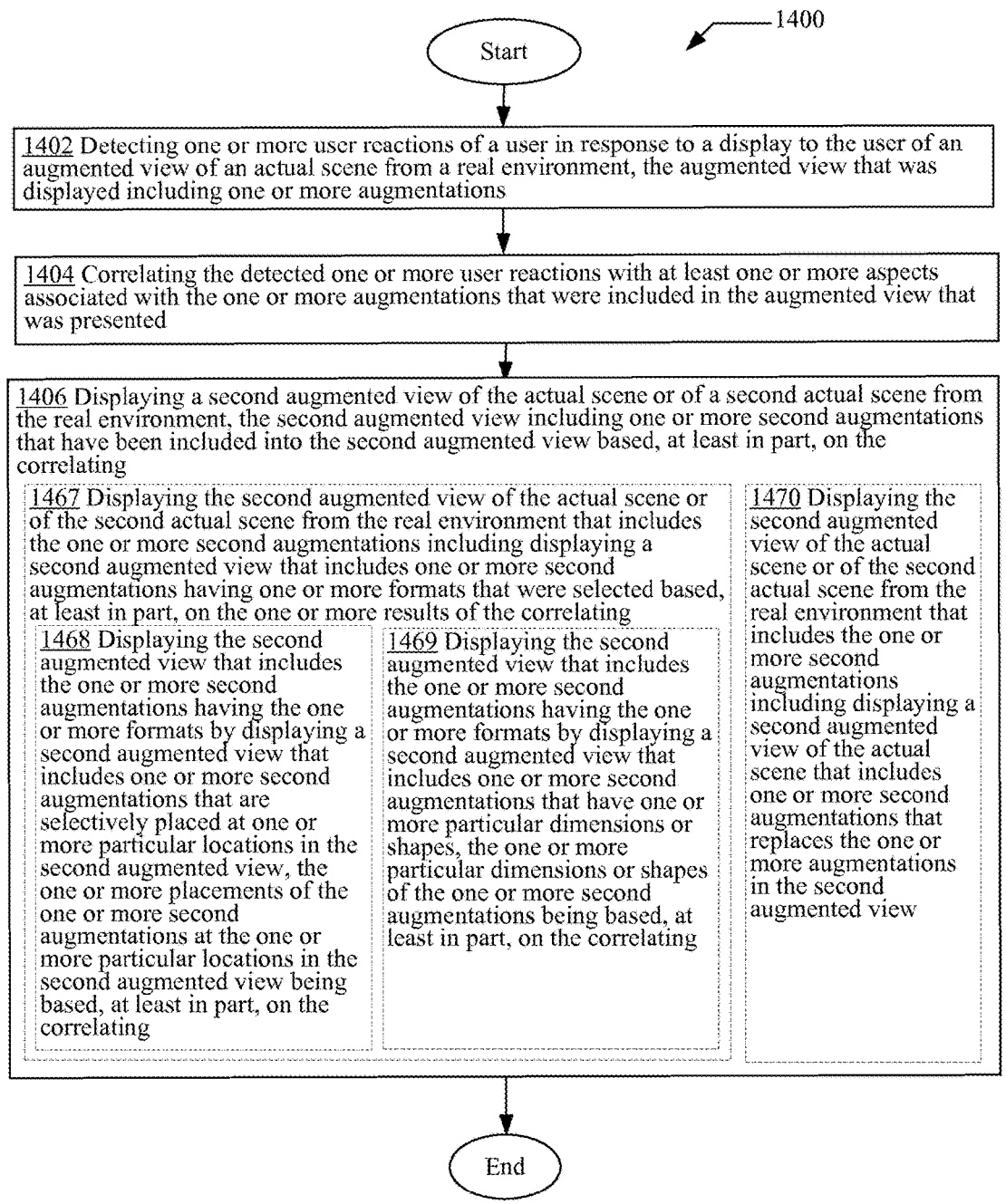
FIG. 14 is another high-level logic flowchart of a process, e.g., operational flow 1400, according to some embodiments.

Turning now to FIG. 14 illustrating another operational flow 1400. Operational flow 1400 includes certain operations that mirror the operations included in operational flow 900 of FIG. 9. These operations include a user reaction detecting operation 1402 and a user reaction correlating operation 1404 that corresponds to and mirror the user reaction detecting operation 902 and the user reaction correlating operation 904, respectively, of FIG. 9.

In addition, operational flow 1400 may further include an operation 1406 for displaying a second augmented view of the actual scene or of a second actual scene from the real environment, the second augmented view including one or more second augmentations that have been included into the second augmented view based, at least in part, on the correlating. For instance, the augmented view presenting module 106* (e.g., augmented view presenting module 106' or the augmented view presenting module 106") of the AR device 70* of FIG. 7A or 7B displaying (e.g., visual presenting) a second augmented view (e.g., augmented view 60f of FIG. 6F) of the actual scene or of a second actual scene from the real environment, the second augmented view 60f including one or more second augmentations (e.g., augmentation 64d) that have been included into the second augmented view 60f (see FIG. 6F) based, at least in part, on the correlating (e.g., the correlation or association of the tracked dwell path 66b of the user 52, as illustrated in FIG. 6E, with an augmentation 64c of FIGS. 6E and 6F).

In some cases, operation 1406 may further include or involve an operation 1467 for displaying the second augmented view of the actual scene or of the second actual scene from the real environment that includes the one or more second augmentations including displaying a second augmented view that includes one or more second augmentations having one or more formats that were selected based, at least in part, on the one or more results of the correlating as further illustrated in FIG. 14. For instance, the augmented view presenting module 106* of the AR device 70* of FIG. 7A or 7B displaying the second augmented view of the actual scene or of the second actual scene from the real environment that includes the one or more second augmentations including displaying (e.g. visually presenting) a second augmented view (e.g., augmented view 60f of FIG. 6F) that includes one or more second augmentations (e.g., augmentation 64d of FIG. 6F) having one or more formats (e.g., a visual image of a plane pulling a banner as illustrated in FIG. 6F) that were selected based, at least in part, on the one or more results of the correlating (e.g., associating of the one or more user reactions with the at least one or more aspects of the one or more augmentations).

In various implementations, operation 1467 may further include one or more additional operations including, in some cases, an operation 1468 for displaying the second augmented view that includes the one or more second augmentations having the one or more formats by displaying a second augmented view that includes one or more second augmentations that are selectively placed at one or more particular locations in the second augmented view, the one or more placements of the one or more second augmentations at the one or more particular locations in the second augmented view being based, at least in part, on the correlating. For instance, the augmented view presenting module 106* of the AR device 70* of FIG. 7A or 7B displaying (e.g., visually presenting) the second augmented view that includes the one or more second augmentations having the one or more formats by displaying a second augmented view (e.g., augmented view 60f of FIG. 6F) that includes one or more second augmentations 64d (see FIG. 6F) that are selectively placed at one or more particular locations in the second augmented view 60f (e.g., top right corner and in the sky depicted in the augmented view 60f of FIG. 6F), the one or more placements of the one or more second augmentations at the one or more particular locations in the second augmented view 60f being based, at least in part, on the correlating.

In the same or alternative implementations, operation 1467 may additionally or alternatively include an operation 1469 for displaying the second augmented view that includes the one or more second augmentations having the one or more formats by displaying a second augmented view that includes one or more second augmentations that have one or more particular dimensions or shapes, the one or more particular dimensions or shapes of the one or more second augmentations being based, at least in part, on the correlating. For instance, the augmented view presenting module 106* of the AR device 70* of FIG. 7A or 7B displaying the second augmented view that includes the one or more second augmentations having the one or more formats by displaying a second augmented view (e.g. augmented view 60f of FIG. 6F) that includes one or more second augmentations (e.g., augmentation 64d) that have one or more particular dimensions or shapes (e.g., in the shape of a plane pulling an advertising banner), the one or more particular dimensions or shapes of the one or more second augmentations 64d being based, at least in part, on the correlating.

In various implementations, operation 1406 for displaying a second augmented view of the actual scene or of a second actual scene from the real environment, the second augmented view including one or more second augmentations that have been included into the second augmented view based, at least in part, on the correlating may include an operation 1470 for displaying the second augmented view of the actual scene or of the second actual scene from the real environment that includes the one or more second augmentations including displaying a second augmented view of the actual scene that includes one or more second augmentations that replaces the one or more augmentations in the second augmented view. For instance, the augmented view presenting module 106* of the AR device 70* of FIG. 7A or 7B displaying the second augmented view of the actual scene or of the second actual scene from the real environment that includes the one or more second augmentations including displaying a second augmented view (e.g., augmented view 60m of FIG. 6M) of the actual scene that includes one or more second augmentations (e.g., augmentation 64h of FIG. 6H) that replaces the one or more augmentations (e.g., augmentation 64f of FIG. 6I) in the second augmented view 60m (see FIG. 6M). For example, FIG. 6I illustrated an augmented view 60i of an actual scene (e.g., actual view 60h of FIG. 6H) from a shopping mall. The augmented view 60i includes an augmentation 64f that provides advertisement information related to a particular restaurant in the shopping mall. Based, for example, on the relatively small dwell time of the user 52 (e.g., which indicates that the user has little interest) as it relates to the displayed augmentation 64f, the next time the user 52 views the same actual scene (e.g., actual view 60*h* of FIG. 6H), the AR device 70* may generate a second augmented view (e.g., augmented view 60*m* of FIG. 6M) that includes an augmentation 64*h* that replaces the original augmentation 64*f*, the replacement augmentation 64*h* having a different border and color in the hopes of increasing the dwell time of the user 52 (e.g., a boarder and color that are intended to entice the interest of the user 52).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinct ion left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
generating an augmented view including displaying one or more augmentations at a first location relative to an actual scene of a real environment;
detecting a pupil size and dwell path of a user during display of the augmented view of the actual scene of the real environment;
determining low interest in the one or more augmentations at the first location based at least partly on the pupil size and dwell path of the user indicating focus off of the one or more augmentations within a specified time of initial focus; and
moving the one or more augmentations away from the first location to a peripheral location in the augmented view based at least in part on the indication of low interest.

2. The computationally-implemented method of claim 1, further comprising:
detecting one or more physiological characteristics of the user proximate to display of the augmented view.

3. The computationally-implemented method of claim 1, further comprising:
detecting at least one of a facial expression, a head position, or a head tilt of the user proximate to display of the augmented view.

4. The computationally-implemented method of claim 1, further comprising:
correlating one or more physiological characteristics of the user sensed during and/or following display of the augmented view with one or more aspects of the one or more augmentations.

5. The computationally-implemented method of claim 1, further comprising:
correlating at least one of a facial expression, a head position, or a head tilt of the user detected during and/or following display of the augmented view with one or more aspects of the one or more augmentations.

6. The computationally-implemented method of claim 1, further comprising:
correlating one or more user reactions with one or more aspects of one or more non-augmentation scene elements included in the augmented view.

7. The computationally-implemented method of claim 1, further comprising:
correlating one or more user reactions with one or more non-augmentation scene elements that have been obfuscated in the augmented view by the one or more augmentations.

8. The computationally-implemented method of claim 1, further comprising:
generating a second augmented view of a second actual scene at a later time.

9. The computationally-implemented method of claim 8, wherein the second actual scene includes one or more similar environmental conditions as the actual scene.

10. The computationally-implemented method of claim 1, further comprising:
changing a format of the one or more augmentations.

11. The computationally-implemented method of claim 1, further comprising:
detecting one or more anchor visual patterns or items within the actual scene.

12. The computationally-implemented method of claim 1, further comprising:
placing the one or more augmentations in the augmented view along one or more detected dwell paths.

13. The computationally-implemented method of cam 1, when the moving the one or more augmentations away from the first location to a peripheral location in the augmented view based at least in part on the indication of low interest comprises:
moving the one or more augmentations away from the first location to a corner location in the augmented view based at east in part on the indication of low interest.

14. The computationally-implemented method of claim 1, wherein the operations are performed using one or more computer processors of an augmented reality device.

15. The computationally-implemented method of claim 1, wherein the generating an augmented view including displaying one or more augmentations at a first location relative to an actual scene of a real environment comprises:
   generating an augmented view on at least one of the following devices: smartphone, tablet, or eyewear.

16. The computationally-implemented method of claim 1, further comprising:
   changing a shape or dimension of the one or more augmentations.

17. The computationally-implemented method of claim 1, wherein the determining low interest in the one or more augmentations at the first location based at least partly on the pupil size and dwell path of the user indicating focus off of the one or more augmentations within a specified time of initial focus comprises:
   determining low interest in the one or more augmentations at the first location based at least partly on the pupil size and dwell path of the user indicating focus away from the one or more augmentations in less than a specified time.

18. The computationally-implemented method of claim 1, wherein the generating an augmented view including displaying one or more augmentations at a first location relative to an actual scene of a real environment comprises:
   generating an augmented view including displaying one or more augmentations at a first central location relative to an actual scene of a real environment.

19. The computationally-implemented method of claim 1, wherein the detecting a pupil size and dwell path of a user during display of the augmented view of the actual scene of the real environment comprises:
   detecting a pupil size and eye path of a user during display of the augmented view of the actual scene of the real environment.

20. The computationally-implemented method of claim 1, further comprising:
   performing facial recognition with respect to one or more aspects of the real environment.

21. The computationally-implemented method of claim 1, further comprising:
   performing voice recognition with respect to one or more aspects of the real environment.

22. The computationally-implemented method of claim 1, further comprising:
   obtaining the one or more augmentations from a remote network location.

23. The computationally-implemented method of claim 1, further comprising:
   providing output of at least one social networking application.

24. A computationally-implemented system, comprising:
   means for generating an augmented view including displaying one or more augmentations at a first location relative to an actual scene of a real environment means for detecting a pupil size and dwell path of a user during display of the augmented view of the actual scene of the real environment;
   means for determining low interest in the one or more augmentations at the first location based at least partly on the pupil size and dwell path of the user indicating focus off of the one or more augmentations within a specified time of initial focus; and
   means for moving the one or more augmentations away from the first location to a peripheral location in the augmented view based at least in part on the indication of low interest.

25. A system comprising:
   circuitry configured for generating an augmented view including displaying one or more augmentations at a first location relative to an actual scene of a real environment;
   circuitry configured for detecting a pupil size and dwell path of a user during display of the augmented view of the actual scene of the real environment;
   circuitry configured for determining low interest in the one or more augmentations at the first location based at least partly on the pupil size and dwell path of the user indicating focus off of the one or more augmentations within a specified time of initial focus; and
   circuitry configured for moving the one or more augmentations away from the first location to a peripheral location in the augmented view based at least in part on the indication of low interest.

* * * * *